(12) United States Patent
Ji et al.

(10) Patent No.: US 12,309,096 B2
(45) Date of Patent: May 20, 2025

(54) METHOD AND DEVICE FOR TRANSMITTING AND RECEIVING REFERENCE SIGNAL IN WIRELESS COMMUNICATION SYSTEM

(71) Applicant: Samsung Electronics Co., Ltd., Gyeonggi-do (KR)

(72) Inventors: Hyoungju Ji, Gyeonggi-do (KR); Hoondong Noh, Gyeonggi-do (KR); Taehyoung Kim, Gyeonggi-do (KR); Jinhyun Park, Gyeonggi-do (KR); Youngrok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 297 days.

(21) Appl. No.: 17/915,331

(22) PCT Filed: Mar. 30, 2021

(86) PCT No.: PCT/KR2021/003902
§ 371 (c)(1),
(2) Date: Sep. 28, 2022

(87) PCT Pub. No.: WO2021/201554
PCT Pub. Date: Oct. 7, 2021

(65) Prior Publication Data
US 2023/0239103 A1 Jul. 27, 2023

(30) Foreign Application Priority Data
Mar. 30, 2020 (KR) .................. 10-2020-0038511

(51) Int. Cl.
*H04L 5/00* (2006.01)
*H04J 13/16* (2011.01)

(52) U.S. Cl.
CPC ........... *H04L 5/0051* (2013.01); *H04J 13/16* (2013.01); *H04L 5/008* (2013.01)

(58) Field of Classification Search
CPC ..... H04L 5/0051; H04L 5/008; H04L 5/0082; H04L 5/0091; H04L 5/0094;
(Continued)

(56) References Cited

U.S. PATENT DOCUMENTS 11,405,090 B2   8/2022   Yeo et al.
11,516,813 B2   11/2022  Huang
(Continued)

FOREIGN PATENT DOCUMENTS

CN   109587793        4/2019
EP   3972175 A1 *    3/2022   .............. H04J 13/16
(Continued)

OTHER PUBLICATIONS

Chinese Office Action dated Mar. 28, 2024 issued in counterpart application No. 202180025655.2, 8 pages.
(Continued)

*Primary Examiner* — Chae S Lee
(74) *Attorney, Agent, or Firm* — The Farrell Law Firm, P.C.

(57) ABSTRACT

The present disclosure relates to a communication technique that merges IoT technology with a 5G communication system for supporting higher data transmission rates than 4G systems, and a system therefor. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. The invention of the present disclosure proposes a method and device for transmitting and receiving a reference signal for efficiently using resources in a wireless communication system.

16 Claims, 27 Drawing Sheets

(58) Field of Classification Search
CPC ..... H04L 5/0048; H04L 5/001; H04L 5/0012; H04L 5/0023; H04L 5/0035; H04L 25/0226; H04L 27/2613; H04L 5/0007; H04J 13/16; H04W 8/24; H04W 72/0453; H04W 72/23

See application file for complete search history.

(56) References Cited

U.S. PATENT DOCUMENTS

| | | | |
|---|---|---|---|
| 2019/0260532 A1* | 8/2019 | Manolakos | H04L 5/0051 |
| 2020/0007194 A1 | 1/2020 | John Wilson et al. | |
| 2020/0267571 A1 | 8/2020 | Park et al. | |
| 2020/0374931 A1 | 11/2020 | Tang | |
| 2021/0136773 A1 | 5/2021 | Yang et al. | |
| 2021/0235452 A1 | 7/2021 | Huang | |
| 2021/0235455 A1* | 7/2021 | Khoshnevisan | H04W 76/27 |
| 2021/0314045 A1 | 10/2021 | Cha et al. | |
| 2022/0006581 A1* | 1/2022 | Yamada | H04B 7/088 |
| 2022/0077982 A1* | 3/2022 | Zhang | H04L 5/0014 |
| 2022/0124751 A1* | 4/2022 | Matsumura | H04L 5/0094 |

FOREIGN PATENT DOCUMENTS

| | | |
|---|---|---|
| KR | 10-2439425 | 8/2022 |
| WO | WO 2019/066618 | 4/2019 |
| WO | WO 2019/097478 | 5/2019 |
| WO | WO 2019/157755 | 8/2019 |
| WO | WO 2019/233334 | 12/2019 |
| WO | WO 2020/011094 | 1/2020 |
| WO | WO 2020/032569 | 2/2020 |
| WO | WO-2021164023 A1 * | 8/2021 |

OTHER PUBLICATIONS

Japanese Notice of Allowance dated Jun. 4, 2024 issued in counterpart application No. 2023-122431, 7 pages.

European Search Report dated Aug. 7, 2023 issued in counterpart application No. 21780498.8-1213, 10 pages.

PCT/ISA/210 Search Report issued on PCT/KR2021/003902, Jul. 1, 2021 pp. 5.

PCT/ISA/237 Written Opinion issued on PCT/KR2021/003902, Jul. 1, 2021, pp. 3.

3GPP; TSG RAN; NR; Physical layer procedures for data (Release 16), 3GPP TS 38.214 V16.0.0, Jan. 4, 2020, pp. 149.

3GPP; TSG RAN; NR; Radio Resource Control (RRC) protocol specification (Release 15), 3GPP TS 38.331 V15.8.0, Jan. 8, 2020, pp. 534.

Chinese Office Action dated Apr. 3, 2025 issued in counterpart application No. 202180025655.2, 8 pages.

* cited by examiner

METHOD AND DEVICE FOR TRANSMITTING AND RECEIVING REFERENCE SIGNAL IN WIRELESS COMMUNICATION SYSTEM

PRIORITY

This application is a National Phase Entry of PCT International Application No. PCT/KR2021/003902, which was filed on Mar. 30, 2021, and claims priority to Korean Patent Application No. 10-2020-0038511, which was filed on Mar. 30, 2020, the entire content of each of which is incorporated herein by reference.

TECHNICAL FIELD

The disclosure relates to a method and a device for transmitting or receiving a reference signal in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

DISCLOSURE OF INVENTION

Technical Problem

A technical task to be achieved by the disclosure is to provide a method and a device for transmitting or receiving a reference signal for an efficient uplink or downlink signal transmission/reception operation for various services in a mobile communication system.

Solution to Problem

A method performed by a terminal of a wireless communication system according to an embodiment of the disclosure to achieve the task includes: receiving configuration information for configuring of transmission configuration information (TCI) emulation from a base station; determining whether to perform TCI emulation, based on the configuration information; and if TCI emulation is determined to be performed, performing signal transmission or reception based on a quasi-co-location (QCL) assumption determined based on the TCI emulation, wherein the TCI emulation is a TCI configuration based on a one-to-many or many-to-one correspondence between multiple reference reference-signals and multiple target reference-signals.

A method performed by a base station of a wireless communication system includes: receiving, from a terminal, terminal capability information including information indicating that the terminal supports transmission configuration information (TCI) emulation; and transmitting, to the terminal, configuration information for configuring of TCI emulation, wherein the TCI emulation is a TCI configuration based on a one-to-many or many-to-one correspondence between multiple reference reference-signals and multiple target reference-signals.

A terminal of a wireless communication system includes: a transceiver; and a controller configured to control to receive configuration information for configuring of transmission configuration information (TCI) emulation from a base station, determine whether to perform TCI emulation, based on the configuration information, and if TCI emulation is determined to be performed, perform signal transmission or reception based on a quasi-co-location (QCL) assumption determined based on the TCI emulation, wherein the TCI emulation is a TCI configuration based on a one-to-many or many-to-one correspondence between multiple reference reference-signals and multiple target reference-signals.

A base station of a wireless communication system includes: a transceiver; and a controller configured to control to receive, from a terminal, terminal capability information including information indicating that the terminal supports transmission configuration information (TCI) emulation, and transmit, to the terminal, configuration information for configuring of TCI emulation, wherein the TCI emulation is a TCI configuration based on a one-to-many or many-to-one correspondence between multiple reference reference-signals and multiple target reference-signals.

Advantageous Effects of Invention

Disclosed embodiments provide a method and a device for efficient uplink or downlink signal transmission or reception in a mobile communication system.

MODE FOR THE INVENTION

Figure 1:
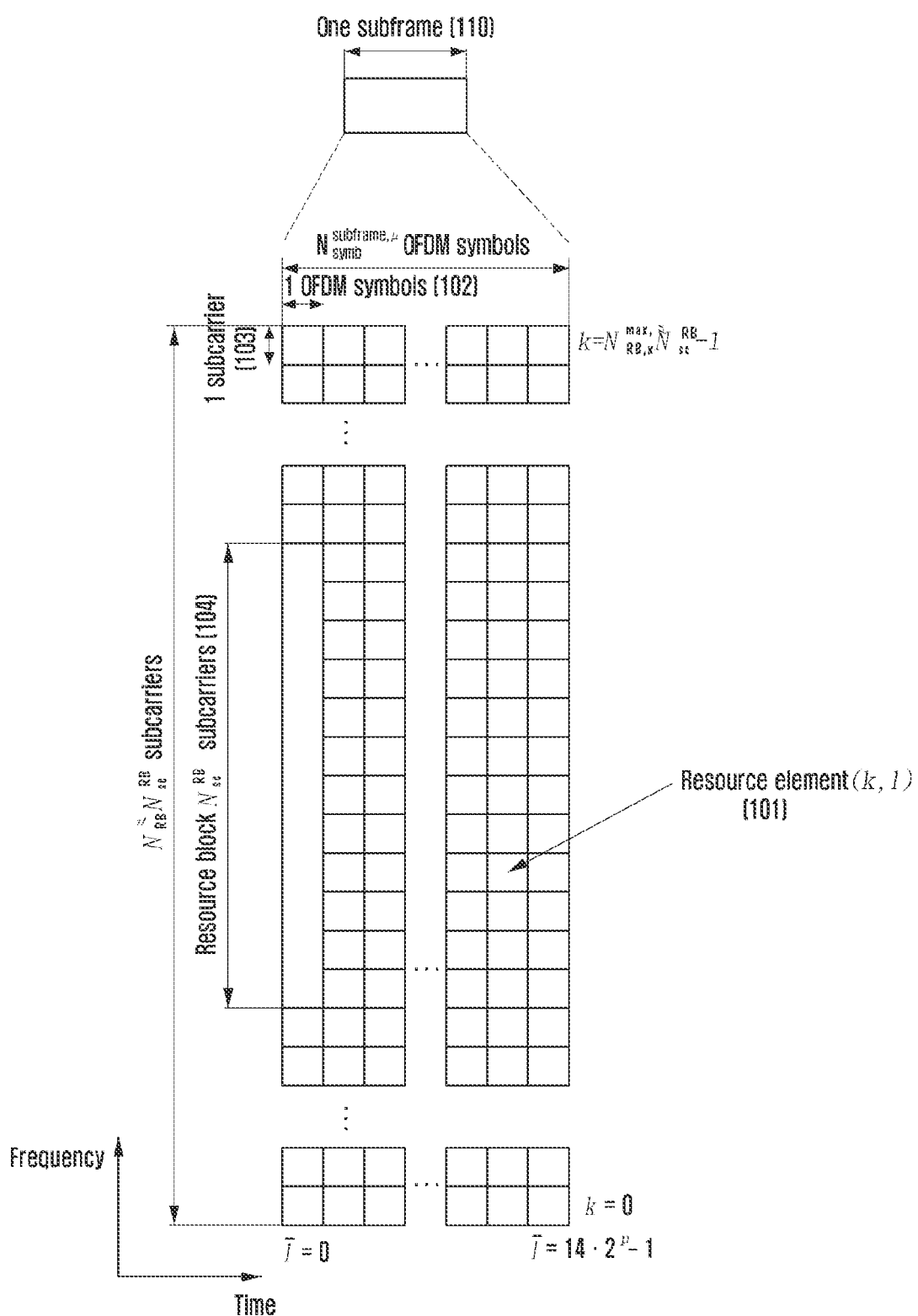
FIG. 1 is a diagram illustrating a basic structure of a time-frequency domain that is a radio resource area of a 5G system according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G systems, which may be interchangeably used with "new radio" and "NR") developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, an embodiment of the disclosure will be described in detail with the accompanying drawings. Hereinafter, although embodiments of the disclosure are described for a method and a device proposed therein, by taking a service for coverage enhancement as an example, the disclosure is not limited and applied to each embodiment, and can be used for a method of transmitting or receiving a data channel, a control channel, and a reference signal, which correspond to another additional service, by using all or some of one or more embodiments proposed in the disclosure. Accordingly, the embodiments of the disclosure may be applied via some modifications within a range that does not significantly deviate from the scope of the disclosure as judged by those of skill in the art.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like. eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

A bandwidth part (BWP) technology of performing division into multiple frequency bands supportable for each terminal by a base station within the entire carrier frequency band when the base station supports a wide bandwidth is emerging. That is, when a base station supports a BWP, if BW capability of a specific terminal is small, a small frequency band may be supported to a terminal via the BWP, and energy consumption of the terminal may be reduced while reducing the frequency band by changing the BWP. In addition, while supporting a different frame structure for each of multiple BWPs, various services may be supportable for one terminal without latency via a change of the BWP. The BWP technology may be applied to a control channel or data channel corresponding one-to-one between a predetermined terminal and a base station. In addition, with respect to a common signal that a base station transmits to multiple terminals within a system, for example, a synchronization signal, a physical broadcast channel (PBCH), and a control channel and data channel for transmitting system information, a BWP may be applied for energy reduction of the base station by transmitting the control channel and the data channel only in a configured BWP.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and requires a very long battery life-time, such as 10 to 15 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and must also assign a large number of resources in a frequency band in order to secure reliability of a communication link.

The three services in the 5G communication system (hereinafter may be interchangeably used with "5G system"), that is, eMBB, URLLC, and mMTC, may be multiplexed and transmitted in a single system. In this case, different transmission/reception techniques and transmission/reception parameters may be used between services in order to satisfy different requirements of the respective services.

In the following description, higher layer signaling may include radio resource control (RRC) signaling (a system information block (SIB), a master information block (MIB), and the like may be included in the RRC signaling), a medium access control (MAC) control element (CE), etc., and L1 signaling may include downlink control information, uplink control information, etc.

Hereinafter, a frame structure of the 5G system will be described in more detail with reference to the drawings.

FIG. 1 is a diagram illustrating a basic structure of a time-frequency domain which is a radio resource area of a 5G communication system.

In FIG. 1, the horizontal axis represents a time domain, and the vertical axis represents a frequency domain. A basic unit of resources in the time and frequency domains is a resource element (RE) 101, and may be defined to be 1 orthogonal frequency division multiplexing (OFDM) symbol (or discrete Fourier transform spread OFDM (DFT-s-OFDM) symbol) 102 on the time axis and 1 subcarrier 103 on the frequency axis. $N_{SC}^{RB}$ consecutive REs (e.g., 12) in the frequency domain may constitute one resource block (RB) 104. $N_{symbol}^{subframe}$ consecutive OFDM symbols in the time symbol domain may constitute one subframe 110.

Figure 2:
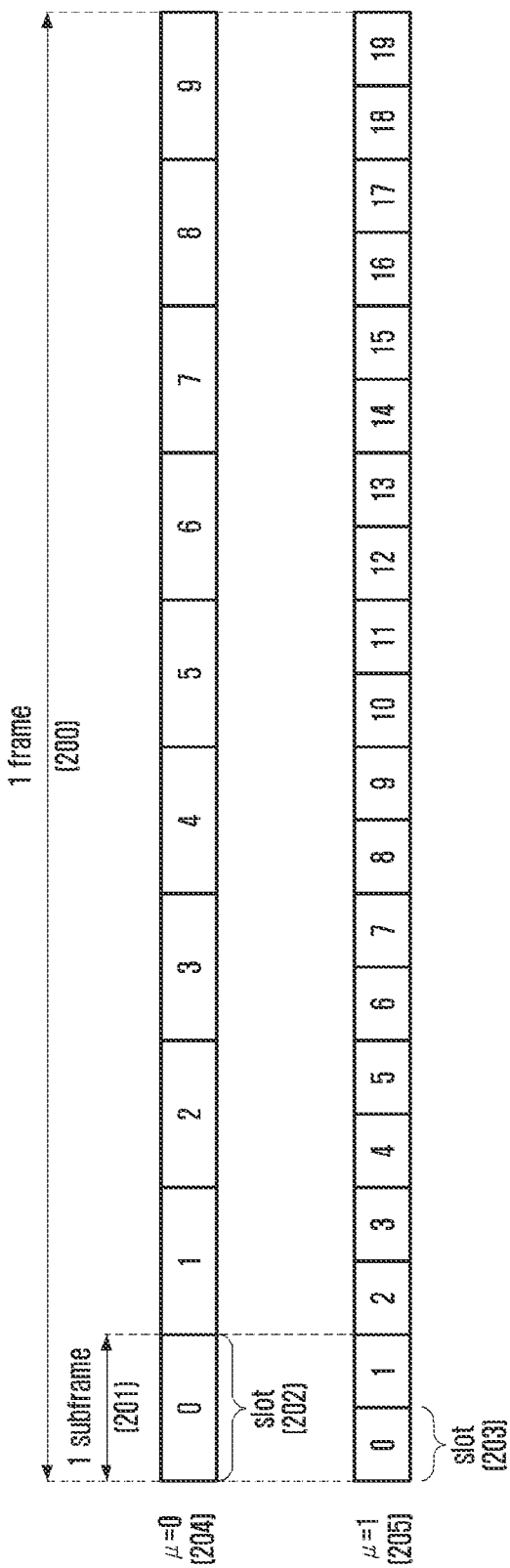
FIG. 2 is a diagram illustrating a slot structure considered in the 5G system according to an embodiment of the disclosure.

FIG. 2 is a diagram illustrating a slot structure considered in a 5G system.

FIG. 2 illustrates an example of a structure of a frame 200, a subframe 201, and a slot 202. One frame 200 may be defined to be 10 ms. One subframe 201 may be defined to be 1 ms, and thus one frame 200 may include a total of 10 subframes 201. One slot 202 or 203 may be defined to be 14 OFDM symbols (that is, the number ($N_{symb}^{slot}$) of symbols per slot=14). One subframe 201 may include one or multiple slots 202 and 203, and the number of slots 202 and 203 per subframe 201 may vary according to µ 204 and 205, i.e., configuration values for subcarrier spacings.

In an example of FIG. 2, a slot structure of a case in which µ=0 204 and that of a case in which µ=1 205 are illustrated, where g is a subcarrier spacing configuration value. If µ=0 204, one subframe 201 may include one slot 202, and if µ=1 205, one subframe 201 may include two slots 203. That is, the number ($N_{slot}^{subframe,\mu}$) of slots per subframe may vary according to configuration value p for a subcarrier spacing, and accordingly, the number ($N_{slot}^{frame,\mu}$) of slots per frame may vary. $N_{slot}^{subframe,\mu}$ and $N_{slot}^{frame,\mu}$ according to respective subcarrier spacing configurations p may be defined in Table 1 below.

TABLE 1

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (SSB, SS block, SS/PBCH block, etc. may be interchangeably used) for initial access may be transmitted, and the synchronization signal block may include a primary synchronization signal (PSS), a secondary synchronization signal (SSS), and a physical broadcast channel (PBCH). During initial access when a terminal accesses a system for the first time, the terminal may first acquire downlink time and frequency domain synchronization from a synchronization signal via a cell search and may acquire a cell ID. The synchronization signal may include a PSS and an SSS.

The terminal may receive, from a base station, a PBCH for transmitting a master information block (MIB) so as to acquire a basic parameter value and system information related to transmission or reception, such as a system bandwidth or related control information. Based on this information, the terminal may perform decoding on a physical downlink control channel (PDCCH) and a physical downlink shared channel (PDSCH) so as to acquire a system information block (SIB). Then, the terminal exchanges an identity with the base station via random-access and initially accesses a network via operations, such as registration and authentication.

A synchronization signal is a reference signal for a cell search, and may be transmitted by applying a subcarrier spacing suitable for a channel environment, such as phase noise, for each frequency band. A 5G base station may transmit multiple synchronization signal blocks according to the number of analog beams to be operated. A PSS and an SSS may be mapped over 12 RBs and transmitted, and a PBCH may be mapped over 24 RBs and transmitted.

Subsequently, a bandwidth part (BWP) configuration in the 5G communication system will be described in detail with reference to the drawings.

Figure 3:
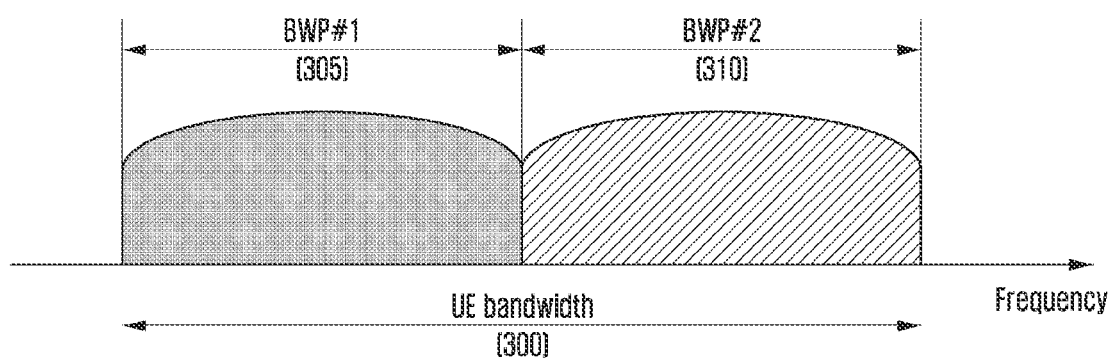
FIG. 3 is a diagram illustrating an example of a configuration for a bandwidth part in a 5G communication system according to an embodiment of the disclosure.

FIG. 3 is a diagram illustrating an example of a configuration for a bandwidth part in the 5G communication system.

FIG. 3 illustrates an example in which a terminal bandwidth (UE bandwidth) 300 is configured to have two bandwidth parts that are bandwidth part #1 305 and bandwidth part #2 310. A base station may configure one or multiple bandwidth parts for the terminal, and may configure the following information for each bandwidth part.

TABLE 2

| BWP ::= | SEQUENCE { |
|---|---|
| bwp-Id | BWP-Id, |
| locationAndBandwidth | INTEGER (1. . 65536), |
| subcarrierSpacing | ENUMERATED {n0, n1, n2, n3, n4, n5}, |
| cyclicPrefix | ENUMERATED { extended } |
| } | |

The disclosure is not limited to the above example, and in addition to the configuration information, various parameters related to the bandwidth part may be configured for the terminal. The base station may transfer the information to the terminal via higher layer signaling, for example, radio resource control (RRC) signaling. At least one bandwidth part among the configured one or multiple bandwidth parts may be activated. Whether the configured bandwidth part is active may be transferred from the base station to the terminal in a semi-static manner via RRC signaling or may be dynamically transferred via downlink control information (DCI).

According to some embodiments, the base station may configure an initial bandwidth part (BWP) for initial access, via a master information block (MIB), for the terminal before an RRC connection. More specifically, during the initial access, the terminal may receive configuration information for a search space and a control area (control resource set (CORESET)) in which a physical downlink control channel (PDCCH) for receiving system information (may correspond to remaining system information (RMSI) or system information block 1 (SIB1)) required for initial access may be transmitted via the MIB. Each of the search space and the control area configured via the MIB may be considered to be identifier (identity (ID)) 0. The base station may notify, via the MIB, the terminal of configuration information, such as frequency allocation information, time allocation information, and numerology for control area #0. In addition, the base station may notify, via the MIB, the terminal of configuration information for a monitoring periodicity and occasion for control area #0, that is, the configuration information for search space #0. The terminal may consider a frequency domain configured to control area #0, which is acquired from the MIB, as an initial bandwidth part for initial access. In this case, an identity (ID) of the initial bandwidth part may be considered to be 0.

The configuration of a bandwidth part supported by the 5G system may be used for various purposes.

According to some embodiments, if a bandwidth supported by the terminal is smaller than a system bandwidth, this may be supported via the bandwidth part configuration. For example, the base station may configure, for the terminal, a frequency position (configuration information 2) of the bandwidth part, and the terminal may thus transmit or receive data at a specific frequency position within the system bandwidth.

According to some embodiments, for the purpose of supporting different numerologies, the base station may configure multiple bandwidth parts for the terminal. For example, in order to support both data transmission and reception using a subcarrier spacing of 15 kHz and a subcarrier spacing of 30 kHz for a terminal, two bandwidth parts may be configured with the subcarrier spacings of 15 kHz and 30 kHz, respectively. Different bandwidth parts may be frequency-division-multiplexed, and when data is to be transmitted or received at a specific subcarrier spacing, a bandwidth part configured with the subcarrier spacing may be activated.

According to some embodiments, for the purpose of reducing power consumption of the terminal, the base station may configure, for the terminal, bandwidth parts having different bandwidth sizes. For example, if the terminal supports a very large bandwidth, for example, a bandwidth of 100 MHz, and always transmits or receives data via the corresponding bandwidth, very large power consumption may occur. In particular, in a situation where there is no traffic, it may be very inefficient, in terms of power consumption, to perform monitoring for an unnecessary downlink control channel with a large bandwidth of 100 Mhz. For the purpose of reducing the power consumption of the terminal, the base station may configure, for the terminal, a bandwidth part of a relatively small bandwidth, for example, a bandwidth part of 20 Mhz. In the situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) during initial access. More specifically, the terminal may be configured with a control area (may be interchangeably used with a control resource set (CORESET)) for a downlink control channel via which downlink control information (DCI) for scheduling of a system information block (SIB) may be transmitted from an MIB of a physical broadcast channel (PBCH). The bandwidth of the control area, which is configured via the MIB, may be considered to be the initial bandwidth part, and the terminal may receive a physical downlink shared channel (PDSCH), through which the SIB is transmitted, via the configured initial bandwidth part. In addition to reception of the SIB, the initial bandwidth part may be used for other system information (OSI), paging, and random access.

When one or more bandwidth parts are configured for the terminal, the base station may indicate the terminal to change a bandwidth part, by using a bandwidth part indicator field in DCI. For example, in FIG. 3, if a currently active bandwidth part of the terminal is bandwidth part #1 305, the base station may indicate bandwidth part #2 310 to the terminal via the bandwidth part indicator in the DCI, and the terminal may switch the bandwidth part to bandwidth part #2 310 indicated via the bandwidth part indicator in the received DCI.

As described above, the DCI-based switching of the bandwidth part may be indicated by the DCI for scheduling of the PDSCH or physical uplink shared channel (PUSCH), and thus when a request for switching a bandwidth part is received, the terminal may need to receive or transmit the PDSCH or PUSCH scheduled by the corresponding DCI, with ease in the switched bandwidth part. To this end, in the standard, requirements for a delay time ($T_B$WP) required when a bandwidth part is switched are regulated, and may be defined below, for example.

TABLE 3

| | NR Slot length | BWP switch delay $T_{BWP}$ (slots) | |
|---|---|---|---|
| μ | (ms) | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 17 |

Note 1: Depends on UE capability
Note 2: If the BWP switch involves changing of SCS, the BWP switch delay is determined by the larger one between the SCS before BWP switch and the SCS after BWP switch.

The requirements for a bandwidth part switch delay time support type 1 or type 2 according to capability of the terminal. The terminal may report a supportable bandwidth part delay time type to the base station.

Figure 4:
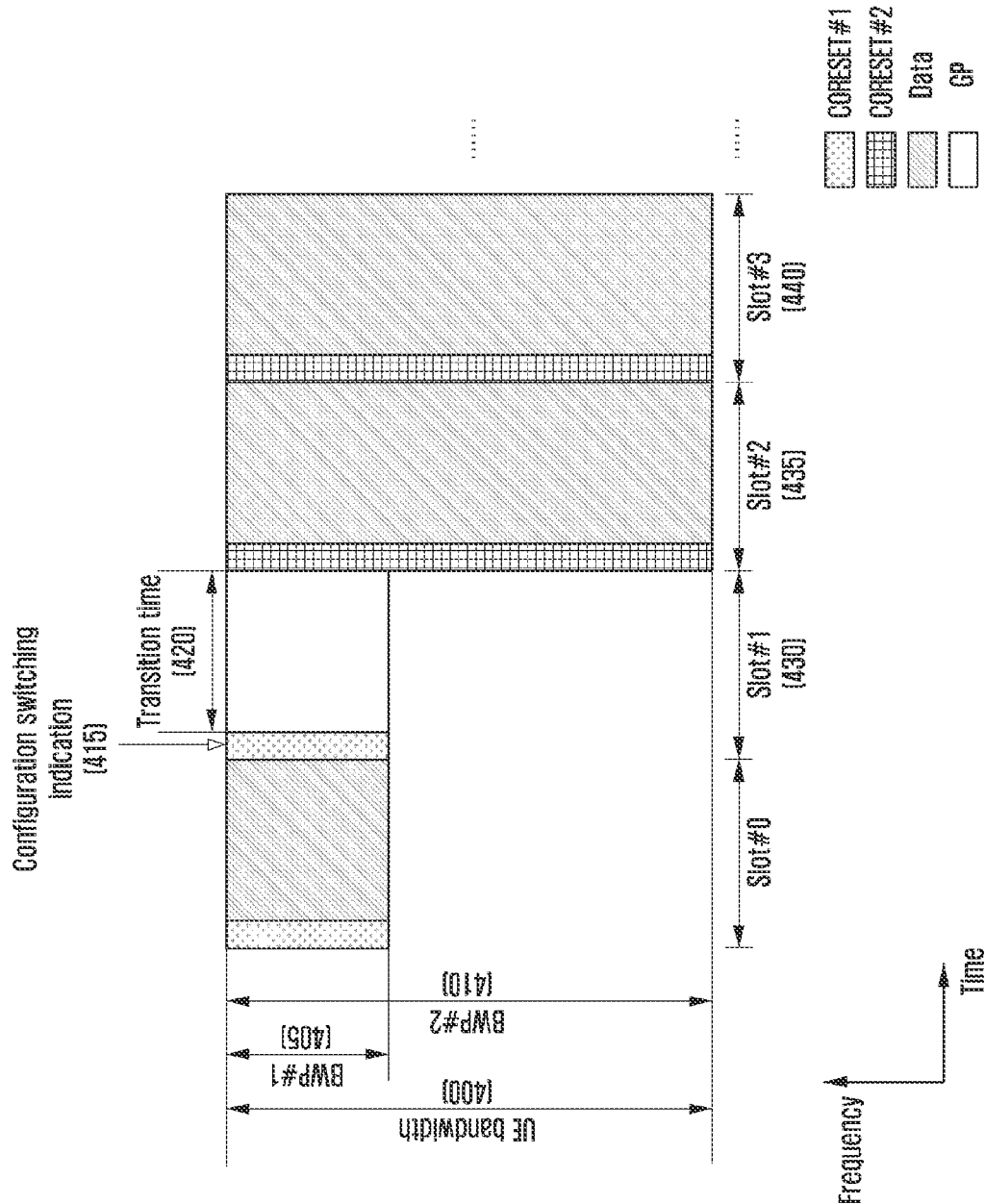
FIG. 4 is a diagram illustrating an example of a procedure of switching a bandwidth part in the 5G communication system according to an embodiment of the disclosure.

FIG. 4 is a diagram illustrating an example of a bandwidth switching method according to an embodiment of the disclosure.

Referring to FIG. 4, according to the aforementioned requirements for the bandwidth part switch delay time, when the terminal receives 415 DCI including the bandwidth part switch indicator in slot #1 430, the terminal may complete switching to a new bandwidth part indicated by the bandwidth part switch indicator at a time point no later than slot $n+T_{BWP}$, and may perform transmission or reception for a data channel scheduled by the corresponding DCI in the switched new bandwidth part 410. When the base station is to schedule a data channel with a new bandwidth part, time domain resource allocation for the data channel may be determined by considering the bandwidth part switch delay time ($T_{BWP}$) 420 of the terminal. That is, when the base station schedules a data channel with a new bandwidth part, a method of determining time domain resource allocation for the data channel may include scheduling the data channel after the bandwidth part switch delay time (slot #2, slot #3) 435 and 440. Accordingly, the terminal may not expect that DCI indicating bandwidth part switching indicates a value of a slot offset (K0 or K2) smaller than a value of the bandwidth part switch delay time ($T_{BWP}$P) 420.

If the terminal receives DCI (for example, DCI format 1_1 or 0_1) indicating bandwidth part switching, the terminal may not perform any transmission or reception during a time interval from a third symbol of a slot in which a PDCCH including the DCI is received to a start point of a slot indicated by a slot offset (K0 or K2) value indicated via a time domain resource allocation indicator field in the DCI. For example, when the terminal receives the DCI indicating bandwidth part switching in slot n, and a slot offset value indicated by the DCI is K, the terminal may not perform any transmission or reception from a third symbol of slot n to a symbol before slot n+K (i.e., a last symbol in slot n+K−1).

Subsequently, a method of configuring a transmission/reception-related parameter for each bandwidth part in the 5G system will be described.

The terminal may be configured with one or multiple bandwidth parts by the base station, and may additionally be configured with parameters (e.g., configuration information relating to uplink/downlink data channels and control channels) to be used for transmission or reception for each configured bandwidth part. For example, in FIG. 3, when the terminal is configured with bandwidth part #1 305 and bandwidth part #2 310, the terminal may be configured with transmission/reception parameter #1 for bandwidth part #1 305 and may be configured with transmission/reception parameter #2 for bandwidth part #2 310. When bandwidth part #1 305 is activated, the terminal may perform transmission to or reception from the base station, based on transmission/reception parameter #1, and when bandwidth part #2 310 is activated, the terminal may perform transmission to or reception from the base station, based on transmission/reception parameter #2.

More specifically, the following parameters may be configured for the terminal by the base station. First, the following information may be configured for an uplink bandwidth part.

TABLE 4

BWP-Uplink ::= SEQUENCE {
bwp-Id            BWP-Id,
(Bandwidth part identifier)

TABLE 4-continued

```
bwp-Common           BWP-UplinkCommon OPTIONAL, -- Cond SetupOtherBWP
(cell-specific or common parameter)
bwp-Dedicated        BWP-UplinkDedicated OPTIONAL, -- Cond SetupOtherBWP
(UE-specific parameter)
...
}
BWP-UplinkCommon ::= SEQUENCE {
genericParameters    BWP,
(general parameter)
rach-ConfigCommon         SetupRelease { RACH-ConfigCommon } OPTIONAL, --
Need M
(random-access-related common parameter)
pusch-ConfigCommon        SetupRelease { PUSCH-ConfigCommon } OPTIONAL, --
Need M
(PUSCH-related common parameter)
pucch-ConfigCommon        SetupRelease { PUCCH-ConfigCommon } OPTIONAL, --
Need M
(PUSCH-related common parameter)
...
}
BWP-UplinkDedicated ::= SEQUENCE {
pucch-Config         SetupRelease { PUCCH-Config } OPTIONAL, -- Need M
(PUCCH-related UE-specific parameter)
pusch-Config         SetupRelease { PUSCH-Config } OPTIONAL, -- Need M
(PUSCH-related UE-specific parameter)
configuredGrantConfig
(Configured grant-related parameter)    SetupRelease { ConfiguredGrantConfig }
OPTIONAL, -- Need M
srs-Config
(SRS-related parameter)
SetupRelease { SRS-Config } OPTIONAL, -- Need M
beamFailureRecoveryConfig
(beam failure recovery-related parameter)      SetupRelease
{ BeamFailureRecoveryConfig } OPTIONAL, -- Cond SpCellOnly
...
}
```

According to the above table, the base station may configure, for the terminal, cell-specific (or cell-common or common) transmission-related parameters (e.g., parameters relating to a random-access channel (RACH), an uplink control channel (physical uplink control channel (PUCCH), and an uplink data channel (physical uplink shared channel) (corresponding to BWP-UplinkCommon). The base station may configure, for the terminal, UE-specific (or UE-dedicated) transmission-related parameters (e.g., parameters relating to a sounding reference signal (SRS), PUCCH, PUSCH, and non-grant-based uplink transmission (configured grant PUSCH)) (corresponding to BWP-UplinkDedicated).

Subsequently, the following information may be configured for a downlink bandwidth part.

TABLE 5

```
BWP-Downlink ::= SEQUENCE {
bwp-Id               BWP-Id,
(bandwidth part identifier)
bwp-Common           BWP-DownlinkCommon OPTIONAL, -- Cond SetupOtherBWP
(cell-specific or common parameter)
bwp-Dedicated        BWP-DownlinkDedicated OPTIONAL, -- Cond SetupOtherBWP
(UE-specific parameter)
...
}
BWP-DownCommon ::= SEQUENCE {
genericParameters    BWP,
(general parameter)
pdcch-ConfigCommon        SetupRelease { PDCCH-ConfigCommon } OPTIONAL, --
Need M
(PDCCH-related common parameter)
pdsch-ConfigCommon        SetupRelease { PDSCH-ConfigCommon } OPTIONAL, --
Need M
(PDSCH-related common parameter)
...
}
BWP-DownDedicated ::= SEQUENCE {
pdcch-Config         SetupRelease { PDCCH-Config } OPTIONAL, -- Need M
(PDCCH-related UE-specific parameter)
pdsch-Config         SetupRelease { PDSCH-Config } OPTIONAL, -- Need M
(PDSCH-related UE-specific parameter)
sps-Config
(SPS-related parameter) SetupRelease { SPS-Config } OPTIONAL, -- Need M
radioLinkMonitoringConfig
```

TABLE 5-continued (RLM-related parameter) SetupRelease { radioLinkMonitoringConfig} OPTIONAL, --
Cond SpCellOnly

...
}

According to the above table, the base station may configure, for the terminal, cell-specific (or cell-common or common) reception-related parameters (e.g., parameters relating to a downlink control channel (physical downlink control channel (PDCCH)) and a downlink data channel (physical downlink shared channel)) (corresponding to BWP-DownlinkCommon). The base station may configure, for the terminal, UE-specific (or UE-dedicated) reception-related parameters (e.g., parameters relating to radio link monitoring (RLM), PDCCH, PDSCH, and non-grant-based downlink data transmission (semi-persistent scheduled PDSCH) (corresponding to BWP-UplinkDedicated).

Figure 5:
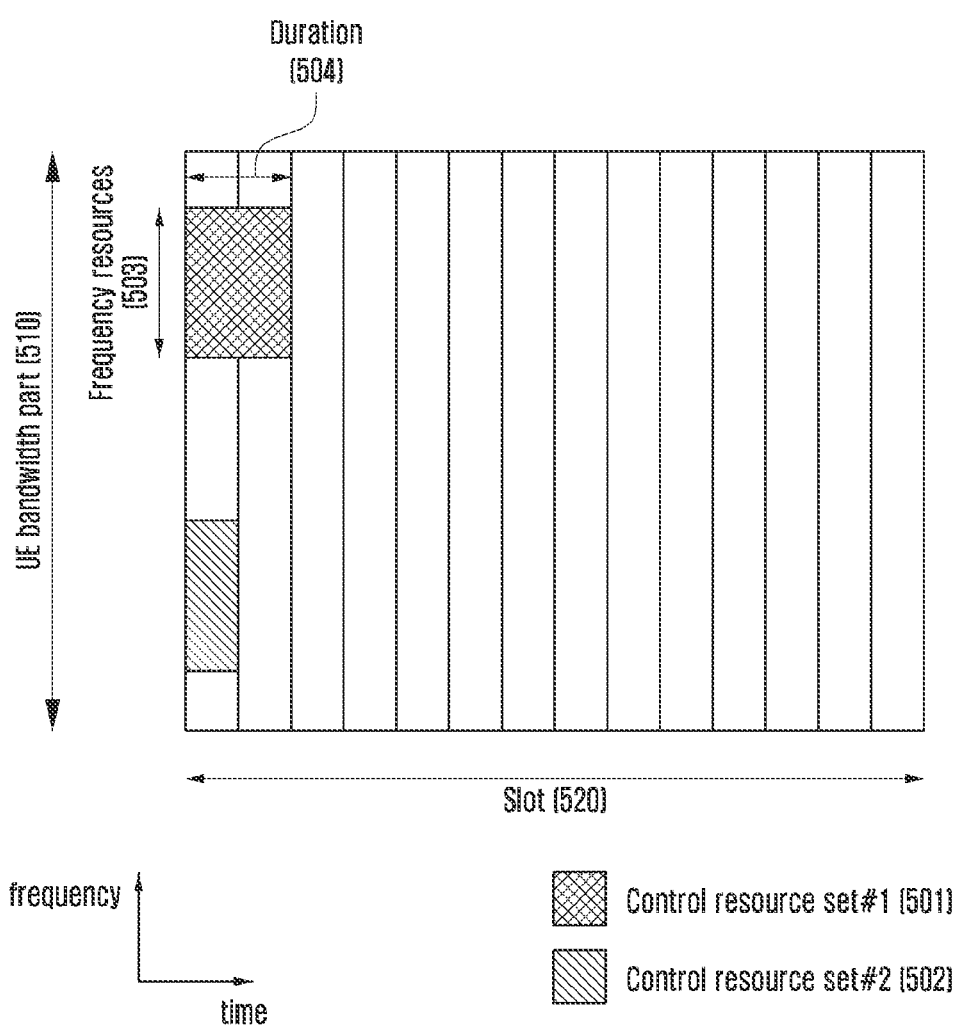
FIG. 5 is a diagram illustrating an example of a control resource set (CORESET) in which a downlink control channel is transmitted in a 5G wireless communication system according to an embodiment of the disclosure.

FIG. 5 is a diagram illustrating an example of a control resource set (CORESET) at which a downlink control channel is transmitted in the 5G wireless communication system. FIG. 5 illustrates an example in which a terminal bandwidth part (UE bandwidth part) 510 is configured on the frequency axis, and two control resource sets (control resource set #1 501 and control resource set #2 502) are configured within one slot 520 on the time axis. The control resource sets 501 and 502 may be configured in a specific frequency resource 503 within the entire UE bandwidth part 510 on the frequency axis. One or multiple OFDM symbols may be configured on the time axis and may be defined as a control resource set duration 504. Referring to the example illustrated in FIG. 5, control resource set #1 501 may be configured to a control resource set duration of 2 symbols, and control resource set #2 502 may be configured to a control resource set duration of 1 symbol.

The aforementioned control resource set in the 5G system may be configured for the terminal by the base station via higher layer signaling (e.g., system information, a master information block (MIB), and radio resource control (RRC) signaling). Configuring a control resource set for a terminal refers to providing information, such as an identity of the control resource set, a frequency position of the control resource set, and a symbol length of the control resource set. For example, information provided to configure the control resource set is as follows.

TABLE 6

ControlResourceSet ::=           SEQUENCE {
Corresponds to L1 parameter "CORESET-ID"

TABLE 6-continued controlResourceSetId             ControlResourceSetId,
(Control resource set identity)
frequencyDomainResources         BIT STRING (SIZE (45)),
(Frequency axis resource allocation information)
duration                         INTEGER (1..maxCoReSetDuration),
(Time axis resource allocation information)
cce-REG-MappingType              CHOICE {
(CCE-to-REG mapping scheme)
interleaved                      SEQUENCE {
reg-BundleSize                   ENUMERATED {n2, n3, n6},
(REG bundle size)
precoderGranularity              ENUMERATED {sameAsREG-
bundle, allContiguousRBs},
interleaverSize                  ENUMERATED {n2, n3, n6},
(Interleaver size)
shiftIndex
    INTEGER(0..maxNrofPhysicalResourceBlocks-1)
    OPTIONAL
(Interleaver shift)
},
nonInterleaved                   NULL
},
tci-StatesPDCCH                  SEQUENCE(SIZE (1..maxNrofTCI-
StatesPDCCH)) OF TCI-StateId     OPTIONAL,
(QCL configuration information)
tci-PresentInDCI                 ENUMERATED {enabled}
                                 OPTIONAL,    -- Need S
}

In the 5G system, a control resource set may include $N_{RB}^{CORESET}$ RBs in the frequency domain, and may include $N_{symb}^{CORESET} \in \{1,2,3\}$ symbols in the time axis. One CCE may include 6 REGs, and a RIG may be defined as 1 RB for 1 OFDM symbol period. In one control resource set, REGs may be indexed in a time-first order, starting with REG index 0 from a first OFDM symbol, a lowest RB, of the control resource set.

The 5G system supports an interleaved scheme and a non-interleaved scheme as a method of transmitting a PDCCH. The base station may configure, for the terminal via higher layer signaling, whether to perform interleaved or non-interleaved transmission for each control resource set. Interleaving may be performed in units of REG bundles. An REG bundle may be defined as a set of one or multiple REGs. The terminal may determine a CCE-to-REG mapping scheme in a corresponding control resource set according to the following manner, depending on interleaved or non-interleaved transmission configured from the base station.

TABLE 7

The CCE-to-REG mapping for a control-resource set can be interleaved or non-interleaved and is described by REG bundles:
- REG bundle i is defined as REGs {iL, iL + 1, ..., iL + L 1} where L is the REG bundle size, i = 0,1, ..., $N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles {f(6j|L), f(6j|L + 1), ..., f(6j/L + 6/L − 1)} where f(·) is an interleaver
For non-interleaved CCE-to-REG mapping, L = 6 and f(x) = x.
For interleaved CCE-to-REG mapping. L ∈ {2,6}for $N_{symb}^{CORESET} = 1$ and L ∈ {$N_{symb}^{CORESET}$, 6} for $N_{symb}^{CORESET} \in \{2,3\}$. The interleaver is defined by
        c = 0,1, ..., C − 1
        C = $N_{REG}^{CORESET}/(LR)$
where R ∈{2,3,6}.

A basic unit of a downlink control channel, i.e., REG, may include both REs to which DCI is mapped and an area to which a demodulation reference signal (DMRS), i.e., a reference signal (may be interchangeably used with a reference signal (RS)) for decoding the REs, is mapped. Three DMRS REs may be included in one REG. The number of CCEs required to transmit a PDCCH may be 1, 2, 4, 8, or 16 depending on an aggregation level (AL), and different numbers of CCEs may be used to implement link adaptation of the downlink control channel. For example, if AL=L, a single downlink control channel may be transmitted via L CCEs.

The terminal needs to detect a signal without knowing information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined as a set of search spaces at all configured aggregation levels.

The search space may be classified into a common search space and a terminal-specific (UE-specific) search space. A certain group of terminals or all terminals may examine a common search space of the PDCCH in order to receive cell-common control information, such as dynamic scheduling for system information or a paging message. For example, the terminal may receive PDSCH scheduling assignment information for transmission of an SIB including cell operator information, etc. by examining a common search space of the PDCCH. Since a certain group of terminals or all terminals need to receive a PDCCH, the common search space may be defined as a set of predetermined CCEs. Scheduling assignment information for a UE-specific PDSCH or PUSCH may be received by examining a UE-specific search space of the PDCCH. The UE-specific search space may be defined UE-specifically, based on an identity of the terminal and functions of various system parameters.

In the 5G system, a parameter for a search space of a PDCCH may be configured by the base station for the terminal via higher layer signaling (e.g., an SIB, an MIB, and RRC signaling). For example, the base station may configure, for the terminal, the number of PDCCH candidates at each aggregation level L, a monitoring periodicity for a search space, a monitoring occasion in units of symbols in a slot for the search space, a search space type (common search space or UE-specific search space), a combination of an RNTI and a DCI format, which is to be monitored in the search space, a control resource set index for monitoring of the search space, etc. For example, the parameter for the PDCCH search space may include the following information.

TABLE 8

| | |
|---|---|
| SearchSpace ::= | SEQUENCE { |
| Identity of the search space. SearchSpaceId = 0 identifies the SearchSpace configured via PBCH (MIB) or ServingCellConfigCommon. | |
| searchSpaceId | |
| | SearchSpaceId, |
| (Search space identifier) | |
| control Resource SetId | |
| | ControlResource SetId, |
| (Control resource set identifier) | |
| monitoringSlotPeriodicityAndOffset | CHOICE { |
| (Monitoring slot level period) | |
| sl1 | |
| | NULL, |
| sl2 | |
| | INTEGER (0..1). |
| sl4 | |
| | INTEGER (0..3), |
| sl5 | |
| | INTEGER (0..4), |
| sl8 | |
| | INTEGER (0..7), |
| sl10 | |
| | INTEGER (0..9), |
| sl16 | |
| | INTEGER (0..15), |
| sl20 | |
| | INTEGER (0..19) |
| } | |
| | OPTIONAL, |
| duration (monitoring duration) | INTEGER (2..2559) |
| monitoringSymbolsWithinSlot | BIT STRING (SIZE (14)) |
| | OPTIONAL, |
| (Monitoring symbol in slot) | |
| nrofCandidates | |
| | SEQUENCE { |
| (The number of PDCCH candidates for each aggregation level) | |
| aggregationLevel 1 | ENUMERATED |
| {n0, n1, n2, n3, n4, n5, n6, n8}, | |
| aggregationLevel2 | ENUMERATED |
| {n0, n1, n2, n3, n4, n5, n6, n8}, | |
| aggregationLevel4 | ENUMERATED |
| {n0, n1, n2, n3, n4, n5, n6, n8}, | |

TABLE 8-continued

```
aggregationLevel8                ENUMERATED
{n0, n1, n2, n3, n4, n5, n6, n8},
aggregationLevel 16
                                 ENUMERATED {n0, n1, n2, n3,
                                 n4, n5, n6, n8}
},
searchSpaceType                  CHOICE
{
(Search space type)
Configures this search space as common search space (CSS)
and DCI formats to monitor.
common
                                 SEQUENCE {
(Common search space)
}
ue-Specific
                                 SEQUENCE {
(UE-specific search space)
Indicates whether the UE monitors in this USS for DCI
formats 0-0 and 1-0 or for
formats 0-1 and 1-1.
formats
                                 ENUMERATED {formats0-0-And-1-0,
                                 formats0-1-And-1-1},
...
}
```

According to the configuration information, the base station may configure one or multiple search space sets for the terminal. According to some embodiments, the base station may configure search space set 1 and search space set 2 for the terminal. The terminal may be configured to monitor DCI format A scrambled with an X-RNTI in the common search space in search space set 1, and may be configured to monitor DCI format B scrambled with a Y-RNTI in the UE-specific search space in search space set 2.

According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow definitions and uses below.

Cell RNTI (C-RNTI): For UE-specific PDSCH scheduling

Temporary cell RNTI (TC-RNTI): For UE-specific PDSCH scheduling

Configured scheduling RNTI (CS-RNTI): For semi-statically configured UE-specific PDSCH scheduling Random-Access RNTI (RA-RNTI): For PDSCH scheduling during random-access Paging RNTI (P-RNTI): For scheduling PDSCH on which paging is transmitted System Information RNTI (SI-RNTI): For scheduling PDSCH on which system information is transmitted Interruption RNTI (INT-RNTI): For indicating whether to puncture PDSCH Transmit power control for PUSCH RNTI (TPC-PUSCH-RNTI): For indicating power control command for PUSCH Transmit power control for PUCCH RNTI (TPC-PUCCH-RNTI): For indicating power control command for PUCCH Transmit power control for SRS RNTI (TPC-SRS-RNTI): For indicating power control command for SRS The DCI formats specified above may follow the definition below.

TABLE 9

| DCI format | Usage |
|---|---|
| 0_0 | Scheduling of PUSCH in one cell |
| 0_1 | Scheduling of PUSCH In one cell |
| 1_0 | Scheduling of PDSCH in one cell |
| 1_1 | Scheduling of PDSCH in one cell |
| 2_0 | Notifying a group of UEs of the slot form at |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, control resource set p and a search space of aggregation level L in control resource set s may be expressed as Equation below.

$$L \cdot \left\{ \left( Y_{p,n_{s,f}^\mu} + \left\lfloor \frac{m_{s,n_{CI}} \cdot N_{CCE,p}}{L \cdot M_{p,z,max}^{(L)}} \right\rfloor + n_{CI} \right) \bmod \lfloor N_{CCE,p}/L \rfloor \right\} + i \quad \text{[Equation 1]}$$

L: aggregation level
$n_{CI}$: carrier index
$N_{CCE,p}$: a total number of CCEs existing in control resource set p
$n_{s,f}^\mu$: slot index
$M_{p,s,max}^{(L)}$: the number of PDCCH candidates of aggregation level L
$m_{snCI}=0, \ldots, M_{p,s,max}^{(L)}-1$: indices of PDCCH candidates of aggregation level L
i=0, ..., L-1
$Y_{p,n_{s,f}^\mu}=(A_p \cdot Y_{p,n_{s,f}^\mu-1}) \bmod D$, $Y_{p,-1}=n_{RNTI}\neq 0$, $A_0=39827$, $A_1=39829$, $A_2=39839$, $D=65537$
$n_{RNTI}$: terminal identity A value of $Y\_(p,n_{s,f}^\mu)$ may correspond to 0 in a case of the common search space.

In a case of the UE-specific search space, a value of $Y\_(p,n_{s,f}^\mu)$ may correspond to a value that varies depending on a time index and the identity (ID configured for the terminal by the base station or C-RNTI) of the terminal.

Hereinafter, detailed descriptions will be provided for a method of configuring a transmission configuration indication (TCI) state, which is a means for indicating or exchanging quasi co-location (QCL) information between a terminal and a base station in a 5G communication system. The base station is able to configure and indicate a TCI state between two different RSs or channels via appropriate signaling, so as to inform about a QCL relationship between the different RSs or channels. Different RSs or channels being QCLed indicates that, when a channel is estimated via a reference RS antenna port A (reference RS #A) and another target RS antenna port B (target RS #B) which are in a QCL relationship, the terminal is allowed to apply some or all of large-scale channel parameters estimated in the antenna port A to channel measurement from the antenna port B. For QCL, it may be necessary to associate different parameters depending on situations, such as 1) time tracking affected by an average delay and a delay spread, 2) frequency tracking affected by a Doppler shift and a Doppler spread, 3) radio resource management (RRM) affected by an average gain, and 4) beam management (BM) affected by a spatial parameter. Accordingly, NR supports four types of QCL relationships as shown in Table 10 below.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters, such as angle of arrival (AoA), power angular spectrum (PAS) of AoA, angle of departure (AoD), PAS of AoD, transmission/reception channel correlation, transmission/reception beamforming, and spatial channel correlation.

The QCL relationship is configurable for the terminal via RRC parameter TCI-State and QCL-Info, as shown in Table 11 below. Referring to Table 11, the base station may configure one or more TCI states for the terminal so as to inform about up to two QCL relationships (qcl-Type1 and qcl-Type2) for an RS, i.e., a target RS, referring to IDs of the TCI states. Each piece of QCL information (QCL-Info) included in each TCI state includes a serving cell index and a BWP index of a reference RS indicated by corresponding QCL information, a type and an ID of the reference RS, and a QCL type, as shown in Table 10.

TABLE 11

```
TCI-State ::=                    SEQUENCE {
tci-StateId                      TCI-StateId,
(ID of corresponding TCI state)
qcl-Type1                        QCL-Info,
(QCL information of first reference RS of RS (target RS) referring to corresponding
TCI state ID)
qcl-Type2                        QCL-Info           OPTIONAL,
   -- Need R
(QCL information of second reference RS of RS (target RS) referring to corresponding
TCI state ID)
...
}
QCL-Info ::=                     SEQUENCE {
cell                             ServCellIndex      OPTIONAL, --
Need R
(serving cell index of reference RS indicated by corresponding QCL information)
bwp-Id                           BWP-Id             OPTIONAL, --
Cond CSI-RS-Indicated
(BWP index of reference RS indicated by corresponding QCL information)
referenceSignal                  CHOICE {
csi-rs                           NZP-CSI-RS-ResourceId,
ssb                              SSB-Index
(either CSI-RS ID or SSB ID indicated by corresponding QCL information)
},
qcl-Type                         ENUMERATED {typeA, typeB, typeC, typeD},
...
}
```

In order to guarantee channel estimation performance of the terminal, types of a target RS and a reference RS that the base station is able to configure for TCI and QCL may be determined according to a specific rule.

For a periodic CSI-RS resource in an NZP-CSI-RS-ResourceSet configured with higher layer parameter trs- Info, the UE shall expect that a TCI-State indicates one of the following quasi co-location type(s):
- "QCL-TypeC" with an SS/PBCH block and, when applicable, "QCL-TypeD" with the same SS/PBCH block, or
- "QCL-TypeC" with an SS/PBCH block and, when applicable, "QCL-TypeD" with a CSI-RS resource in an NZP-CSI-RS-ResourceSet configured with higher layer parameter repetition, or For an aperiodic CSI-RS resource in an NZP-CSI-RS-ResourceSet configured with higher layer parameter trs-Info, the UE shall expect that a TCI-State indicates "QCL-TypeA" with a periodic CSI-RS resource in an NZP-CSI-RS-ResourceSet configured with higher layer parameter trs-Info and, when applicable, "QCL-TypeD" with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s):
- "QCL-TypeA" with a CSI-RS resource in an NZP-CSI-RS-ResourceSet configured with higher layer parameter trs-Info and, when applicable, "QCL-TypeD" with the same CSI-RS resource, or
- "QCL-TypeA" with a CSI-RS resource in an NZP-CSI-RS-ResourceSet configured with higher layer parameter trs-Info and, when applicable, "QCL-TypeD" with an SS/PBCH block, or
- "QCL-TypeA" with a CSI-RS resource in an NZP-CSI-RS-ResourceSet configured with higher layer parameter trs-Info and, when applicable, "QCL-TypeD" with a CSI-RS resource in an NZP-CSI-RS-ResourceSet configured with higher layer parameter repetition, or
- "QCL-TypeB" with a CSI-RS resource in an NZP-CSI-RS-ResourceSet configured with higher layer parameter trs-Info when "QCL-TypeD" is not applicable.

For a CSI-RS resource in an NZP-CSI-RS-ResourceSet configured with higher layer parameter repetition, the UE shall expect that a TCI-State indicates one of the following quasi co-location type(s):
- "QCL-TypeA" with a CSI-RS resource in an NZP-CSI-RS-ResourceSet configured with higher layer parameter trs-Info and, when applicable, "QCL-TypeD" with the same CSI-RS resource, or
- "QCL-TypeA" with a CSI-RS resource in an NZP-CSI-RS-ResourceSet configured with higher layer parameter trs-Info and, when applicable, "QCL-TypeD" with a CSI-RS resource in an NZP-CSI-RS-ResourceSet configured with higher layer parameter repetition, or
- "QCL-TypeC" with an SS/PBCH block and, when applicable, "QCL-TypeD" with the same SS/PBCH block.

For the DM-RS of PDCCH, the UE shall expect that a TCI-State indicates one of the following quasi co-location type(s):
- "QCL-TypeA" with a CSI-RS resource in an NZP-CSI-RS-ResourceSet configured with higher layer parameter trs-Info and, when applicable, "QCL-TypeD" with the same CSI-RS resource, or
- "QCL-TypeA" with a CSI-RS resource in an NZP-CSI-RS-ResourceSet configured with higher layer parameter trs-Info and, when applicable, "QCL-TypeD" with a CSI-RS resource in an NZP-CSI-RS-ResourceSet configured with higher layer parameter repetition, or
- "QCL-TypeA" with a CSI-RS resource in an NZP-CSI-RS-ResourceSet configured without higher layer parameter trs-Info and without higher layer parameter repetition and, when applicable, "QCL-TypeD" with the same CSI-RS resource.

For the DM-RS of PDSCH, the UE shall expect that a TCI-State indicates one of the following quasi co-location type(s):
- "QCL-TypeA" with a CSI-RS resource in an NZP-CSI-RS-ResourceSet configured with higher layer parameter trs-Info and, when applicable, "QCL-TypeD" with the same CSI-RS resource, or
- "QCL-TypeA" with a CSI-RS resource in an NZP-CSI-RS-ResourceSet configured with higher layer parameter trs-Info and, when applicable, "QCL-TypeD" with a CSI-RS resource in an NZP-CSI-RS-ResourceSet configured with higher layer parameter repetition, or
- "QCL-TypeA" with a CSI-RS resource in an NZP-CSI-RS-ResourceSet configured without higher layer parameter trs-Info and without higher layer parameter repetition and, when applicable, "QCL-TypeD" with the same CSI-RS resource.

Hereinafter, time and frequency resource allocation methods for data transmission in NR will be described.

Figure 6:
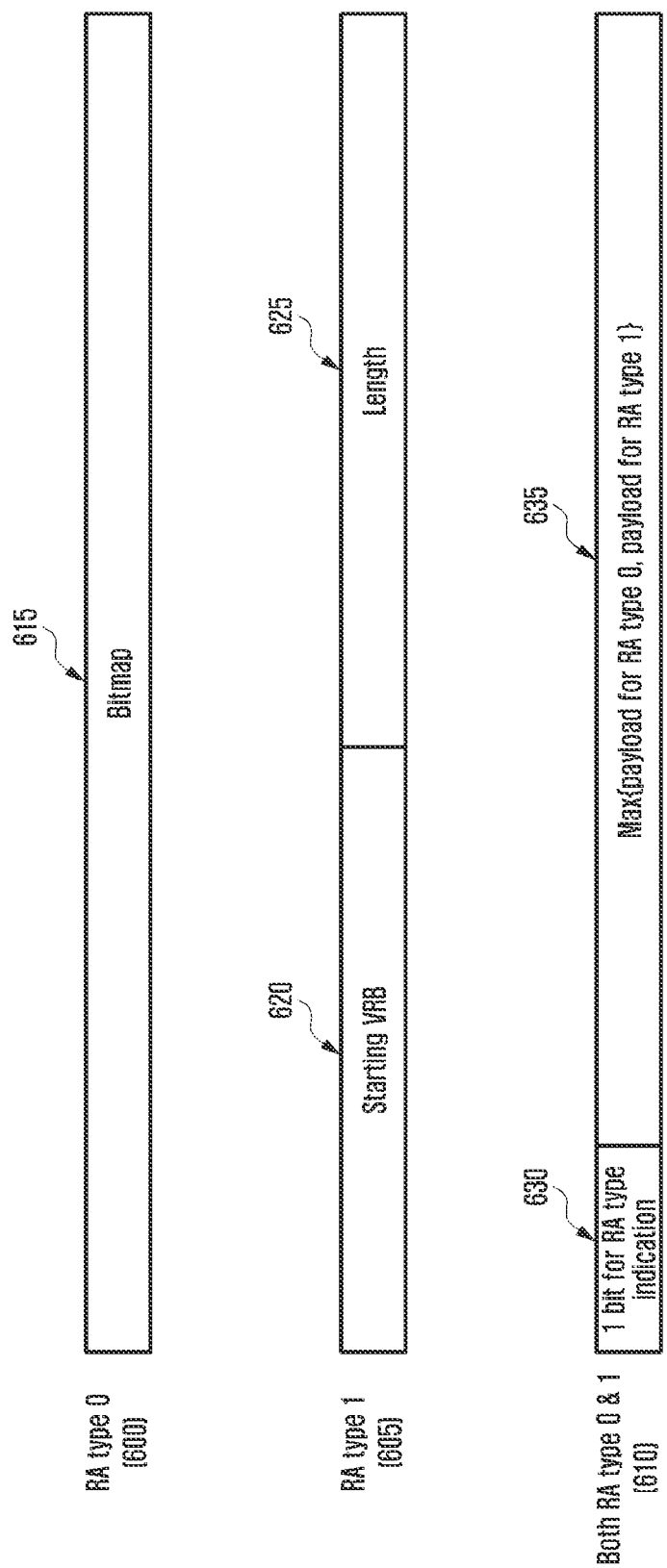
FIG. 6 is a diagram illustrating methods of frequency axis resource allocation in the 5G wireless communication system according to an embodiment of the disclosure.

In NR, the following detailed frequency axis resource allocation (frequency domain resource allocation (FD-RA)) methods may be provided in addition to frequency axis resource candidate allocation via BWP indication. FIG. 6 is a diagram illustrating an example of frequency axis resource allocation of a PDSCH in the wireless communication system according to an embodiment of the disclosure.

FIG. 6 is a diagram illustrating three frequency axis resource allocation methods of type 0 600, type 1 605, and dynamic switch 610 which are configurable via a higher layer in NR.

Referring to FIG. 6, if a terminal is configured 600, via higher layer signaling, to use only resource type 0, some downlink control information (DCI) for allocation of a PDSCH to the terminal has a bitmap including $N_{RBG}$ bits. Conditions for this will be described later. In this case, $N_{RBG}$ refers to the number of resource block groups (RBGs) determined as shown in [Table 12] below according to a BWP size assigned by a BWP indicator and a higher layer parameter (or higher layer signaling parameter) of rbg-Size, and data is transmitted in an RBG indicated by 1 by the bitmap.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the terminal is configured 605, via higher layer signaling, to use only resource type 1, some DCI for allocation of the PDSCH to the terminal has frequency axis resource allocation information including $\lceil \log_2(N^{DL,BWP}_{RB}(N^{DL,BWP}_{RB}+1)/2) \rceil$ bits. Conditions for this will be described later. Based on this, the base station may configure a starting VRB 620 and a length 625 of a frequency axis resource contiguously allocated therefrom.

If the terminal is configured 610, via higher layer signaling, to use both resource type 0 and resource type 1, some DCI for allocation of the PDSCH to the corresponding terminal has frequency axis resource allocation information including bits of a large value 635 among a payload 615 for configuration of resource type 0 and payloads 620 and 625 for configuration of resource type 1. Conditions for this will be described later. In this case, one bit may be added to a first part (MSB) of the frequency axis resource allocation information in the DCI, and if the corresponding bit is 0, use of resource type 0 may be indicated, and if the corresponding bit is 1, use of resource type 1 may be indicated.

Figure 7:
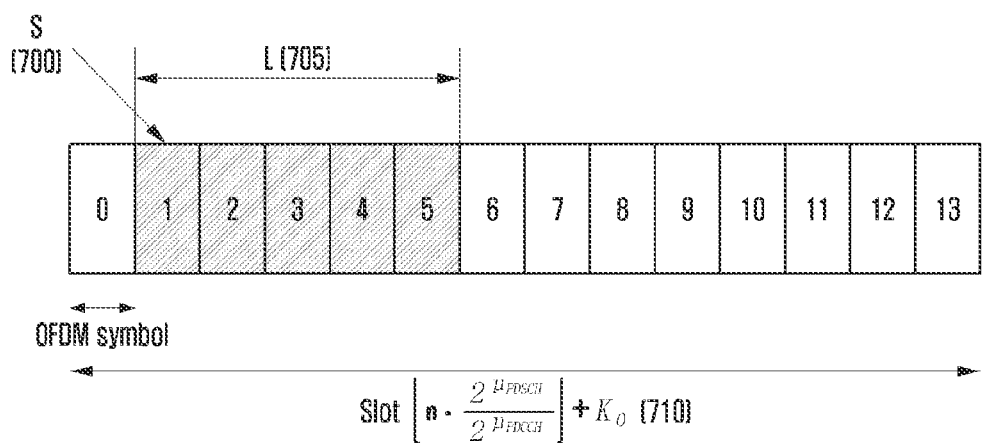
FIG. 7 is a diagram illustrating an example of time axis resource allocation in NR according to an embodiment of the disclosure.

FIG. 7 is a diagram illustrating an example of a time axis resource allocation of a physical downlink shared channel (PDSCH) in the wireless communication system according to an embodiment of the disclosure.

Referring to FIG. 7, a base station may indicate a time axis position of a PDSCH resource according to an OFDM symbol start position 700 in one slot 710 and a length 705 thereof dynamically indicated via DCI, and a scheduling offset $K_0$ value and subcarrier spacings (SCSs) (PPDSCH and PPDCCH) of a data channel and a control channel, which are configured using a higher layer.

Figure 8:
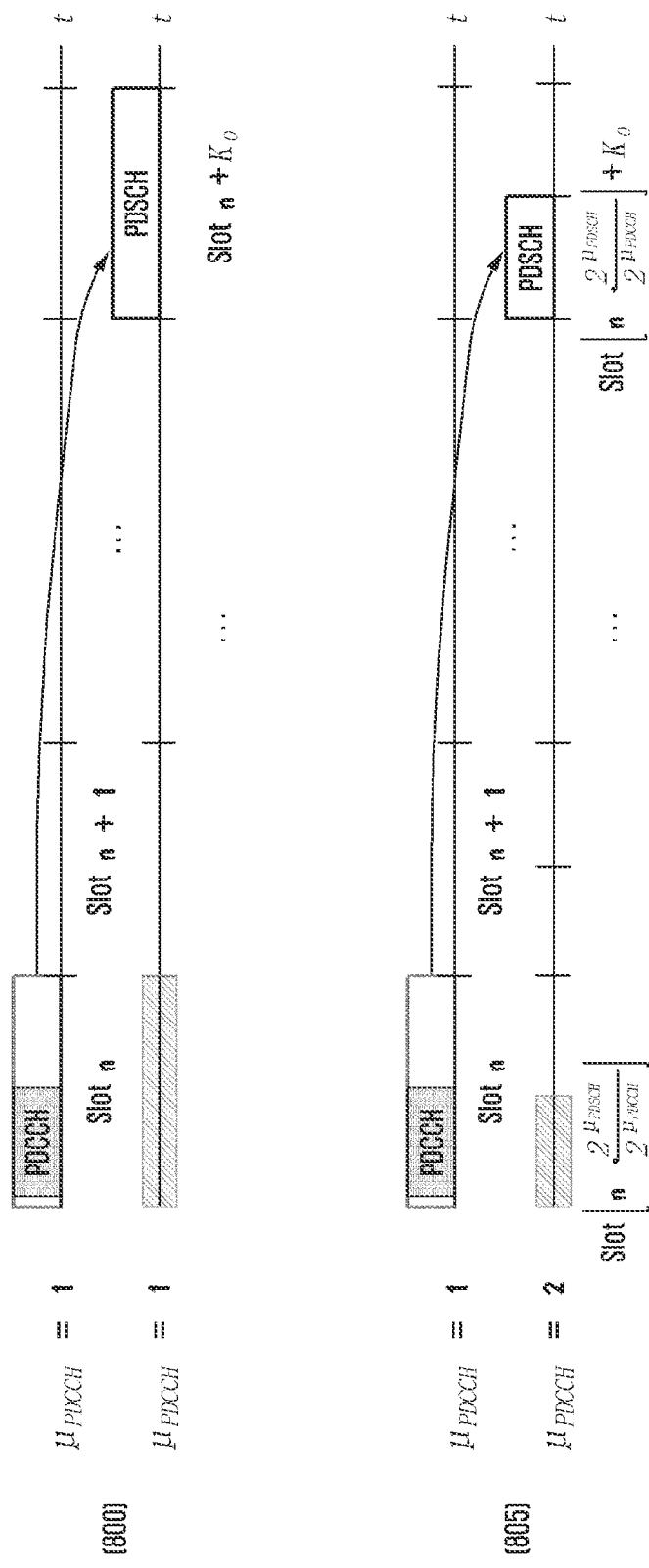
FIG. 8 is a diagram illustrating an example of time axis resource allocation according to subcarrier spacings of a data channel and a control channel in a wireless communication system according to an embodiment of the disclosure.

FIG. 8 is a diagram illustrating an example of time axis resource allocation according to subcarrier spacings of a data channel and a control channel in the wireless communication system according to an embodiment of the disclosure.

Referring to FIG. 8, if a subcarrier spacing of a data channel is the same as a subcarrier spacing of a control channel ($\mu_{PDSCH}=\mu_{PDCCH}$) as in 800, the slot numbers for the data channel and the control channel are the same, and therefore a base station and a terminal may identify a scheduling offset according to a predetermined slot offset $K_0$. On the other hand, if the subcarrier spacings (SCSs) of the data channel and the control channel are different ($\mu_{PDSCH} \neq \mu_{PDCCH}$) as in 805, the slot numbers for the data channel and the control channel are different, and therefore the base station and the terminal may identify a scheduling offset according to a predetermined slot offset $K_0$, based on the subcarrier spacing of a PDCCH.

Although an offset analysis method for the case where the subcarrier spacings between the data channel and the control channel are the same or are different has been described in FIG. 8, the above method is not limited thereto. Similarly, the method is also applicable to a case where subcarrier spacings of different channels or reference signals are the same or are different, such as a case where subcarrier spacings between a CSI-RS and the control channel or subcarrier spacings between an SRS and the control channel are the same or are different.

In order for the terminal to efficiently receive a control channel, NR provides various types of DCI formats as shown in Table 9 below depending on purposes.

For example, the base station may use DCI format 0_0 or DCI format 0_1 to allocate (schedule) a PDSCH to one cell.

When transmitted together with a CRC scrambled by a cell radio network temporary identifier (C-RNTI), a configured scheduling RNTI (CS-RNTI), or a new-RNTI, DCI format 0_1 includes at least the following information:

Identifier for DCI formats (1 bit): DCI format indicator that is always configured to 1

Frequency domain resource assignment (NRBG bits or $\lceil \log_2(N^{DL,BWP}_{RB}(N^{DL,BWP}_{RB}+1)/2) \rceil$ bits): Indicating frequency axis resource allocation, wherein when DCI format 1_0 is monitored in a UE-specific search space, $N_{RB}^{DL,BWP}$ indicates a size of an active DL BWP, and in other cases, $N_{RB}^{DL,BWP}$ indicates a size of an initial DL BWP. NRBG is the number of resource block groups. For a detailed method, the frequency axis resource allocation is referred to.

Time domain resource assignment (0 to 4 bits): Indicating time axis resource allocation according to the above description VRB-to-PRB mapping (1 bit): 0 indicates non-interleaved VRB-to-PRB mapping, and 1 indicates interleaved VRP-to-PRB mapping.

Modulation and coding scheme (5 bits): Indicating a modulation order and a coding rate used for PDSCH transmission New data indicator (1 bit): Indicating whether a PDSCH corresponds to initial transmission or retransmission, according to toggling Redundancy version (2 bits): Indicating a redundancy version used for PDSCH transmission HARQ process number (4 bits): Indicating an HARQ process number used for PDSCH transmission Downlink assignment index (2 bits): DAI indicator TPC command for scheduled PUCCH (2 bits): PUCCH power control indicator PUCCH resource indicator (3 bits): PUCCH resource indicator which indicates one of eight resources configured via a higher layer PDSCH-to-HARQ_feedback timing indicator (3 bits): HARQ feedback timing indicator which indicates one of eight feedback timing offsets configure via a higher layer DCI format 1_1 includes at least the following information in a case where DCI format 1_1 is transmitted together with a CRC scrambled by a cell radio network temporary identifier (C-RNTI), a configured scheduling RNTI (CS-RNTI), or a new-RNTI.

Identifier for DCI formats (1 bit): DCI format indicator which is always configured to 1

Carrier indicator (0 or 3 bits): Indicating a CC (or cell) in which a PDSCH allocated by corresponding DCI is transmitted Bandwidth part indicator (0, 1, or 2 bits): Indicating a BWP via which a PDSCH allocated by corresponding DCI is transmitted Frequency domain resource assignment (a payload is determined according to the frequency axis DL,BWP resource allocation): Indicating frequency axis resource allocation, wherein $N_{RB}^{DL,BWP}$ indicates a size of an active DL BWP. For a detailed method, the frequency axis resource allocation is referred to.

Time domain resource assignment (0 to 4 bits): Indicating time axis resource allocation according to the above description VRB-to-PRB mapping (0 or 1 bit): 0 indicates non-interleaved VRB-to-PRB mapping, and 1 indicates interleaved VRP-to-PRB mapping. 0 bit corresponds to a case in which frequency axis resource allocation is configured to resource type 0.

PRB bundling size indicator (0 or 1 bit): 0 bit if a higher layer parameter of prb-BundlingType is not configured or is configured to "static", and 1 bit if a higher layer parameter of prb-BundlingType is configured to "dynamic"

Rate matching indicator (0, 1, or 2 bits): Indicating a rate matching pattern

ZP CSI-RS trigger (0, 1, or 2 bits): Indicator for triggering an aperiodic ZP CSI-RS For transport block 1:

Modulation and coding scheme (5 bits): Indicating a modulation order and a coding rate used for PDSCH transmission New data indicator (1 bit): Indicating whether a PDSCH corresponds to initial transmission or retransmission, according to toggling Redundancy version (2 bits): Indicating a redundancy version used for PDSCH transmission For transport block 2:
Modulation and coding scheme (5 bits): Indicating a modulation order and a coding rate used for PDSCH transmission
New data indicator (1 bit): Indicating whether a PDSCH corresponds to initial transmission or retransmission, according to toggling
Redundancy version (2 bits): Indicating a redundancy version used for PDSCH transmission
HARQ process number (4 bits): Indicating an HARQ process number used for PDSCH transmission
Downlink assignment index (0, 2, or 4 bits): Downlink assignment index (DAI) indicator
TPC command for scheduled PUCCH (2 bits): PUCCH power control indicator
PUCCH resource indicator (3 bits): PUCCH resource indicator which indicates one of eight resources configured via a higher layer
PDSCH-to-HARQ_feedback timing indicator (3 bits): HARQ feedback timing indicator which indicates one of eight feedback timing offsets configure via a higher layer
Antenna port (4, 5, or 6 bits): Indicating a DMRS port and a CDM group without data
Transmission configuration indication (0 or 3 bits): TCI indicator
SRS request (2 or 3 bits): SRS transmission request indicator
CBG transmission information (0, 2, 4, 6, or 8 bits): Indicator indicating whether to transmit code block groups in an allocated PDSCH. 0 indicates that a corresponding CBG is not transmitted, and 1 indicates that a corresponding CBG is transmitted.
CBG flushing out information (0 or 1 bit): Indicator indicating whether previous CBGs are contaminated. 0 indicates that previous CBGs might be contaminated, and 1 indicates that previous CBGs are available (combinable) when receiving retransmission.
DMRS sequence initialization (0 or 1 bit): DMRS scrambling ID selection indicator The number of pieces of DCI having different sizes that the terminal is capable of receiving for each slot in a corresponding cell is up to 4. The number of pieces of DCIs having different sizes, which are scrambled with a C-RNTI that the terminal is capable of receiving for each slot in a corresponding cell, is up to 3.

Here, antenna port indication may be indicated via following Tables 13 to 16.

TABLE 13

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 14

Antenna port(s) (1000 + DMRS port), dmrs-Type = 1 , maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Numbers of DMRS CDM group(s) without data | DMRS port(s) | Numbers of front-load symbols | Value | Numbers of DMRS CDM group(s) without data | DMRS port(s) | Numbers of front-load symbols |
| 0 | 1 | 0 | 1 | 0 | 2 | 0-4 | 2 |
| 1 | 1 | 1 | 1 | 1 | 2 | 0, 1, 2, 3, 4, 5 | 2 |
| 2 | 1 | 0, 1 | 1 | 2 | 2 | 0, 1, 2, 3, 4, 8, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |

TABLE 14-continued

Antenna port(s) (1000 + DMRS port), dmrs-Type = 1 , maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Numbers of DMRS CDM group(s) without data | DMRS port(s) | Numbers of front-load symbols | Value | Numbers of DMRS CDM group(s) without data | DMRS port(s) | Numbers of front-load symbols |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 23 | 2 | 2, 3, 6, 7 | 2 | | | | |
| 30 | 2 | 0, 2, 4, 6 | 2 | | | | |
| 31 | Reserved | Reserved | Reserved | | | | |

TABLE 15

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | | | One codeword: Codeword 0 enabled, Codeword 1 disabled | | | Two codewords: Codeword 0 enabled, Codeword 1 enabled | |
|---|---|---|---|---|---|---|---|---|---|---|---|
| Value | Number of DMRS CDM group(s) without data | DMRS port(s) | Value | Number of DMRS CDM group(s) without data | DMRS port(s) | Value | Number of DMRS CDM group(s) without data | DMRS port(s) | Value | Number of DMRS CDM group(s) without data | DMRS port(s) |
| 0 | 1 | 0 | 0 | 3 | 0-4 | 13 | 3 | 2 | | | |
| 1 | 1 | 1 | 1 | 3 | 0-5 | 14 | 3 | 3 | | | |
| 2 | 1 | 0, 1 | 2-31 | reserved | reserved | 15 | 3 | 4 | | | |
| 3 | 2 | 0 | | | | 16 | 3 | 5 | | | |
| 4 | 2 | 1 | | | | 17 | 3 | 0, 1 | | | |
| 5 | 2 | 2 | | | | 18 | 3 | 2, 3 | | | |
| 6 | 2 | 3 | | | | 19 | 3 | 4, 5 | | | |
| 7 | 2 | 0, 1 | | | | 20 | 3 | 0-2 | | | |
| 8 | 2 | 2, 3 | | | | 21 | 3 | 3-5 | | | |
| 9 | 2 | 0-2 | | | | 22 | 3 | 0-3 | | | |
| 10 | 2 | 0-3 | | | | 23 | 2 | 0, 2 | | | |
| 11 | 3 | 0 | | | | 24-31 | Reserved | Reserved | | | |
| 12 | 3 | 1 | | | | | | | | | |

TABLE 16-1

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |

TABLE 16-1-continued

| Antenna port(s) (1000 + DMRS port), dmrs-Type = 2, maxLength = 2 ||||||||
| One codeword: Codeword 0 enabled, Codeword 1 disabled |||| Two Codewords: Codeword 0 enabled, Codeword 1 enabled ||||
| Value | Number of DMRS CDM group(s) without data | DMRS port(s) | Number of front-load symbols | Value | Number of DMRS CDM group(s) without data | DMRS port(s) | Number of front-load symbols |
| --- | --- | --- | --- | --- | --- | --- | --- |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |

TABLE 16-2

| Antenna port(s) (1000 + DMRS port), dmrs-Type = 2, maxLength = 2 ||||||||
| One codeword: Codeword 0 enabled, Codeword 1 disabled |||| Two Codewords: Codeword 0 enabled, Codeword 1 enabled ||||
| Value | Number of DMRS CDM group(s) without data | DMRS port(s) | Number of front-load symbols | Value | Number of DMRS CDM group(s) without data | DMRS port(s) | Number of front-load symbols |
| --- | --- | --- | --- | --- | --- | --- | --- |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |

TABLE 16-2-continued

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 3 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

It is preferable to understand that Tables 16-1 and 16-2 are connected to each other. Table 13 is used when dmrs-type is indicated as 1 and maxLength is indicated as 1, and Table 14 is used when dmrs-Type=1 and maxLength=2. A DMRS port to be used is indicated based on Table 15 if dmrs-type=2 and maxLength=1, and is indicated based on Table 16-1 and Table 16-2 if drms-tpye is 2 and maxLength is 2.

The numbers 1, 2, and 3 indicated by "Number of DMRS CDM group(s) without data" in the tables denote CDMR groups {0}, {0, 1}, and {0, 1, 2}, respectively. DMRS port(s) correspond to sequentially arranged indices of ports that are used. The antenna port is indicated as DMRS port+1000. The CDM group of the DMRS is associated with a method of generating a DMRS sequence and the antenna ports, as shown in Tables 17 and 18. Table 17 shows parameters when dmrs-type=1, and Table 18 shows parameters when dmrs-type=2.

TABLE 17

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |

TABLE 17-continued

| CDM group | | | $w_f(k')$ | | $w_t(l')$ | |
|---|---|---|---|---|---|---|
| p | λ | Δ | k' = 0 | k' = 1 | l' = 0 | l' = 1 |
| 1006 | 1 | 1 | +1 | +1 | +1 | −1 |
| 1007 | 1 | 1 | +1 | −1 | +1 | −1 |

TABLE 18

| COM group | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The DMRS sequence according to respective parameters is determined by Equation 2 below.

$$a_{k,l}^{(p,\mu)} = \beta_{PDSCH}^{DMRS} w_f(k') w_t(l') r(2n + k') \quad \text{[Equation 2]}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Figure 9:
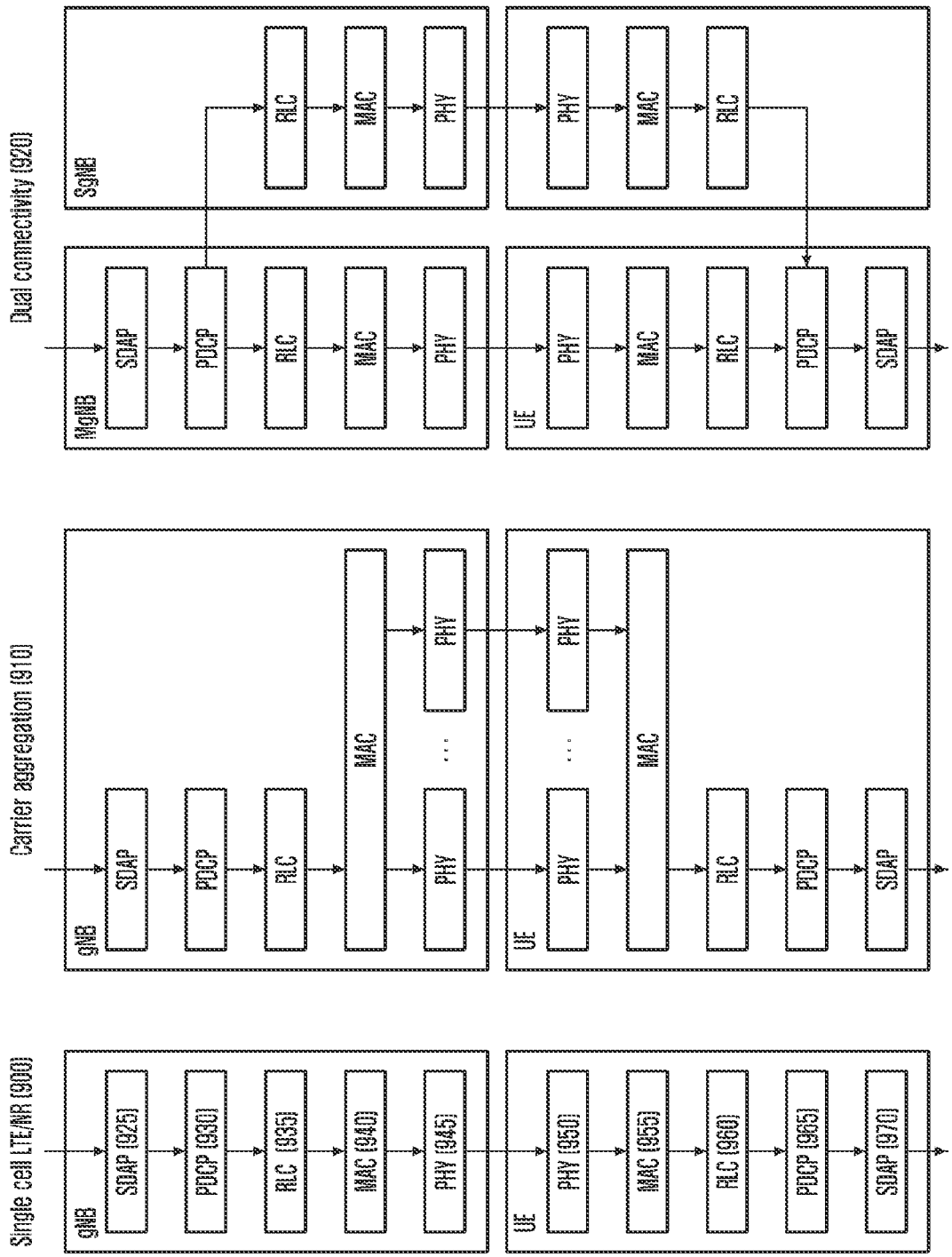
FIG. 9 is a diagram illustrating radio protocol structures of a terminal and a base station in single cell, carrier aggregation, and dual connectivity situations, according to an embodiment of the disclosure.

FIG. 9 is a diagram illustrating radio protocol structures of a terminal and a base station in single cell, carrier aggregation, and dual connectivity situations, according to an embodiment of the disclosure.

Referring to FIG. 9, radio protocols of the next-generation mobile communication system may include NR service data adaptation protocols (SDAPs) 925 and 970, NR packet data convergence protocols (PDCPs) 930 and 965, NR radio link controls (RLCs) 935 and 960, and NR medium access controls (MACs) 940 and 955 in a terminal and an NR base station, respectively.

Main functions of the NR SDAPs 925 and 970 may include some of the following functions.
  User data transfer function (transfer of user plane data)
  Function of mapping a QoS flow and a data bearer for an uplink and a downlink (mapping between a QoS flow and a DRB for both DL and UL)
  Function of marking a QoS flow ID in an uplink and a downlink (marking QoS flow ID in both DL and UL packets)
  Function of mapping reflective QoS flows to data bearers for uplink SDAP PDUs (reflective QoS flow to DRB mapping for the UL SDAP PDUs)

For an SDAP layer device, the terminal may be configured, via a RRC message, whether to use a header of the SDAP layer device or use a function of the SDAP layer device for each PDCP layer device, for each bearer, or for each logical channel. When the SDAP header is configured, the base station may indicate, using a 1-bit NAS reflective QoS configuration indicator and a 1-bit AS reflective QoS configuration indicator of the SDAP header, the terminal to update or reconfigure mapping information for the QoS flows and the data bearers in uplink and downlink. The SDAP header may include QoS flow ID information indicating QoS. The QoS information may be used as a data processing priority, scheduling information, etc. to support a smooth service.

Main functions of the NR SDAPs 930 and 965 may include some of the following functions.
  Header compression and decompression function (header compression and decompression: ROHC only)
  User data transmission function (transfer of user data)
  Sequential transfer function (in-sequence delivery of upper layer PDUs)
  Non-sequential transfer function (out-of-sequence delivery of upper layer PDUs)
  Reordering function (PDCP PDU reordering for reception)
  Duplicate detection function (duplicate detection of lower layer SDUs)
  Retransmission function (retransmission of PDCP SDUs)
  Encryption and decryption function (ciphering and deciphering)
  Timer-based SDU discard function (timer-based SDU discard in uplink)

In the above, the reordering function of an NR PDCP device refers to a function of rearranging the order of PDCP PDUs, which are received in a lower layer, in the order based on PDCP sequence numbers (SN), may include a function of transferring data to a higher layer in the rearranged order or may include a function of directly transferring data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR SDAPs 935 and 960 may include some of the following functions.
  Data transmission function (transfer of upper layer PDUs)
  Sequential transfer function (in-sequence delivery of upper layer PDUs)
  Non-sequential transfer function (out-of-sequence delivery of upper layer PDUs)
  ARQ function (error correction through ARQ)
  Concatenation, segmentation, and reassembly function (concatenation, segmentation and reassembly of RLC SDUs)
  Re-segmentation function (re-segmentation of RLC data PDUs)
  Reordering function (reordering of RLC data PDUs)
  Duplicate detection function (duplicate detection)
  Error detection function (protocol error detection)
  RLC SDU discard function (RLC SDU discard)
  RLC re-establishment function (RLC re-establishment)

In the above, the in-sequence delivery function of an NR RLC device refers to a function of delivering RLC SDUs, which are received from a lower layer, to a higher layer in order, wherein the in-sequence delivery function may include a function of, when originally one RLC SDU is divided into multiple RLC SDUs and then received, reassembling the divided RLC SDUs and delivering the same, may include a function of rearranging the received RLC PDUs on the basis of RLC sequence numbers (SNs) or PDCP sequence numbers (SNs), may include a function of rearranging the order and recording lost RLC PDUs, may include a function of reporting states of the lost RLC PDUs to a transmission side, may include a function of requesting to retransmit the lost RLC PDUs, and may include a function of, when there are lost RLC SDUs, delivering only RLC SDUs before the lost RLC SDUs to the higher layer in order. Alternatively, the in-sequence delivery function may include a function of, although there is a lost RLC SDU, if a predetermined timer has expired, delivering all RLC SDUs received before starting of the timer to the higher layer in order, or may include a function of, although there is a lost RLC SDU, if a predetermined timer has expired, delivering all RLC SDUs received up to the present time to the higher layer in order. In the above, the RLC PDUs may be processed in the order of reception thereof (in the order of arrival regardless of the order of the sequence numbers or serial numbers) and may be transferred to the PDCP device regardless of the order (out-of-sequence delivery). In a case where a received RLC PDU is a segment, segments stored in a buffer or to be received at a later time may be received, reconfigured into one complete RLC PDU, processed, and then may be transferred to the PDCP device. The NR RLC layer may not include a concatenation function, and the function may be performed in an NR MAC layer or may be replaced with a multiplexing function of the NR MAC layer.

In the above, the out-of-sequence delivery function of the NR RLC device refers to a function of directly delivering the RLC SDUs received from the lower layer to a higher layer regardless of order, and may include a function of, when originally one RLC SDU is divided into multiple RLC SDUs and then received, reassembling the divided RLC SDUs and then delivering the same, and may include a function of storing the RLC SN or the PDCP SN of the received RLC PDUs and arranging the same so as to record the lost RLC PDUs.

The NR MACs 940 and 955 may be connected to multiple NR RLC layer devices included in one terminal, and main functions of the NR MACs may include some of the following functions.

- Mapping function (mapping between logical channels and transport channels)
- Multiplexing and demultiplexing function (multiplexing/demultiplexing of MAC SDUs)
- Scheduling information reporting function (scheduling information reporting)
- HARQ function (error correction through HARQ)
- Function of priority handling between logical channels (priority handling between logical channels of one UE)
- Function of adjusting priority between UEs (priority handling between UEs by means of dynamic scheduling)
- MBMS service identification function (MBMS service identification)
- Transmission format selection function (transport format selection)
- Padding function (padding)

NR PHY layers 945 and 950 may perform channel coding and modulation of higher layer data, make the channel coded and modulated higher layer data into OFDM symbols, and transmit the OFDM symbols via a radio channel, or may perform demodulation and channel-decoding of the OFDM symbols received through the radio channel so as to transfer the same to the higher layer. The detailed structure of the radio protocol structure may be variously changed according to a carrier (or cell) operating method. For example, when the base station transmits, based on a single carrier (or cell), data to the terminal, the base station and the terminal use a protocol structure having a single structure for each layer, as shown in 900. On the other hand, when the base station transmits data to the terminal, based on carrier aggregation (CA) using multiple carriers in a single TRP, the base station and the terminal use a protocol structure in which up to the RLC layer has a single structure but the PHY layer is multiplexed via the MAC layer, as shown in 910. As another example, when the base station transmits data to the terminal, based on dual connectivity (DC) using multiple carriers in multiple TRPs, the base station and the terminal use a protocol structure in which up to the RLC has a single structure but the PHY layer is multiplexed via the MAC layer, as shown in 920.

In LTE and NR, the terminal has a procedure of reporting capability supported by the terminal to a corresponding base station while being connected to a serving base station. This will be referred to as "UE capability (reporting)" in the following description. The base station may transfer, to a connected terminal, a UE capability enquiry message for requesting capability reporting. The message may include a request for terminal capability for each RAT type by the base station. The request for each RAT type may include frequency band information for requesting of the UE capability. The UE capability enquiry message may be used to request multiple RAT types in one RRC message container, or the base station may transfer the UE capability enquiry message including a request for each RAT type multiple times to the terminal. That is, the UE capability enquiry may be repeated multiple times, and the terminal may configure a UE capability information message corresponding thereto and report the same multiple times. In the next-generation mobile communication system, a request for terminal capability may be performed with respect to MR-DC, as well as NR, LTE, and EN-DC. For reference, the UE capability enquiry message is generally transmitted in the initial stage after the terminal is connected, but the base station may request the UE capability under any condition as necessary.

As described above, the terminal having received, from the base station, a request for a UE capability report configures UE capability according to RAT type and band information requested from the base station. Hereinafter, a method of configuring UE capability by the terminal in the NR system is described.

1. If a terminal receives, from a base station, a list of LTE and/or NR bands via a UE capability, the terminal configures a band combination (BC) for EN-DC and NR stand-alone (SA). That is, the terminal configures a candidate list of a BC for EN-DC and NR SA, based on the bands requested from the base station via FreqBandList. The bands have priorities in the order described in FreqBandList.

2. If the base station requests a UE capability report by setting an "eutra-nr-only" flag or an "eutra" flag, the terminal completely removes NR SA BCs from the configured candidate list of Bcs. This may occur only when the LTE base station (eNB) requests "eutra" capability.

3. Thereafter, the terminal removes fallback BCs from the candidate list of BCs configured in the above operation. Here, a fallback BC corresponds to a case in which a band corresponding to at least one SCell is removed from a certain super set BC, and the fallback BC can be omitted because the super set BC is able to cover the same. This operation is also applied in multi-RAT dual connectivity (MR-DC), i.e., LTE bands. The remaining BCs after this operation constitute a final "candidate BC list".

4. The terminal selects BCs to be reported by selecting BCs conforming to the requested RAT type from the final "candidate BC list". In this operation, the terminal configures supportedBandCombinationList in a predetermined order. That is, the terminal configures the BCs and UE capability to be reported according to a preconfigured rat-Type order (nr →eutra-nr →eutra). The terminal configures featureSetCombination for configured supportedBandCombinationList and configures a list of "candidate feature set combination" from the candidate BC list from which the list of fallback BCs (including equal or lower level capabilities) has been removed. The "candidate feature set combination" may include feature set combinations for both NR and UTRA-NR BC, and may be obtained from feature set combinations of UE-NR-capabilities and UE-MRDC-capabilities containers.

5. If the requested rat Type is eutra-nr and affects, featureSetCombinations is included in both of two containers of UE-MRDC-Capabilities and UE-NR-Capabilities. However, the feature set of NR is included only in UE-NR-Capabilities.

After UE capability is configured, the terminal may transfer a UE capability information message including the UE capability to the base station. The base station performs appropriate scheduling and transmission/reception management with respect to the corresponding terminal at a later time, based on the UE capability received from the terminal.

In NR, a channel state information reference signal (CSI-RS) is supported as a reference signal for a channel state report of a terminal, and each CSI-RS resource configuration configured by a higher layer may include at least the following detailed configuration information. However, the disclosure is not limited to the following examples.

NZP-CSI-RS-Resource ConfigID: IDs of corresponding CSI-RS resource configurations NrofPorts: The number of CSI-RS ports included in a corresponding CSI-RS resource CSI-RS-timeConfig: A transmission periodicity and a slot offset of a corresponding CSI-RS resource CSI-RS-ResourceMapping: An OFDM symbol position in a slot of a corresponding CSI-RS resource and a subcarrier position in a PRB CSI-RS-Density: A frequency density of a corresponding CSI-RS CDMType: A CDM length and a CDM RE pattern of a corresponding CSI-RS CSI-RS-FreqBand: A transmission bandwidth and a start position of a corresponding CSI-RS Pc: A ratio between physical downlink shared channel (PDSCH) energy per RE (EPRE) and NZP CSI-RS EPRE Pc-SS: A ratio between SS/PBCH block EPRE and NZP CSI-RS EPRE CSI-RS-ResourceRep: NZP CSI-RS resources belonging to one resource set interwork with each other. If CSI-RS-ResourceRep is in an "ON" state, the terminal may identify that the same spatial domain transmission filter is applied to all NZP CSI-RS resources belonging to the resource set (i.e., the terminal may assume that the base station has used the same transmission beam. Hereinafter, the transmission beam may refer to a directional transmission signal, which may be interchangeably used with application of a spatial domain transmission filter), and the respective NZP CSI-RS resources have the same number of CSI-RS ports and the same periodicity. If CSI-RS-ResourceRep is in an "OFF" state, the terminal may not assume that the same spatial domain transmission filter is applied to all NZP CSI-RS resources belonging to the resource set (i.e., the terminal may not assume that the base station has used the same transmission beam), and may not assume that the respective NZP CSI-RS resources have the same number of CSI-RS ports and the same periodicity.

According to some embodiments, in NR, one CSI-RS resource may be configured with one of {1, 2, 4, 8, 12, 16, 24, and 32} as the number of CSI-RS ports, and different degrees of configuration freedom may be supported according to the number of CSI-RS ports configured for the CSI-RS resource. Table 19 shows a CSI-RS density, a CDM length and type, a start position ($\bar{k}$, $\bar{l}$) on a frequency axis and a time axis of a CSI-RS component RE pattern, and the number (k') of frequency axis REs and the number (l') of time axis REs of the CSI-RS component RE pattern, which are configurable according to the number (X) of NR CSI-RS ports.

According to some embodiments, the CSI-RS component RE pattern is a basic unit for configuration of a CSI-RS resource and may include a total of YZ REs including (Y=1+max(k')) REs adjacent on the frequency axis and (Z=1+max(l')) REs adjacent on the time axis. Referring to Table 19, the NR system supports different degrees of configuration freedom of the frequency axis according to the number of CSI-RS ports configured in the CSI-RS resource.

Figure 10:
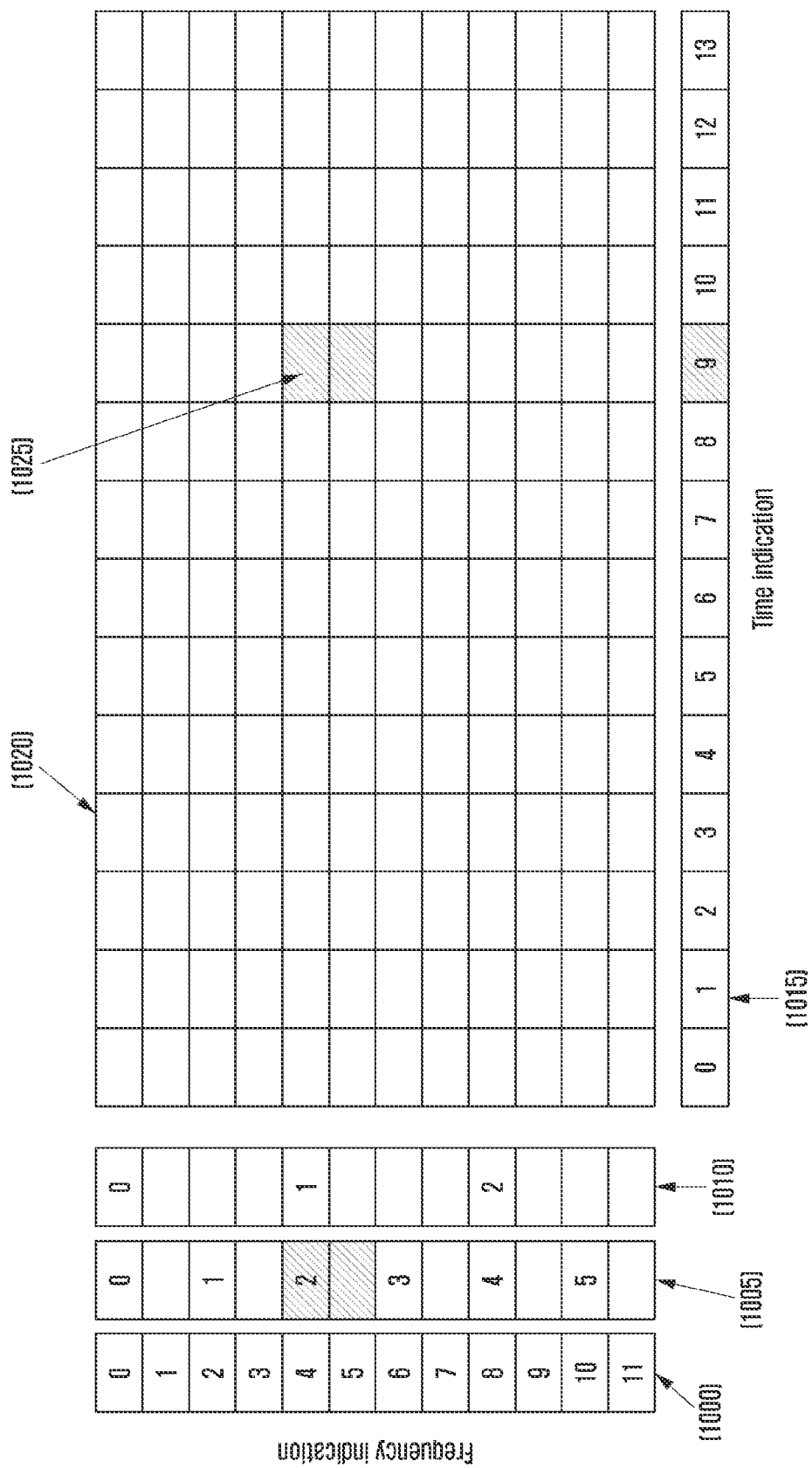
FIG. 10 is a for illustrating an example of a CSI-RS configuration according to an embodiment of the disclosure.

FIG. 10 illustrates designation of a CSI-RS resource element by CSI-RS resource mapping according to some embodiments. Referring to FIG. 10, FIG. 10 is a diagram illustrating an example of CSI-RS RE designation by CSI-RS-ResourceMapping configured by a higher layer. When a CSI-RS corresponds to 1 port, the CSI-RS can be configured in a PRB without subcarrier restriction, and the terminal may be assigned with positions of the CSI-RS REs by a bitmap of 12 bits 1000. In cases of {2, 4, 8, 12, 16, 24, and 32} ports and Y=2, the CSI-RS may be configured in every two subcarriers in the PRB, and the terminal may be assigned with the positions of the CSI-RS REs by a bitmap of 6 bits 1005. In a case of 4 ports and Y=4, the CSI-RS may be configured in every four subcarriers in the PRB, and the terminal may be assigned with the positions of the CSI-RS REs by a bitmap of 3 bits 1010. Similarly, the terminal may be assigned with the time axis position of CSI-RS REs by a bitmap of a total of 14 bits. In this case, the length of the bitmap may vary depending on a Z value associated with Table 19 (CSI-RS locations within a slot) as frequency position assignment, but the principle is similar to the above description, and thus a detailed description thereof will be omitted.

TABLE 19

| Row | Ports x | Density p | Ccdm-Type | ($\bar{k}$, $\bar{l}$) | CDM group index j | k' | l' |
|---|---|---|---|---|---|---|---|
| 1 | 1 | 3 | No CDM | $(k_0,l_0)$, $(k_0 + 4,l_0)$, $(k_0 + 8,l_0)$ | 0, 0, 0 | 0 | 0 |
| 2 | 1 | 1, 0.5 | No CDM | $(k_0,l_0)$ | 0 | 0 | 0 |
| 3 | 2 | 1, 0.5 | FD-CDM2 | $(k_0,l_0)$ | 0 | 0, 1 | 0 |
| 4 | 4 | 1 | FD-CDM2 | $(k_0,l_0)$, $(k_0 + 2,l_0)$ | 0, 1 | 0, 1 | 0 |
| 5 | 4 | 1 | FD-CDM2 | $(k_0,l_0)$, $(k_0,l_0 + 1)$ | 0, 1 | 0, 1 | 0 |
| 6 | 8 | 1 | FD-CDM2 | $(k_0,l_0),(k_1,l_0),(k_2,l_0),(k_3,l_0)$ | 0, 1, 2, 3 | 0, 1 | 0 |
| 7 | 8 | 1 | FD-CDM2 | $(k_0,l_0),(k_1,l_0),(k_0,l_0 + 1),(k_1,l_0 + 1)$ | 0, 1, 2, 3 | 0, 1 | 0 |
| 8 | 8 | 1 | CDM4 (FD2, TD2) | $(k_0,l_0),(k_1,l_0)$ | 0, 1 | 0, 1 | 0, 1 |
| 9 | 12 | 1 | FD-CDM2 | $(k_0,l_0),(k_1,l_0),(k_2,l_0),(k_3,l_0),(k_4,l_0),(k_5,l_0)$ | 0, 1, 2, 3, 4, 5 | 0, 1 | 0 |
| 10 | 12 | 1 | CDM4 (FD2, TD2) | $(k_0,l_0),(k_1,l_0),(k_2,l_0)$ | 0, 1, 2 | 0, 1 | 0, 1 |
| 11 | 16 | 1, 0.5 | FD-CDM2 | $(k_0,l_0),(k_1,l_0),(k_2,l_0),(k_3,l_0)$, $(k_0,l_0 + 1),(k_1,l_0 + 1),(k_2,l_0 + 1),(k_3,l_0 + 1)$ | 0, 1, 2, 3 4, 5, 6, 7 | 0, 1 | 0 |
| 12 | 16 | 1, 0.5 | CDM4 (FD2, TD2) | $(k_0,l_0),(k_1,l_0),(k_2,l_0),(k_3,l_0)$ | 0, 1, 2, 3 | 0, 1 | 0, 1 |
| 13 | 24 | 1, 0.5 | FD-CDM2 | $(k_0,l_0),(k_1,l_0),(k_2,l_0),(k_0,l_0 + 1),(k_1,l_0 + 1),(k_2,l_0 + 1)$, $(k_0,l_1),(k_1,l_1),(k_2,l_1),(k_0,l_1 + 1),(k_1,l_1 + 1),(k_2,l_1 + 1)$ | 0, 1, 2, 3, 4, 5, 6, 7, 8, 9, 10, 11 | 0, 1 | 0 |

TABLE 19-continued

| Row | Ports x | Density p | Ccdm-Type | $(\bar{k}, \bar{l})$ | CDM group index j | k' | l' |
|---|---|---|---|---|---|---|---|
| 14 | 24 | 1, 0.5 | CDM4 (FD2, TD2) | $(k_0,l_0),(k_1,l_0),(k_2,l_0),(k_0,l_1),(k_1,l_1),(k_2,l_1)$ | 0, 1, 2, 3, 4, 5 | 0, 1 | 0, 1 |
| 15 | 24 | 1, 0.5 | CDM8 (FD2, TD2) | $(k_0,l_0),(k_1,l_0),(k_2,l_0)$ | 0, 1, 2 | 0, 1 | 0, 1, 2, 3 |
| 16 | 32 | 1, 0.5 | FD-CDM2 | $(k_0,l_0),(k_1,l_0),(k_2,l_0),(k_3,l_0),$ $(k_0,l_0+1),(k_1,l_0+1),(k_2,l_0+1),(k_3,l_0+1),$ $(k_0,l_1),(k_1,l_1),(k_2,l_1),(k_3,l_1),$ $(k_0,l_1+1),(k_1,l_1+1),(k_2,l_1+1),(k_2,l_1+1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0,l_0),(k_1,l_0),(k_2,l_0),(k_3,l_0),(k_0,l_1),(k_1,l_1),(k_2,l_1),(k_3,l_1)$ | 0, 1, 2, 3, 4, 5, 6, 7 | 0, 1 | 0, 1 |
| 18 | 32 | 1, 0.5 | CDM8 (FD2, TD2) | $(k_0,l_0),(k_1,l_0),(k_2,l_0),(k_3,l_0)$ | 0, 1, 2, 3 | 0, 1 | 0, 1, 2, 3 |

For example, if X=2 ports is configured, the base station may assign a frequency axis RE position according to 1005, and if the base station assigns a frequency axis subcarrier position by 2 of 1005 and assigns a time axis OFDM symbol position by 9 of 1015, the terminal may identify that the CSI-RS is transmitted at the RE position of 1025 in the corresponding PRB 1020, based on the assigned positions.

As described above, in NR, the base station may configure the CSI-RS to the terminal in order to provide other functions, such as rate matching or time/frequency tracking, in addition to CSI measurement. When configuring report settings for CSI-RSs configured for functions other than the CSI-RS measurement, there may be side effects of consuming a terminal power for generating unnecessary CSI or wasting an uplink resource for an unnecessary CSI report.

In the following, a method of measuring and reporting a channel state in the 5G communication system will be described in detail.

The channel state information (CSI) may include a channel quality indicator (channel quality information (CQI)), a precoding matrix indicator (PMI), a CSI-RS resource indicator (CRI), an SS/PBCH block resource indicator (SSBRI), a layer indicator (LI), a rank indicator (RI), a reference signal received power (L1-RSRP), and/or the like. The base station may control time and frequency resources for the aforementioned CSI measurement and report of the terminal.

For the aforementioned CSI measurement and report, the terminal may be configured, via higher layer signaling, with setting information for N (N≥1) CSI reports (CSI-ReportConfig), setting information for M (M≥1) RS transmission resources (CSI-ResourceConfig), and list information of one or two trigger states (CSI-AperiodicTriggerStateList, CSI-SemiPersistentOnPUSCH-TriggerStateList).

The configuration information for the aforementioned CSI measurement and reporting may be more specifically described in Tables 20 to 26 as follows.

TABLE 20

CSI-ReportConfig

The IE CSI-ReportConfig is used to configure a periodic or semi-persistent report sent on PUCCH
on the cell in which the CSI-ReportConfig is included, or to configure a semi-persistent or
aperiodic report sent on PUSCH triggered by DCI received on the cell in which the CSI-
ReportConfig is included (in this case, the cell on which the report is sent is determined by the
received DCI). See TS 38.214 [19], clause 5.2.1.
CSI-ReportConfig information element
-- ASN1START
-- TAG-CSI-REPORTCONFIG-START
CSI-ReportConfig ::=          SEQUENCE {
  reportConfigId                                CSI-ReportConfigId,
  carrier                                       ServCellIndex
OPTIONAL,  -- Need S
  resourcesForChannelMeasurement                CSI-ResourceConfigId,
  csi-IM-ResourcesForInterference               CSI-ResourceConfigId     OPTIONAL,
-- Need R
  nzp-CSI-RS-ResourcesForInterference           CSI-ResourceConfigId     OPTIONAL,
-- Need R
  reportConfigType                              CHOICE {
    periodic                                    SEQUENCE {
      reportSlotConfig                              CSI-ReportPeriodicityAndOffset,
      pucch-CSI-ResourceList                        SEQUENCE (SIZE
(1..maxNrofBWPS)) OF PUCCH-CSI-Resource
    },
    semiPersistentOnPUCCH                       SEQUENCE {
      reportSlotConfig                              CSI-ReportPeriodicityAndOffset,
      pucch-CSI-ResourceList                        SEQUENCE (SIZE
(1..maxNrofBWPs)) Of PUCCH-CSI-Resource
    },
    semiPersistentOnPUSCH                       SEQUENCE {
      reportSlotConfig                              ENUMERATED {sl5, sl10, sl20,
sl40, sl80, sl160, sl320},
      reportSlotOffsetList                          SEQUENCE (SIZE (1..maxNrofUL- TABLE 20-continued

| CSI-ReportConfig |
| --- |

```
Allocations)) OF INTEGER(0..32),
    p0alpha                                              P0-PUSCH-AlphaSetId
  },
  aperiodic                                              SEQUENCE {
    reportSlotOffsetList                                 SEQUENCE (SIZE (1..maxNrofUL-
Allocations)) OF INTEGER(0..32)
    }
  },
  reportQuantity                                         CHOICE {
    none                                                   NULL,
    cri-RI-PMI-CQI                                         NULL,
    cri-RI-i1                                              NULL,
    cri-RI-i1-CQI                                          SEQUENCE {
      pdsch-BundleSizeForCSI                                 ENUMERATED {n2, 14}
OPTIONAL    -- Need S
    },
    cri-RI-CQI                                             NULL,
    cri-RSRP                                               NULL,
    ssb-Index-RSRP                                         NULL,
    cri-RI-LI-PMI-CQI                                      NULL
  },
  reportFreqConfiguration                                SEQUENCE {
    cqi-FormatIndicator                                    ENUMERATED { widebandCQI,
subbandCQI }                                               OPTIONAL    -- Need R
    pmi-FormatIndicator                                    ENUMERATED { widebandPMI,
subbandPMI }                                               OPTIONAL,   -- Need R
    csi-ReportingBand                                      CHOICE {
      subbands3                                              BIT STRING(SIZE(3))
      subbands4                                              BIT STRING(SIZE(4)),
      subbands5                                              BIT STRING(SIZE(5)),
      subbands6                                              BIT STRING(SIZE(6)),
      subbands7                                              BIT STRING(SIZE(7)),
      subbands8                                              BIT STRING(SIZE(8)),
      subbands9                                              BIT STRING(SIZE(9)),
      subbands10                                             BIT STRING(SIZE(10)),
      subbands11                                             BIT STRING(SIZE(11)),
      subbands12                                             BIT STRING(SIZE(12)),
      subbands13                                             BIT STRING(SIZE(13)),
      subbands14                                             BIT STRING(SIZE(14)).
      subbands15                                             BIT STRING(SIZE(15)),
      subbands16                                             BIT STRING(SIZE(16)),
      subbands17                                             BIT STRING(SIZE(17)),
      subbands18                                             BIT STRING(SIZE(18)),
      ...,
      subbands19-v1530                                       BIT STRING(SIZE(19))
    }   OPTIONAL   -- Need S
  }
OPTIONAL,   -- Need R
  timeRestrictionForChannelMeasurements                  ENUMERATED (configured,
notConfigured},
  timeRestrictionForInterferenceMeasurements             ENUMERATED (configured,
notConfigured},
  codebookConfig                                         CodebookConfig
OPTIONAL,   -- Need R
  dummy                                                  ENUMERATED {n1, n2}
OPTIONAL,   -- Need R
  groupBasedBeamReporting                                CHOICE {
    enabled                                                NULL,
    disabled                                               SEQUENCE {
      nrofReportedRS                                         ENUMERATED {n1, 2, 3, n4
OPTIONAL    -- Need S
    }
  },
  cqi-Table                              ENUMERATED {table1, table2, table3, spare1}
OPTIONAL    -- Need R
  subbandSize                                            ENUMERATED {value1 , value2},
  non-PMI-PortIndication                 SEQUENCE (SIZE (1..maxNrofNZP-CSI-RS-
ResourcesPerConfig)) OF PortIndexFor8Ranks OPTIONAL,   -- Need R
  ...,
  [[                                                     SEQUENCE {
  semiPersistentOnPUSCH-v1530                              ENUMERATED {sl4, sl8, sl16}
    reportSlotConfig- v1530
  }
OPTIONAL   -- Need R
  ]]
}
CSI-ReportPeriodicityAndOffset ::= CHOICE {
  slot4                                                  INTEGER(0..3),
```

TABLE 20-continued

| CSI-ReportConfig | |
|---|---|
| slots5 | INTEGER(0..4), |
| slots8 | INTEGER(0..7), |
| slots10 | INTEGER(0..9), |
| slots16 | INTEGER(0..15), |
| slots20 | INTEGER(0..19), |
| slots40 | INTEGER(0..39), |
| slots80 | INTEGER(0..79), |
| slots160 | INTEGER(0..159), |
| slots320 | INTEGER(0..319) |
| } | |
| PUCCH-CSI-Resource ::= | SEQUENCE { |
| uplinkBandwidthPartId | BWP-Id, |
| pucch-Resource | PUCCH-ResourceId |
| } | |
| PortIndexFor8Ranks ::= | CHOICE { |
| portIndex8 | SEQUENCE{ |
| rank1-8 OPTIONAL, -- Need R | PortIndex8 |
| rank2-8 OPTIONAL, -- Need R | SEQUENCE(SIZE(2)) OF PortIndex8 |
| rank3-8 OPTIONAL, -- Need R | SEQUENCE(SIZE(3)) OF PortIndex8 |
| rank4-8 OPTIONAL, -- Need R | SEQUENCE(SIZE(4)) OF PortIndex8 |
| rank5-8 OPTIONAL, -- Need R | SEQUENCE(SIZE(5)) OF PortIndex8 |
| rank6-8 OPTIONAL, -- Need R | SEQUENCE(SIZE(6)) OF PortIndex8 |
| rank7-8 OPTIONAL, -- Need R | SEQUENCE(SIZE(7)) OF PortIndex8 |
| rank8-8 OPTIONAL -- Need R | SEQUENCE(SIZE(8)) OF PortIndex8 |
| }, | |
| portIdex4 | SEQUENCE{ |
| rank1-4 OPTIONAL, -- Need R | PortIndex4 |
| rank2-4 OPTIONAL, -- Need R | SEQUENCE(SIZE(2)) OF PortIndex4 |
| rank3-4 OPTIONAL, -- Need R | SEQUENCE(SIZE(3)) OF PortIndex4 |
| rank4-4 OPTIONAL -- Need R | SEQUENCE(SIZE(4)) OF PortIndex4 |
| }, | |
| portIndex2 | SEQUENCE{ |
| rank1-2 OPTIONAL, -- Need R | PortIndex2 |
| rank2-2 OPTIONAL -- Need R | SEQUENCE(SIZE(2)) OF PortIndex2 |
| }, | |
| portIndex1 | NULL |
| } | |
| PortIndex8::= | INTEGER (0..7) |
| PortIndex4::= | INTEGER (0..3) |
| PortIndex2::= | INTEGER (0..1) |
| -- TAG-CSI-REPORTCONFIG-STOP | |
| -- ASN1STOP | |

CSI-ReportConfig Field Descriptions carrier: Indicates in which serving cell the CSI-ResourceConfig indicated below are to be found. If the field is absent, the resources are on the same serving cell as this report configuration.

codebookConfig: Codebook configuration for Type-1 or Type-II including codebook subset restriction.

cqi-FormatIndicator: Indicates whether the UE shall report a single (wideband) or multiple (subband) CQI. (see TS 38.214 [19], clause 5.2.1.4).

cqi-Table: Which CQI table to use for CQI calculation (see TS 38.214 [19], clause 5.2.2.1).

csi-IM-ResourcesForInterference: CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.

csi-ReportingBand: Indicates a contiguous or non-contiguous subset of subbands in the bandwidth part which CSI shall be reported for. Each bit in the bit-string represents one subband.

The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).

dummy: This field is not used in the specification. If received it shall be ignored by the UE.

groupBasedBeamReporting:Turning on/off group beam based reporting (see TS 38.214 [19], clause 5.2.1.4)

non-PMI-PortIndication:Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2). The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.

nrofReportedRS: The number (N) of measured RS resources to be reported per report setting in a non-group-based report. N<=N_max, where N_max is either 2 or 4 depending on UE capability. (see TS 38.214 [19], clause 5.2.1.4) When the field is absent the UE applies the value 1 nzp-CSI-RS-ResourcesForInterference: NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.

p0alpha: Index of the p0-alpha set determining the power control for this CSI report transmission (see TS 38.214 [19], clause 6.2.1.2).

pdsch-BundleSizeForCSI: PRB bundling size to assume for CQI calculation when reportQuantity is CRI/RI/i1/CQI. If the field is absent, the UE assumes that no PRB bundling is applied (see TS 38.214 [19], clause 5.2.1.4.2).

pmi-FormatIndicator: Indicates whether the UE shall report a single (wideband) or multiple (subband) PMI. (see TS 38.214 [19], clause 5.2.1.4).

pucch-CSI-ResourceList:Indicates which PUCCH resource to use for reporting on PUCCH.

reportConfigType: Time domain behavior of reporting configuration reportFreqConfiguration: Reporting configuration in the frequency domain. (see TS 38.214 [19], clause 5.2.1.4).

reportQuantity: The CSI related quantities to report. Corresponds to L1 parameter 'ReportQuantity' (see TS 38.214 [19], clause 5.2.1).

reportSlotConfig:Periodicity and slot offset (see TS 38.214 [19], clause 5.2.1.4).

reportSlotConfig-v1530: Extended value range for reportSlotConfig for semi-persistent CSI on PUSCH. If the field is present, the UE shall ignore the value provided in the legacy field (semiPersistentOnPUSCH.reportSlotConfig).

reportSlotOffsetList: Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.

Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 5.2.3).

resourcesForChannelMeasurement: Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

subbandSize: Indicates one out of two possible BWP-dependent values for the subband size as indicated in TS 38.214 [19], table 5.2.1.4-2. If csi-ReportingBand is absent, the UE shall ignore this field.

timeRestrictionForChannelMeasurements:Time domain measurement restriction for the channel (signal) measurements (see TS 38.214 [19], clause 5.2.1.1)

timeRestrictionForInterferenceMeasurements: Time domain measurement restriction for interference measurements (see TS 38.214 [19], clause 5.2.1.1)

TABLE 21

| CSI-ResourceConfig |
|---|
| The IE CSI-ResourceConfig defines a group of one or more NZP-CSI-RS-ResourceSet, CSI-IM-ResourceSet and/or CSI-SSB-ResourceSet.<br>CSI-ResourceConfig information element<br>-- ASN1START<br>-- TAG-CSI-RESOURCECONFIG-START |

TABLE 21-continued

| CSI-ResourceConfig |
| --- |

```
CSI-ResourceConfig ::=     SEQUENCE {
    csi-ResourceConfigId       CSI-ResourceConfigId,
    csi-RS-ResourceSetList     CHOICE {
       nzp-CSI-RS-SSB                  SEQUENCE {
              nzp-CSI-RS-ResourceSetList    SEQUENCE (SIZE (1..maxNrofNZP-CSI-RS-
ResourceSetsPerConfig)) OF NZP-CSI-RS-ResourceSetId
OPTIONAL,      -- Need R
              csi-SSB-ResourceSetList       SEQUENCE (SIZE (1..maxNrofCSI-SSB-
ResourceSetsPerConfig)) OF CSI-SSB-ResourceSetId
OPTIONAL    -- Need R
       },
    csi-IM-ResourceSetList        SEQUENCE (SIZE(1..maxNrofCSI-IM-
ResourceSetsPerConfig)) OF CSI-IM-ResourceSetId
    },
    bwp-Id                     BWP-Id,
    resourceType               ENUMERATED { aperiodic, semiPersistent, periodic },
    ...
}
-- TAG-CSI-RESOURCECONFIG-STOP
-- ASN1STOP
```

CSI-ResourceConfig Field Descriptions bwp-Id: The DL BWP which the CSI-RS associated with this CSI-ResourceConfig are located in (see TS 38.214 [19], clause 5.2.1.2 csi-ResourceConfigId: Used in CSI-ReportConfig to refer to an instance of CSI-ResourceConfig csi-RS-ResourceSetList: Contains up to maxNrofNZP-CSI-RS-ResourceSetsPerConfig resource sets if ResourceConfigType is 'aperiodic' and 1 otherwise (see TS 38.214 [19], clause 5.2.1.2)

csi-SSB-ResourceSetList: List of SSB resources used for beam measurement and reporting in a resource set (see TS 38.214 [19], section FFS_Section)

resourceType: Time domain behavior of resource configuration (see TS 38.214 [19], clause 5.2.1.2). It does not apply to resources provided in the csi-SSB-ResourceSetList.

0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.

nzp-CSI-RS-Resources: NZP-CSI-RS-Resources associated with this NZP-CSI-RS resource set (see TS 38.214 [19], clause 5.2). For CSI, there are at most 8 NZP CSI RS resources per resource set repetition: Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for

TABLE 22

| NZP-CSI-RS-ResourceSet. |
| --- |

The IE NZP-CSI-RS-ResourceSet is a set of Non-Zero-Power (NZP) CSI-RS resources (their IDs) and set-specific parameters.
NZP-CSI-RS-ResourceSet information element
-- ASN1START
-- TAG-NZP-CSI-RS-RESOURCESET-START
```
NZP-CSI-RS-ResourceSet ::=     SEQUENCE {
    nzp-CSI-ResourceSetId        NZP-CSI-RS-ResourceSetId,
    nzp-CSI-RS-Resources         SEQUENCE (SIZE (1..maxNrofNZP-CSI-RS-
ResourcesPerSet)) OF NZP-CSI-RS-ResourceId,
    repetition                   ENUMERATED { on, off }
OPTIONAL,     -- Need S
    aperiodicTriggeringOffset    INTEGER(0..6)
OPTIONAL,     -- Need S
    trs-Info                     ENUMERATED {true}
OPTIONAL,     -- Need R
    ...
}
-- TAG-NZP-CSI-RS-RESOURCESET-STOP
-- ASN1STOP
```

NZP-CSI-RS-ResourceSet Field Descriptions aperiodicTriggeringOffset: Offset X between the slot containing the DCI that triggers a set of aperiodic NZP CSI-RS resources and the slot in which the CSI-RS resource set is transmitted. The value 0 corresponds to CSI-RS resource sets which are associated with CSI-ReportConfig with report of L1 RSRP or "no report"

trs-Info: Indicates that the antenna port for all NZP-CSI-RS resources in the CSI-RS resource set is same. If the field is absent or released the UE applies the value "false" (see TS 38.214 [19], clause 5.2.2.3.1).

TABLE 23

CSI-SSB-ResourceSet

The IE CSI-SSB-ResourceSet is used to configure one SS/PBCH block resource set which refers to SS/PBCH as indicated in ServingCellConfigCommon.
CSI-SSB-ResourceSet information element
-- ASN1START
-- TAG-CSI-SSB-RESOURCESET-START
CSI-SSB-ResourceSet ::=  SEQUENCE {
  csi-SSB-ResourceSetId  CSI-SSB-ResourceSetId,
  csi-SSB-ResourceList  SEQUENCE (SIZE(1..maxNrofCSI-SSB-ResourcePerSet)) OF SSB-Index,
  ...
}
-- TAG-CSI-SSB-RESOURCESET-STOP
-- ASN1STOP

TABLE 24

CSI-IM-ResourceSet

The IE CSI-IM-ResourceSet is used to configure a set of one or more CSI Interference Management (IM) resources (their IDs) and set-specific parameters.
CSI-IM-ResourceSet information element
-- ASN1START
-- TAG-CSI-IM-RESOURCESET-START
CSI-IM-ResourceSet ::=  SEQUENCE {
  csi-IM-ResourceSetId  CSI-IM-ResourceSetId,
  csi-IM-Resources  SEQUENCE (SIZE(1..maxNrofCSI-IM-ResourcesPerSet)) OF CSI-IM-ResourceId,
  ...
}
-- TAG-CSI-IM-RESOURCESET-STOP
-- ASN1STOP

TABLE 25

CSI-AperiodicTriggerStateList

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.
CSI-AperiodicTriggerStateList information element
-- ASN1START
-- TAG-CSI-APERIODICTRIGGERSTATELIST-START
CSI-AperiodicTriggerStateList ::=  SEQUENCE (SIZE(1..maxNrOfCSI-AperiodicTriggers)) OF CSI-AperiodicTriggerState
CSI-AperiodicTriggerState ::=  SEQUENCE {
  associatedReportConfigInfoList  SEQUENCE (SIZE(1..maxNrofReportConfigPerAperiodicTrigger)) OF CSI-AssociatedReportConfigInfo,
  ...
}
CSI-AssociatedReportConfigInfo ::=  SEQUENCE {
  reportConfigId  CSI-ReportConfigId,
  resourcesForChannel  CHOICE {
    nzp-CSI-RS  SEQUENCE {
      resourceSet  INTEGER (1..maxNrofNZP-CSI-RS-ResourceSetsPerConfig),
      qcl-info  SEQUENCE (SIZE(1..maxNrofCSI-SSB-CSI-RS-ResourcesPerSet)) OF TCI-StateIdOPTIONAL -- CondAperiodic
    },
    csi-SSB-ResourceSet  INTEGER (1..maxNrofCSI-SSB-ResourceSetsPerConfig)
  },
  csi-IM-ResourcesForInterference  INTEGER(1..maxNrofCSI-IM-ResourceSetsPerConfig)  OPTIONAL, -- Cond CSI-IM-ForInterference
  nzp-CSI-RS-ResourcesForInterferenceINTEGER (1..maxNrofNZP-CSI-RS ResourceSetsPerConfig)  OPTIONAL, -- CondNZP-CSI-RS-ForInterference
  ...
}

TABLE 25-continued

CSI-AperiodicTriggerStateList

-- TAG-CSI-APERIODICTRIGGERSTATELIST-STOP
-- ASN1STOP

CSI-AssociatedReportConfigInfo Field Descriptions
  csi-IM-ResourcesForInterference: CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
  csi-SSB-ResourceSet: CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
  nzp-CSI-RS-ResourcesForInterference: NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).
  qcl-info: List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)
  reportConfigId: The reportConfigId of one of the CSI-ReportConfigToAddMod configured in CSI-MeasConfig
  resourceSet: NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to the second entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForIntereference | This field is optional need M if the CSI-ReportConfig identified by reportConfigId is configured with nzp-CSI-RS-ResourcesForInterference; otherwise it is absent. |

TABLE 26

CSI-SemiPersistentOnPUSCH-TriggerStateList

The CSI-SemiPersistentOnPUSCH-TriggerStateList IE is used to configure the UE with list of trigger states for semi-persistent reporting of channel state information on L1. See also TS 38.214 [19], clause 5.2.
CSI-SemiPersistentOnPUSCH-TriggerStateList information element
-- ASN1START
-- TAG-CSI-SEMIPERSISTENTONPUSCHTRIGGERSTATELIST-START
CSI-SemiPersistentOnPUSCH-TriggerStateList ::= SEQUENCE(SIZE (1..maxNrOfSemiPersistentPUSCH-Triggers)) OF CSI-SemiPersistentOnPUSCH-TriggerState
CSI-SemiPersistentOnPUSCH-TriggerState::=    SEQUENCE {
    associatedReportConfigInfo             CSI-ReportConfigId,
    ...
}
-- TAG-CSI-SEMIPERSISTENTONPUSCHTRIGGERSTATELIST-STOP
-- ASN1STOP With respect to the aforementioned CSI reporting settings (CSI-ReportConfig), each reporting setting of CSI-ReportConfig may be associated with one downlink (DL) bandwidth part identified by a higher layer parameter bandwidth part identifier (bwp-id) given by the CSI resource setting of CSI-ResourceConfig associated with the corresponding reporting setting.

As a time domain reporting operation for each reporting setting of CSI-ReportConfig, "aperiodic", "semi-persistent", and "periodic" schemes may be supported, which may be configured for the terminal by the base station via a parameter of reportConfigType configured from a higher layer. A semi-persistent CSI reporting method may support a "PUCCH-based semi-persistent (semi-PersistentOn-PUCCH)" method and a "PUSCH-based semi-persistent (semi-PersistentOnPUSCH)" method. In a periodic or semi-persistent CSI reporting method, a PUCCH or PUSCH resource in which CSI is to be transmitted may be configured for the terminal by the base station via higher layer signaling. The periodicity and slot offset of a PUCCH or PUSCH resource in which CSI is to be transmitted may be given by numerology of an uplink (UL) bandwidth part configured to transmit CSI reporting. In an aperiodic CSI reporting method, a PUSCH resource in which CSI is to be transmitted may be scheduled for the terminal by the base station via L1 signaling (e.g., aforementioned DCI format 0_1).

With respect to the aforementioned CSI resource setting (CSI-ResourceConfig), each CSI resource setting of CSI-ReportConfig may include S (S≥1) CSI resource sets (configured via the higher layer parameter of csi-RS-ResourceSetList). A CSI resource set list may include a non-zero power (NZP) CSI-RS resource set and an SS/PBCH block set or a CSI-interference measurement (CSI-IM) resource set. Each CSI resource setting may be positioned in a downlink (DL) bandwidth part identified by a higher layer parameter of bwp-id and may be connected to a CSI reporting setting in the same downlink bandwidth part. A time domain operation of a CSI-RS resource in CSI resource setting may be configured to one of "aperiodic", "periodic", or "semi-persistent" from a higher layer parameter of resourceType. With respect to periodic or semi-persistent CSI resource setting, the number of CSI-RS resource sets may be limited to be S=1, and a configured periodicity and slot offset may be given based on the numerology of a downlink bandwidth part identified by bwp-id. One or more CSI resource settings for channel or interference measurement may be configured for the terminal by the base station via higher layer signaling, and may include the following CSI resources.

CSI-IM resource for interference measurement

NZP CSI-RS resource for interference measurement

NZP CSI-RS resource for channel measurement

With respect to CSI-RS resource sets associated with resource setting in which the higher layer parameter of resourceType is configured to "aperiodic", "periodic", or "semi-persistent", a trigger state of CSI reporting setting having reportType configured to "aperiodic", and resource setting for channel or interference measurement on one or multiple component cells (CCs) may be configured via a higher layer parameter of CSI-AperiodicTriggerStateList.

Aperiodic CSI reporting of the terminal may be performed using a PUSCH, and periodic CSI reporting may be performed using a PUCCH, and when triggered or activated via DCI, semi-persistent CSI reporting may be performed using a PUSCH after activation is performed by a PUSCH and a MAC control element (MAC CE). As described above, CSI resource setting may also be configured to be aperiodic, periodic, and semi-persistent. A combination of CSI reporting setting and CSI resource setting may be supported based on Table 27 below.

TABLE 27

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.51. |
| Aperiodic CSI-RS | Not Supported | Not Supported | Triggered by DCI; additionally, activation command [10, TS 38.321] possible as defined in Subclause 5.2.1.5.1. |

Aperiodic CSI reporting may be triggered by a "CSI request" field in DCI format 0_1 described above, which corresponds to scheduling DCI for a PUSCH. The terminal may monitor a PDCCH, may acquire DCI format 0_1, and may acquire scheduling information of a PUSCH and a CSI request indicator. A CSI request indicator may be configured to have NTS (=0, 1, 2, 3, 4, 5, or 6) bits, and may be determined by higher layer signaling of reportTriggerSize. One trigger state among one or multiple aperiodic CSI reporting trigger states which may be configured via higher layer signaling (CSI-AperiodicTriggerStateList) may be triggered by a CSI request indicator.

If all bits in the CSI request field are 0, this may indicate that CSI reporting is not requested.

If the number M of configured CSI trigger states in a CSI-AperiodicTriggerStateLite is larger than 2NTs−1, M CSI trigger states may be mapped to 2NTs−1 trigger states according to a predefined mapping relation, and one trigger state among the 2NTs−1 trigger states may be indicated by a CSI request field.

If the number M of configured CSI trigger states in a CSI-AperiodicTriggerStateLite is smaller than or equal to 2NTs−1, one of the M CSI trigger states may be indicated by a CSI request field. Table 28 below shows an example of a relation between a CSI request indicator and a CSI trigger state that may be indicated by a corresponding indicator.

TABLE 28

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1<br>CSI report#2 | CSI resource#1<br>CSI resource#2 |

TABLE 28-continued

| CSI request field | CSI trigger state | CSI-ReportConfigId | CSI-ResourceConfigId |
|---|---|---|---|
| 10 | 10 | CSI trigger state#2 | CSI report#3 |
| 11 | CSI trigger state#3 | CSI report#4 | CSI resource#4 |

A terminal may measure a CSI resource in a CSI trigger state triggered by a CSI request field, and then generate CSI (including at least one of the aforementioned CQI, PMI, CRI, SSBRI, LI, RI, or L1-RSRP). The terminal may transmit acquired CSI by using a PUSCH scheduled based on corresponding DCI format 0_1. If one bit corresponding to an uplink data indicator (UL-SCH indicator) in DCI format 0_1 indicates "1", the terminal may multiplex the acquired CSI and uplink data (UL-SCH) to a PUSCH resource scheduled by DCI format 0_1 so as to transmit the same. If one bit corresponding to the uplink data indicator (UL-SCH indicator) in DCI format 01 indicates "0", the terminal may map only CSI to the PUSCH resource scheduled by DCI format 0_1 without uplink data (UL-SCH) so as to transmit the same.

Figure 11:
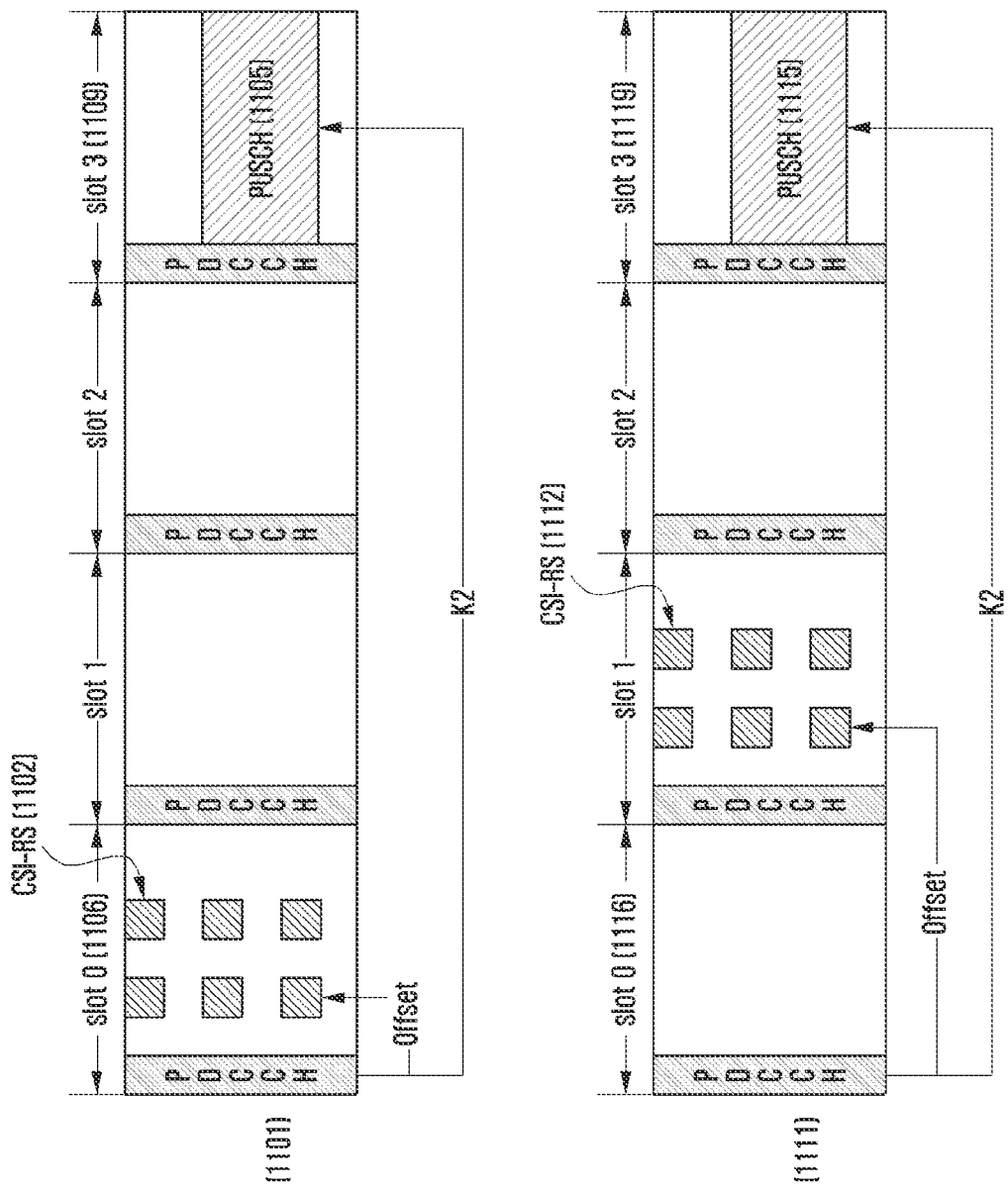
FIG. 11 is a diagram illustrating an example of an aperiodic CSI reporting method according to an embodiment of the disclosure.

FIG. 11 is a diagram illustrating an example of an aperiodic CSI reporting method.

In an example of FIG. 11, a terminal may acquire DCI format 0_1 by monitoring a PDCCH 1101, and may acquire scheduling information and CSI request information for a PUSCH 1105 therefrom. The terminal may acquire resource information of a CSI-RS 1102 to be measured, from a received CSI request indicator. The terminal may determine a time point at which the terminal needs to measure a resource of the CSI-RS 1102, based on a time point at which DCI format 0_1 is received, and a parameter for an offset (e.g., aforementioned aperiodicTriggeringOffset) in a CSI resource set configuration (e.g., an NZP CSI-RS resource set configuration (NZP-CSI-RS-ResourceSet)). More specifically, the terminal may be configured with offset value X of the parameter of aperiodicTriggeringOffset in an NZP-CSI-RS resource set configuration from a base station via higher layer signaling, and the configured offset value X may refer to an offset between a slot in which DCI triggering aperiodic CSI reporting is received, and a slot in which a CSI-RS resource is transmitted. For example, the parameter value of aperiodicTriggeringOffset and offset value X may have a mapping relation therebetween as shown in Table 29 below.

TABLE 29

| AperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

An example of FIG. 11 shows an example in which the aforementioned offset value X is configured to 0 (X=0). In this case, the terminal may receive the CSI-RS 1102 in a slot (corresponding to slot 0 in FIG. 11) in which DCI format 0_1 that triggers aperiodic CSI reporting is received, and may report CSI information, which is measured based on the received CSI-RS, to the base station via the PUSCH 1105. The terminal may acquire scheduling information (information corresponding to each field of DCI format 0_1 described above) on the PUSCH 1105 for CSI reporting from DCI format 0_1. For example, in the DCI format 0_1, the terminal may acquire information on a slot in which the PUSCH 1105 is to be transmitted, from time domain resource allocation information of the PUSCH 1105 described above. In an example of FIG. 11, the terminal acquires 3 as a K2 value corresponding to a slot offset value for PDCCH-to-PUSCH, and accordingly, the PUSCH 1105 may be transmitted in slot 3 1109, which is spaced 3 slots apart from slot 0 1106, i.e., a time point at which the PDCCH 1101 has been received.

In another example of FIG. 11, the terminal may acquire DCI format 0_1 by monitoring a PDCCH 1111, and may acquire scheduling information and CSI request information on a PUSCH 1115 from the DCI format 0_1. The terminal may acquire resource information of a CSI-RS 1112 to be measured, from a received CSI request indicator. In an example of FIG. 11, offset value X for a CSI-RS is configured to be 1 (X=1). In this case, the terminal may receive the CSI-RS 1112 in a slot (corresponding to slot 0 1116 of FIG. 11) in which DCI format 0_1 that triggers aperiodic CSI reporting is received, and may report CSI information measured based on the received CSI-RS to the base station via the PUSCH 1115 of slot 3 1119.

Figure 12:
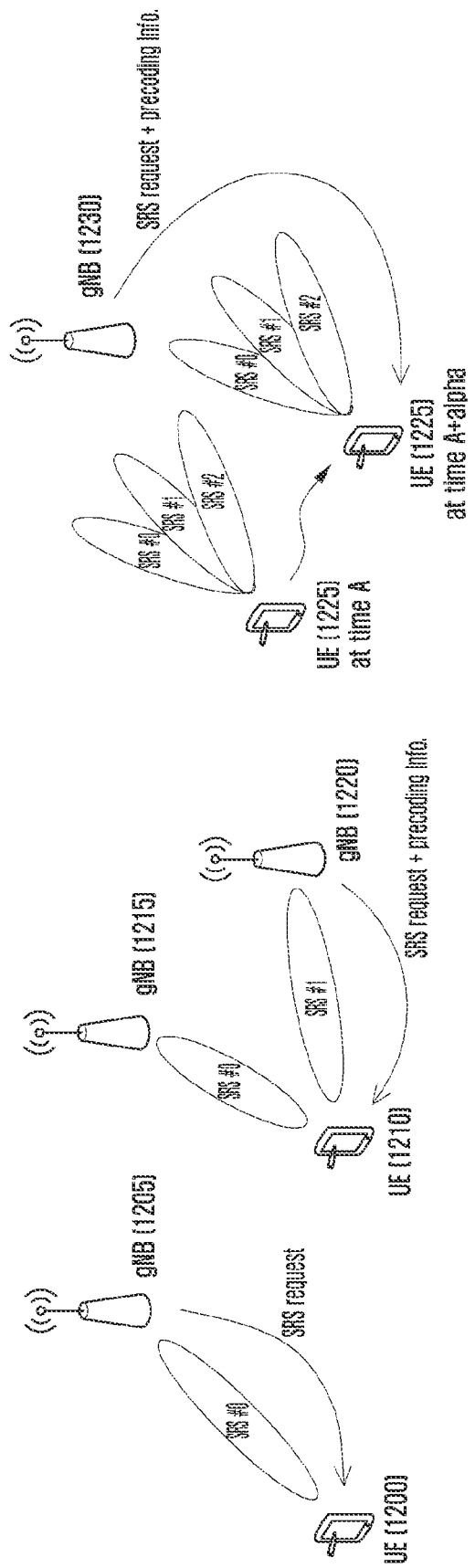
FIG. 12 is a diagram illustrating examples of various operation scenarios of SRSs according to an embodiment of the disclosure.

FIG. 12 is a diagram illustrating examples of various operation scenarios of an SRS. Referring to FIG. 12, at least three SRS operation scenarios below can be considered in the NR system.

1) A base station 1205 configures a one-direction beam for a terminal 1200 (in the specification, configuring a one-direction beam/precoding includes applying no beam/precoding or applying a wide beam (cell-coverage or sector coverage)), and the terminal 1200 transmits an SRS according to a transmission periodicity and an offset of the SRS in a case of a periodic SRS or a semi-persistent SRS, and transmits an SRS in response to an SRS request of the base station (at a predetermined time after the SRS request) in a case of an aperiodic SRS. In this case, the SRSs do not need additional information for beam/precoding.

2) Base stations 1215 and 1220 configure beams in one or more directions for a terminal 1210, and the terminal 1210 may transmit multiple SRSs beamformed in the one or more directions. For example, as illustrated in the example of FIG. 12, it is possible to configure SRS resource (or port) #0 to be beamformed to the base station 1215 and SRS resource (or port) #1 to be beamformed to the base station 1220. In this case, the base stations 1215 and 1220 are required to inform not only the SRS request but also SRS beam/precoding information unlike method 1).

3) A base station 1230 configures beams in one or more directions for a terminal 1225, and the terminal 1225 may transmit multiple SRSs beamformed in the one or more directions. For example, as illustrated in the example of FIG. 12, the base station may configure the terminal to transmit the SRSs by applying different beams/precodings to SRS resource (or port) #0, SRS resource (or port) #1, and SRS resource (or port) #2. Accordingly, even when mobility of the terminal is high, communication may be stably performed via beam/precoder diversity. For example, the terminal 1225 may provide channel state information to the base station 1230 via SRS #2 at a time point of time A and may provide channel state information to the base station 1230 via SRS #0 at a time point of time A+alpha. In this case, the base station 1230 is required to inform not only the SRS request but also SRS beam/precoding information unlike method 1).

The above description has been provided based on SRS transmission, but can be similarly expanded also to different UL channel or/and RS transmission, such as a PRACH, a PUSCH, a PUCCH, and the like, and detailed descriptions for all cases are omitted to prevent the subject of the disclosure from being unclear.

Figure 13:
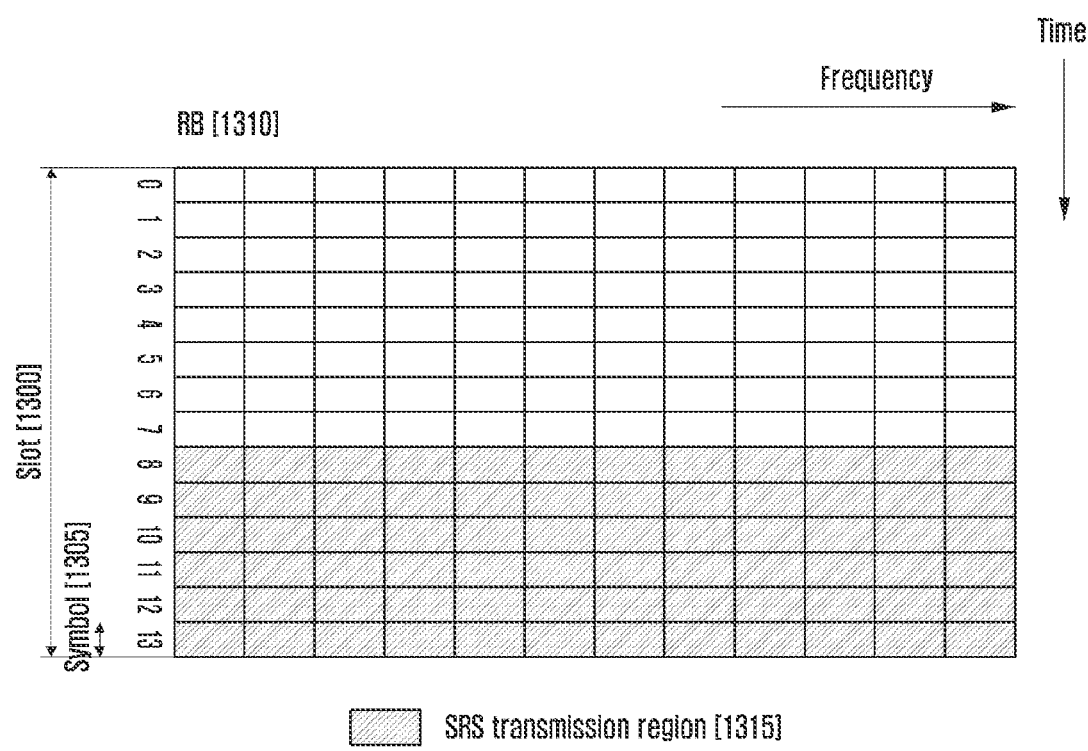
FIG. 13 is a diagram illustrating an uplink transmission structure of a 5G or NR system according to an embodiment of the disclosure.

FIG. 13 is a diagram illustrating an uplink transmission structure of the 5G or NR system.

Referring to FIG. 13, a basic transmission unit of the 5G or NR system is a slot 1300, each slot includes 14 symbols 1305 based on the assumption of a normal cyclic prefix (CP) length, and 1 symbol may correspond to one UL waveform (CP-OFDM or DFT-S-OFDM) symbol.

A resource block (RB) 1310 is a resource allocation unit corresponding to one slot based on a time domain and may include 12 subcarriers based on a frequency domain.

An uplink structure may be largely divided into a data area and a control area. Unlike the LTE system, the control area may be configured at a predetermined uplink position and transmitted in the 5G or NR system. The data area includes a series of communication resources including data, such as a voice and a packet, transmitted to each terminal and corresponds to the remaining resources except for the control area in a subframe. The control area includes a series of communication resources for a downlink channel quality report from each terminal, reception ACK/NACK for a downlink signal, an uplink scheduling request, and the like.

The terminal may simultaneously transmit its own data and control information in the data area and the control area. Symbols in which the terminal may periodically transmit the SRS within one slot may be last six symbol sections 1315, and may be transmitted via a preconfigured SRS transmission band within a UL BWP based on the frequency domain. However, this is merely an example, and symbols capable of transmitting the SRS may be expanded to another time section or may be transmitted via a frequency band. When RBs capable of transmitting the SRS are transmitted in the frequency domain, the number of RBs may be a multiple of 4 RBs and a maximum of 272 RBs.

In the 5G or NR system, the number N of SRS symbols may be configured to 1, 2, or 4, and successive symbols may be transmitted. In the 5G or NR system, repetitive transmission of SRS symbols is allowed. Specifically, a repetitive transmission factor (repetition factor r) of the SRS symbols is r∈{1,2,4}, where r≤N. For example, when transmission is performed by mapping one SRS antenna to one symbol, up to four symbols may be repeatedly transmitted. Alternatively, four different antenna ports may be transmitted on four different symbols. In this case, each antenna port is mapped to one symbol, and thus repetitive transmission of SRS symbols is not allowed.

In the case of LTE and NR, an SRS may be configured based on the following higher layer signaling information (or a subset thereof).

BandwidthConfig: Configuring SRS bandwidth information. An accurate value indicated by each code point may vary according to an uplink system BW value.

SubframeConfig (or ConfigIndex): Configuring an SRS transmission periodicity and transmission offset values. An accurate value indicated by each code point may vary according to whether a system is FDD or TDD.

ackNackSRS-SimultaneousTransmission: Indicating whether concurrent transmission of ACK/NACK-SRS is performed MaxUpPts: Indicating whether frequency position initialization of SRS transmission is performed in UpPTS.

Hopping: Indicating whether SRS frequency hopping is performed and a hopping position and method by using 2-bit information.

Frequency domain position: Indicating a frequency domain position of SRS transmission.

Duration: Indicating whether periodic SRS transmission is performed.

Transmission comb: Indicating a comb offset value during SRS transmission.

Cyclic shift: Indicating a cyclic shift value during SRS transmission.

Antenna port: Indicating the number of SRS antenna ports used during SRS transmission. LTE can support 1, 2, or 4 ports.

In an LTE/LTE-A system, periodic and aperiodic SRS transmission may be supported based on the aforementioned information. In an NR system, additional information, such as activation/deactivation signaling for SRS resources other than the aforementioned information can be used, and periodic, semi-persistent, and aperiodic SRS transmission may be supported. According to an SRS transmission type, for example, depending on whether an SRS transmission type is periodic, semi-persistent, or aperiodic SRS transmission, some of the configuration information may be omitted.

An SRS may include a constant amplitude zero auto correlation (CAZAC) sequence. CAZAC sequences configuring respective SRSs transmitted from multiple terminals have different cyclic shift values. In addition, CAZAC sequences generated via cyclic shift in one CAZAC sequence have characteristics of having values of zero correlation with sequences having cyclic shift values different from those thereof. Accordingly, by using the characteristics, SRSs concurrently allocated to the same frequency domain may be divided according to a CAZAC sequence cyclic shift value configured for each SRS by a base station.

SRSs of multiple terminals may be divided according to a frequency position as well as a cyclic shift value. The frequency position may be divided by SRS subband unit allocation or Comb. In the 5G or NR system, Comb2 and Comb4 may be supported. In a case of Comb2, one SRS may be assigned only to even-numbered or odd-numbered subcarriers in an SRS subband. In this case, each of the even-numbered or odd-numbered subcarriers may constitute one Comb.

An SRS subband may be assigned to each terminal, based on a tree structure. The terminal may perform hopping on an SRS assigned to each subband at each SRS transmission time point. Accordingly, all transmission antennas of the terminal may transmit the SRS via the entire uplink data transmission bandwidth.

Figure 14:
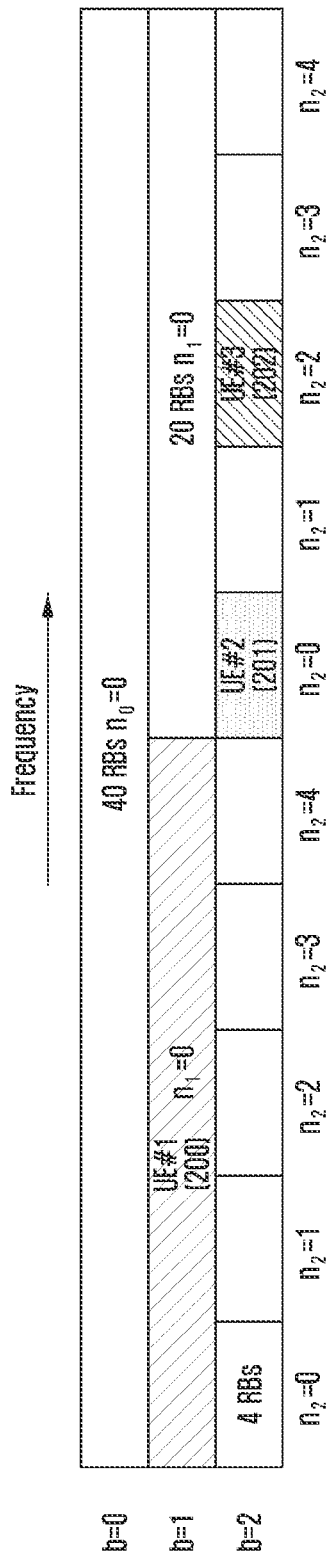
FIG. 14 is a diagram illustrating a structure in which an SRS is assigned for each subband according to an embodiment of the disclosure.

FIG. 14 is a diagram illustrating a structure in which an SRS is assigned for each subband.

Referring to FIG. 14, an example is shown, in which an SRS is assigned to each terminal, based on a tree structure configured by a base station when a data transmission band corresponds to 40 RBs in a frequency domain.

In FIG. 14, when a level index of the tree structure is b, a highest level (b=0) of the tree structure may include one SRS subband having a bandwidth of 40 RBs. At a second level (b=1), two SRS subbands, each of which has a bandwidth of 20 RBs, may be generated from the SRS subband of the highest level (b=0). Accordingly, two SRS subbands may exist in the entire data transmission band of the second level (b=1). At a third level (b=2), five SRS subbands, each of which has a bandwidth of 4 RBs, may be generated from one 20 RB SRS subband at the immediate higher level (b=1), and 10 SRS subbands, each of which has a bandwidth of 4 RBs, may exist in one level. The tree structure configurations may have various level numbers, SRS subband sizes, and SRS subband numbers per level according to configuration of the base station. The number of SRS subbands at level b generated from one SRS subband of a higher level may be defined as $N_b$, and an index of $N_b$ SRS subbands may be defined as $n_b=\{0, \ldots, N_b-1\}$. As a subband per level varies, a terminal may be assigned according to a subband per level as illustrated in FIG. 14. For example, terminal 1 14-00 may be assigned to a first SRS subband (n1=0) from among two SRS subbands having a bandwidth of 20 RBs at level b=1, and terminal 2 14-01 and terminal 3 14-02 may respectively be assigned to a first SRS subband (n2=0) and a third SRS subband (n2=2) under a second SRS subband having a bandwidth of 20 RBs. Based on these procedures, a terminal is able to perform concurrent SRS transmission via multiple component carriers (CCs), and perform SRS transmission concurrently via multiple SRS subbands in one CC.

Specifically, for the SRS subband configuration described above, NR supports SRS bandwidth configurations shown in Table 30 below.

TABLE 30

| | $B_{SRS}=0$ | | $B_{SRS}=1$ | | $B_{SRS}=2$ | | $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |

TABLE 30-continued

| | $B_{SRS}=0$ | | $B_{SRS}=1$ | | $B_{SRS}=2$ | | $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

NR supports SRS frequency hopping based on values in Table 30 above, and a detailed procedure follows Table 31 below.

TABLE 31

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource elements (k, l) in a slot for each of the antenna ports $p_i$ according to $$a^{(p_i)}_{K_{TC}k'+k_0^{(p_i)}, l'+l_0} = \begin{cases} \dfrac{1}{\sqrt{N_{ap}}} \beta_{SRS} r^{(p_i)}(k', l') & k'=0, 1, \ldots, M_{sc,b}^{SRS}-1 \;\; l'=0, 1, \ldots, N_{symb}^{SRS}-1 \\ 0 & \text{otherwise} \end{cases}$$

The length of the sounding reference signal sequence is given by
$$M_{sc,b}^{SRS} = m_{SRS,b} N_{sc}^{RB} / K_{TC}$$
where $mS_{RS,b}$ is given by a selected row of Table 6.4.1.4.3-1 with $b=B_{SRS}$ where $B_{SRS} \in \{0, 1, 2, 3\}$ is given by the field b-SRS contained in the higher-layer parameter freqHopping. The row of the table is selected according to the index $C_{SRS} \in \{0, 1, \ldots, 63\}$ given by the field c-SRS contained in the higher-layer parameter freqHopping.

TABLE 31-continued

The frequency-domain starting position $k_0^{(p_i)}$ is defined by $$k_0^{(p_i)} = \bar{k}_0^{(p_i)} + \sum_{b=0}^{B_{SRS}} K_{TC} M_{sc,b}^{SRS} n_b$$

where $$\bar{k}_0^{(p_i)} = n_{shift} N_{sc}^{RB} + k_{TC}^{(p_i)}$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and} \\ & N_{ap}^{SRS} = 4 \text{ and } p_i \in \{1001, 1003\} \\ \bar{k}_{TC} & \text{otherwise} \end{cases}$$

If $N_{BWP}^{start} \leq n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC} - 1\}$ is contained in the higher-layer parameter transmissionComb in the SRS-Config IE and $n_b$ is a frequency position index.
Frequency hopping of the sounding reference signal is configured by the parameter $b_{hop} \in \{0, 1, 2, 3\}$, given by the field b-hop contained in the higher-layer parameter freqHopping.
If $b_{hop} \geq B_{SRS}$, frequency hopping is disabled and the frequency position index $n_b$ remains constant (unless re-configured) and is defined by
$$n_b = \lfloor 4n_{RRC}/m_{SRS,b} \rfloor \bmod N_b$$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for $b = B_{SRS}$ are given by the selected row of Table 6.4.1.4.3-1 corresponding to the configured value of $C_{SRS}$.
If $b_{hop} < B_{SRS}$, frequency hopping is enabled and the frequency position indices $n_b$ are defined by $$n_b = \begin{cases} \lfloor 4n_{RRC}/m_{SRS,b} \rfloor \bmod N_b & b \leq b_{hop} \\ (F_b(n_{SRS}) + \lfloor 4n_{RRC}/m_{SRS,b} \rfloor) \bmod N_b & \text{otherwise} \end{cases}$$

where $N_b$ is given by Table 6.4.1.4.3-1, $$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ (N_b/2) \lfloor n_{SRS}/\prod_{b'=b_{hop}}^{b-1} N_{b'} \rfloor & \text{if } N_b \text{ odd} \end{cases}$$

and where $N_{b_{hop}} = 1$ regardless of the value of $N_b$. The quantity $n_{SRS}$ counts the number of SRS transmissions. For the case of an SRS resource configured as aperiodic by the higher-layer parameter resourceType, it is given by $n_{SRS} = \lfloor l'/R \rfloor$ within the slot in which the $N_{symb}^{SRS}$ symbol SRS resource is transmitted. The quantity $R \leq N_{symb}^{SRS}$ is the repetition factor given by the field repetitionFactor contained in the higher-layer parameter resourceMapping.

As described above, the 5G or NR terminal supports a single user (SU)-MIMO scheme and has up to four transmission antennas. Further, the NR terminal may concurrently transmit SRSs via multiple CCs or multiple SRS subbands in the CCs. Unlike the LTE system, in the 5G or NR system, various numerologies may be supported, multiple SRS transmission symbols may be variously configured, and repetitive SRS transmission via a repetition factor may also be allowed. Accordingly, it is required to count SRS transmissions considering the same. Counting SRS transmissions may be variously used. For example, counting SRS transmissions may be used to support antenna switching according to SRS transmission. Specifically, a time point at which an SRS is transmitted, an antenna corresponding to the transmitted SRS, and a band in which the SRS is transmitted may be determined by SRS transmission counting.

In the following, a rate matching operation and a puncturing operation are described in detail.

When time and frequency resources A, in which predetermined symbol sequence A is to be transmitted, overlap predetermined time and frequency resources B, a rate matching or puncturing operation may be considered as a transmission/reception operation of channel A in consideration of domain resource C in which resources A and resources B overlap each other. A detailed operation may follow the content below.

A rate matching operation will be described. The base station may transmit channel A by mapping the same only to resource areas remaining after excluding, from all resources A for transmission of symbol sequence A to the terminal, resource C corresponding to an area in which resources A overlap resource B. For example, when symbol sequence A includes {symbol #1, symbol #2, symbol #3, symbol #4}, resources A are {resource #1, resource #2, resource #3, resource #4}, and resources B are {resource #3, resource #5}, the base station may sequentially map symbol sequence A to resources {resource #1, resource #2, resource #4} remaining after excluding, from resources A, {resource #3} which corresponds to resource C, so as to transmit the same. As a result, the base station may map the symbol sequence {symbol #1, symbol #2, symbol #3} to {resource #1, resource #2, resource #4}, respectively, so as to transmit the same.

The terminal may determine resources A and resources B from scheduling information for symbol sequence A from the base station, and may determine, based thereof, resource C that is an area in which resources A and resources B overlap each other. The terminal may receive symbol sequence A, based on an assumption that symbol sequence A has been mapped to and transmitted in the areas remaining after excluding resource C from all resources A. For example, when symbol sequence A includes {symbol #1, symbol #2, symbol #3, symbol #4}, resources A are {resource #1, resource #2, resource #3, resource #4}, and resources B are {resource #3, resource #5}, the terminal may receive symbol sequence A, based on an assumption that symbol sequence A has been sequentially mapped to the resources {resource #1, resource #2, resource #4} remaining after excluding, from resources A, {resource #3} which corresponds to resource C. As a result, the terminal may perform a series of reception operation later based on the assumption that the symbol sequence {symbol #1, symbol #2, symbol #3} is mapped to and transmitted in {resource #1, resource #2, resource #4}, respectively.

Subsequently, a puncturing operation will be described. When there is resource C corresponding to the area in which all resources A for transmission of symbol sequence A to the terminal overlap resources B, the base station may map symbol sequence A to all resources A, but may perform transmission only in the resource areas remaining after excluding resource C from resources A, without performing transmission in the resource area corresponding to resource C. For example, when symbol sequence A includes {symbol #1, symbol #2, symbol #3, symbol #4}, resources A are {resource #1, resource #2, resource #3, resource #4}, and resources B are {resource #3, resource #5}, the base station may map symbol sequence A of {symbol #1, symbol #2, symbol #3, symbol #4} to resources A {resource #1, resource #2, resource #3, resource #4}, respectively, and may transmit only the symbol sequence {symbol #1, symbol #2, symbol #4} corresponding to the resources {resource #1, resource #2, resource #4} remaining after excluding, from resources A, {resource #3} corresponding to resource C, without transmitting {symbol #3} mapped to {resource #3} which corresponds to resource C. As a result, the base station may map the symbol sequence {symbol #1, symbol #2, symbol #4} to {resource #1, resource #2, resource #4}, respectively, so as to transmit the same.

Figure 15:
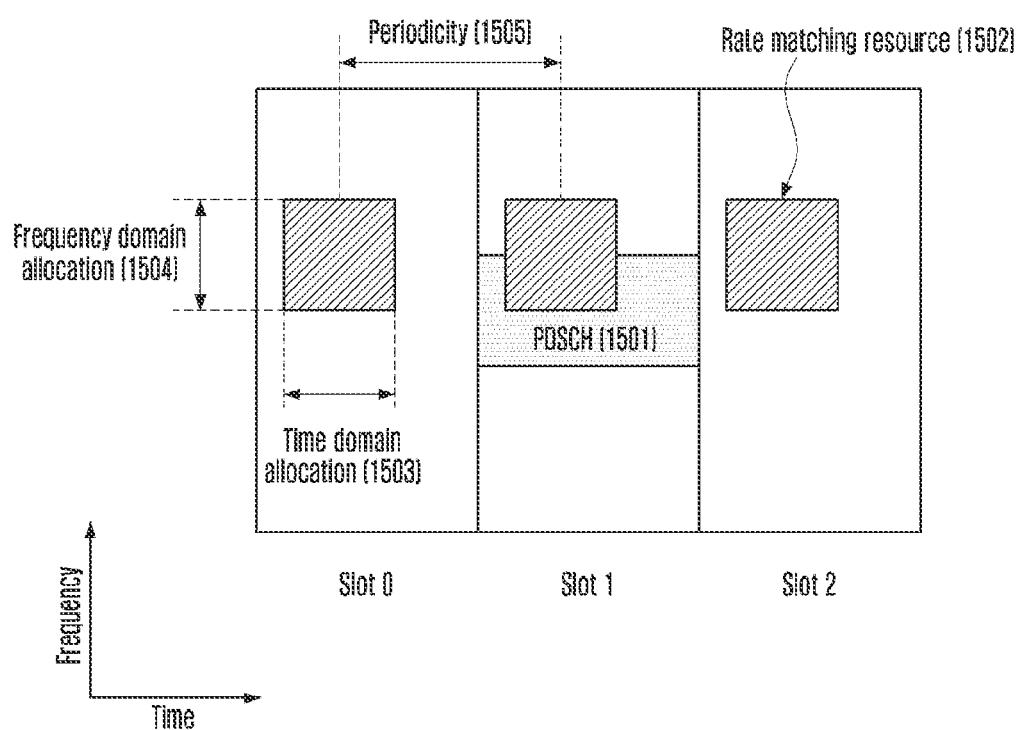
FIG. 15 is a for illustrating a method of transmitting or receiving data by a base station and a terminal in consideration of a downlink data channel and a rate matching resource, according to an embodiment of the disclosure.

The terminal may determine resources A and resources B from scheduling information for symbol sequence A from the base station, and may determine, based thereof, resource C that is an area in which resources A and resources B overlap each other. The terminal may receive symbol sequence A, based on the assumption that symbol sequence A has been mapped to all resources A but is transmitted only in the areas remaining after excluding resource C from resources A. For example, when symbol sequence A includes {symbol #1, symbol #2, symbol #3, symbol #4}, resources A are {resource #1, resource #2, resource #3, resource #4}, and resources B are {resource #3, resource #5}, the terminal may assume that symbol sequence A {symbol #1, symbol #2, symbol #3, symbol #4} is mapped to resources A {resource #1, resource #2, resource #3, resource #4}, respectively, but {symbol #3} mapped to {resource #3} corresponding to resource C is not transmitted, and may perform reception based on the assumption that the symbol sequence {symbol #1, symbol #2, symbol #4} corresponding to the resources {resource #1, resource #2, resource #4} remaining after excluding, from resources A, {resource #3} corresponding to resource C is mapped and transmitted. As a result, the terminal may perform a series of reception operation later based on the assumption that the symbol sequence {symbol #1, symbol #2, symbol #4} is mapped to and transmitted in {resource #1, resource #2, resource #4}, respectively. Subsequently, a rate matching resource will be described. FIG. 15 is a for illustrating a method by which a base station and a terminal transmit or receive data in consideration of a downlink data channel and a rate matching resource.

FIG. 15 illustrates a downlink data channel (PDSCH) 1501 and a rate matching resource 1502. The base station may configure one or multiple rate matching resources 1502 for the terminal via higher layer signaling (e.g., RRC signaling). Configuration information of the rate matching resource 1502 may include time axis resource allocation information 1503, frequency axis resource allocation information 1504, and periodicity information 1505. Hereinafter, a bitmap corresponding to the frequency axis resource allocation information 1504 is referred to as a "first bitmap", a bitmap corresponding to the time axis resource allocation information 1503 is referred to as a "second bitmap", and a bitmap corresponding to the periodicity information 1505 is referred to as a "third bitmap". When all or some of the time and frequency resources of the scheduled data channel 1501 overlap the configured rate matching resource 1502, the base station may match the data channel 1501 to the rate matching resource 1502 part so as to transmit the same, and the terminal may perform reception and decoding based on an assumption that the data channel 1501 is rate-matched in the rate matching resource 1502 part.

The base station may dynamically notify the terminal of whether to rate-match the data channel in the configured rate matching resource part, via an additional configuration (corresponding to a "rate matching indicator" in the aforementioned DCI format). Specifically, the BS may select some of the configured rate matching resources, group the selected rate matching resources into a rate matching resource group, and inform the UE of whether to perform rate matching on the data channel for each rate matching resource group through DCI using a bitmap scheme. For example, when four rate matching resources of RMR #1, RMR #2, RMR #3, and RMR #4 are configured, the base station may configure rate matching groups of RMG #1={RMR #1, RMR #2} and RMG #2={RMR #3, RMR #4}, and may indicate, to the terminal, whether to perform rate matching in each of RMG #1 and RMG #2 by using 2 bits within a DCI field. For example, the base station may configure each bit to "1" when rate matching is needed, and may configure each bit to "0" when rate matching is not needed.

In the 5G system, granularity at an "RB symbol level" and an "RE level" is supported as a method of configuring the aforementioned rate matching resource in the terminal. More specifically, the following configuration method may be used.

Hereinafter, a method of configuring an RB symbol level will be described. The terminal may be configured with up to four RateMatchPatterns for each bandwidth part via higher layer signaling, and one RateMatchPattern may include the following content.

As reserved resources within a bandwidth part, resources, in which time and frequency resource areas of the corresponding reserved resources are configured, may be included by a combination of a bitmap at an RB level and a bitmap at a symbol level on the frequency axis. The reserved resources may span one or two slots. A time domain pattern (periodicityAndPattern) in which the time and frequency domains including a pair of respective bitmaps at the RB level and the symbol level are repeated may be additionally configured.

Time and frequency domain resource areas configured as a control resource set within a bandwidth part and a resource area corresponding to a time domain pattern configured by a search space configuration in which the corresponding resource areas are repeated may be included.

Subsequently, a method of configuring an RE level will be described. The terminal may be configured with the following contents via higher layer signaling.

As configuration information (lte-CRS-ToMatchAround) for REs corresponding to a LTE cell-specific reference signal or common reference signal (CRS) pattern, the number (nrofCRS-Ports) of LTE CSR ports, values (v-shift) of LTE-CRS-vshift(s), information (carrier-FreqDL) on a center subcarrier position of an LTE carrier from a frequency point that is a reference (e.g., reference point A), information on a bandwidth size of an LTE carrier (carrierBandwidthDL), subframe configuration information (mbsfn-SubframConfigList) corresponding to a multicast-broadcast single-frequency network (MBSFN), and the like may be included. The terminal may determine a CRS position within an NR slot corresponding to the LTE subframe, based on the aforementioned information.

Configuration information for a resource set corresponding to one or multiple zero power (ZP) CSI-RSs within a bandwidth part may be included.

Figure 16:
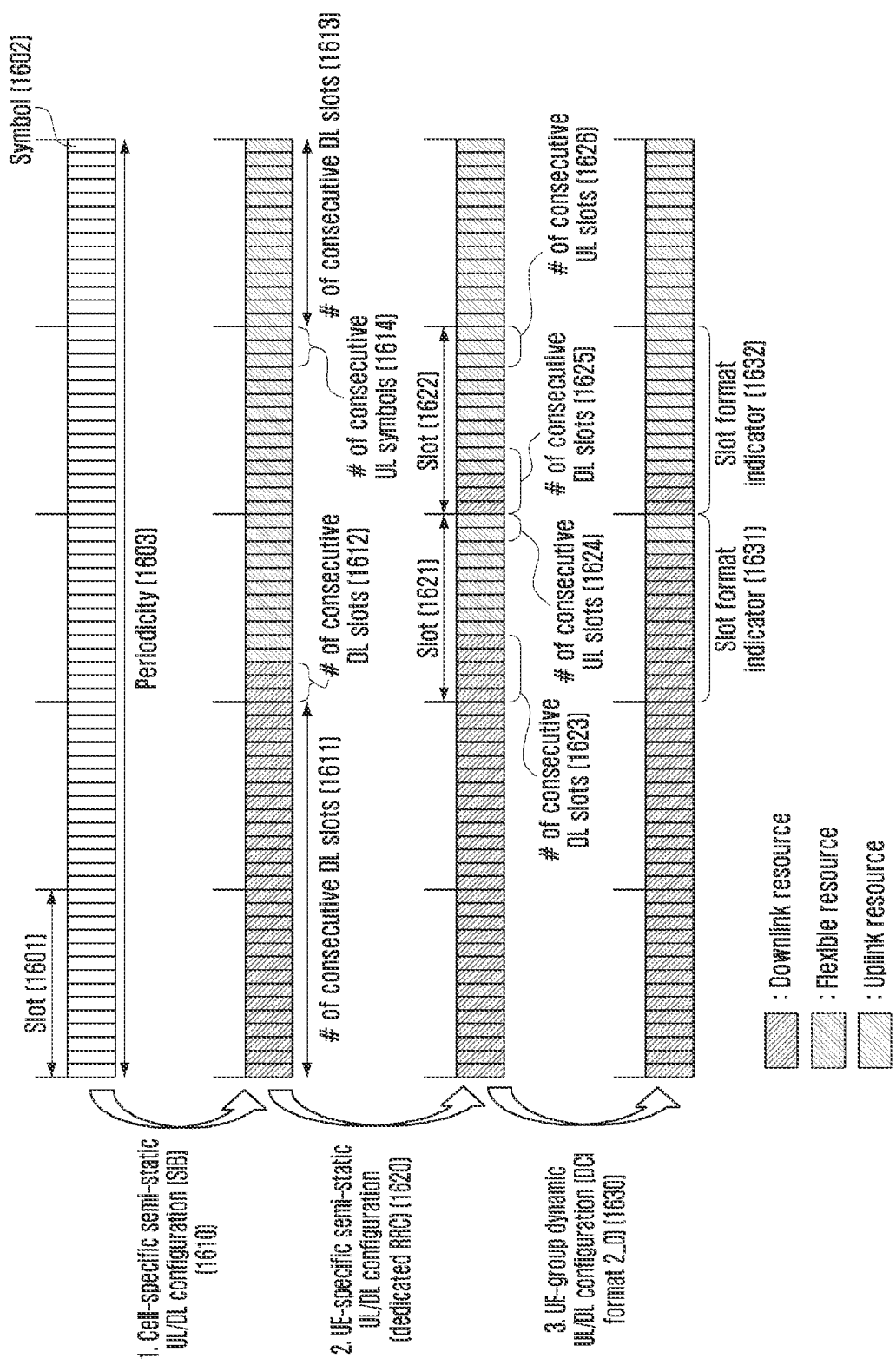
FIG. 16 is a diagram illustrating, as an example, an uplink-downlink configuration considered in the 5G communication system.

FIG. 16 is a diagram illustrating, as an example, an uplink-downlink configuration considered in the 5G communication system. In the 5G communication system, an uplink-downlink configuration of a symbol/slot may have three stages. First, via cell-specific configuration information 1610 based on system information, an uplink-downlink of a symbol/slot may be semi-statically configured in the unit of symbols. Specifically, cell-specific uplink-downlink configuration information based on the system information may include uplink-downlink pattern information and subcarrier information that is a reference. Via the uplink-downlink pattern information, a pattern periodicity 1603, the number 1611 of consecutive downlink slots from a start point of each pattern, the number 1612 of symbols of a subsequent slot, the number 1613 of consecutive uplink slots from an end of the pattern, and the number 1614 of symbols of a subsequent slot may be indicated. In this case, the terminal may determine that a slot and a symbol which are not indicated as an uplink and a downlink are a flexible slot/symbol.

Second, based on user-specific configuration information 1620 via dedicated higher layer signaling, slots 1621 and 1622 including a flexible slot or a flexible symbol may be indicated by the numbers 1623 and 1625 of consecutive downlink symbols from start symbols of the respective slots and the numbers 1624 and 1626 of consecutive uplink symbols from ends of the slots, or all the slots may be indicated as the downlink or the uplink.

Last, in order to dynamically change a downlink signal transmission section and an uplink signal transmission section, an UL/DL configuration may be indicated to a terminal group via DCI format 2_0 1330. The base station may indicate whether each of the symbols indicated as the flexible symbols (i.e., symbols which are not indicated as the downlink or the uplink) in each slot is a downlink symbol, an uplink symbol, or a flexible symbol may be indicated via a slot format indicator (SFI) 1631 or 1632 included in a downlink control channel. The slot format indicator may be selected as one index in a table in which the uplink-downlink configuration of 14 symbols within one slot are preconfigured as shown in Table 32 below.

TABLE 32

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |
| 26 | D | D | F | F | F | F | F | F | F | F | U | U | U | U |
| 27 | D | D | D | F | F | F | F | F | F | F | U | U | U | U |
| 28 | D | D | D | D | D | D | D | D | D | D | D | D | F | U |

TABLE 32-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | F | U | D | D | D | D | F | F | U |
| 50 | D | D | F | F | U | U | U | D | D | F | F | U | U | U |
| 51 | D | F | F | U | U | U | U | D | G | G | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | | | | | | | Reserved | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

In the NR system, a tracking RS (i.e., TRS) may be configured for fine time/frequency tracking of the base station. The TRS can be referred to as another term, such as a CSI-RS for tracking, in the standard, but will be referred to as TRS for convenience of description in the specifications. The TRS may be transmitted in one (X=1) slot or in two (X=2) consecutive slots with a specific periodicity, such as 10 ms or 20 ms, and this is referred to as a TRS burst.

Figure 17:
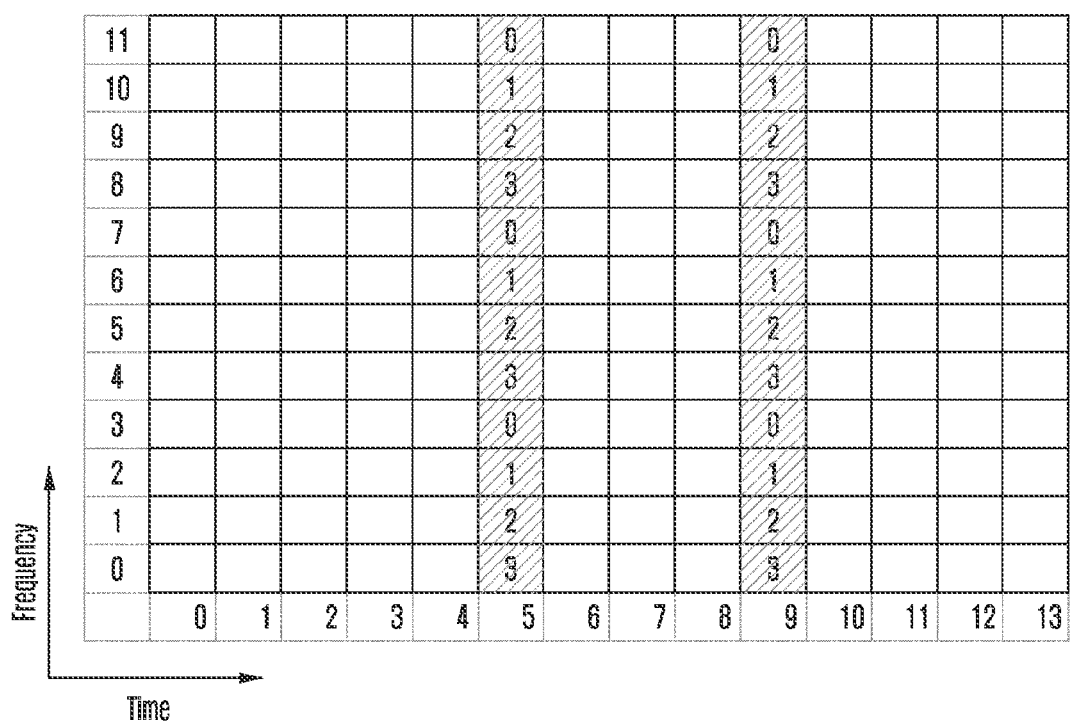
FIG. 17 is a diagram illustrating an example of a TRS pattern according to an embodiment of the disclosure.

FIG. 17 illustrates an RE pattern of a TRS according to some embodiments.

Referring to FIG. 17, examples of TRS patterns available within one slot are illustrated. As illustrated in FIG. 17, a TRS may have a frequency RE density of three RE/RB/ports, and TRS REs may be repeated in every four subcarriers. (i.e., one TRS port is transmitted in one of REs 0, 1, 2, and 3 shown in the TRS OFDM symbol REs in FIG. 17). In addition, according to some embodiments, the TRS can be transmitted in one of three OFDM symbol pairs of {5th, 9th}, {6th, 10th}, and {7th, 11th} in a frequency band below 6 GHz, which is referred to as frequency range 1 (FR1), and can be transmitted in one of ten OFDM symbol pairs of {1st, 5th}, {2nd, 6th}, {3rd, 7th}, {4th, 8th}, {5th, 9th}, {6th, 10th}, {7th, 11th}, {8th, 12th}, {9th, 13th}, and {10th, 14th} in a frequency band equal to or higher than 6 GHz, which is referred to as frequency range 2 (FR2). It should be noted that positions of OFDM symbols in FIG. 17 are an example of the TRS configuration and actual transmission positions may vary depending on transmission of the base station.

Figure 18A:
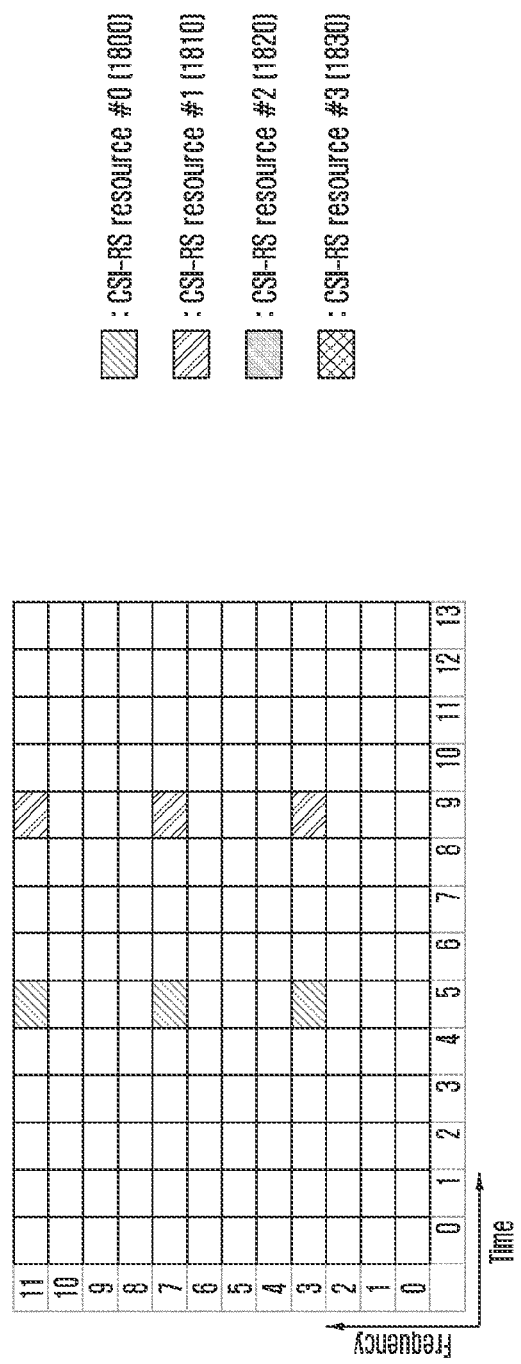
FIG. 18A is a diagram illustrating another example of a TRS pattern according to an embodiment of the disclosure.

FIG. 18A is a diagram illustrating a 1-Port CSI-RS configuration according to some embodiments. Referring to FIG. 18A, an example of the 1-port CSI-RS configuration for covering the TRS RE pattern of FIG. 17 is illustrated. According to FIG. 20, the base station may configure one resource set to one resource setting, and may configure up to four CSI-RS resources 1800, 1810, 1820, and 1830 in the resource set. In this case, the frequency density of the CSI-RS may be configured to 3 RE/RB/ports. If a TRS burst of X=1 is used, the base station may configure CSI-RS resources #0 and #1.

Figure 18B:
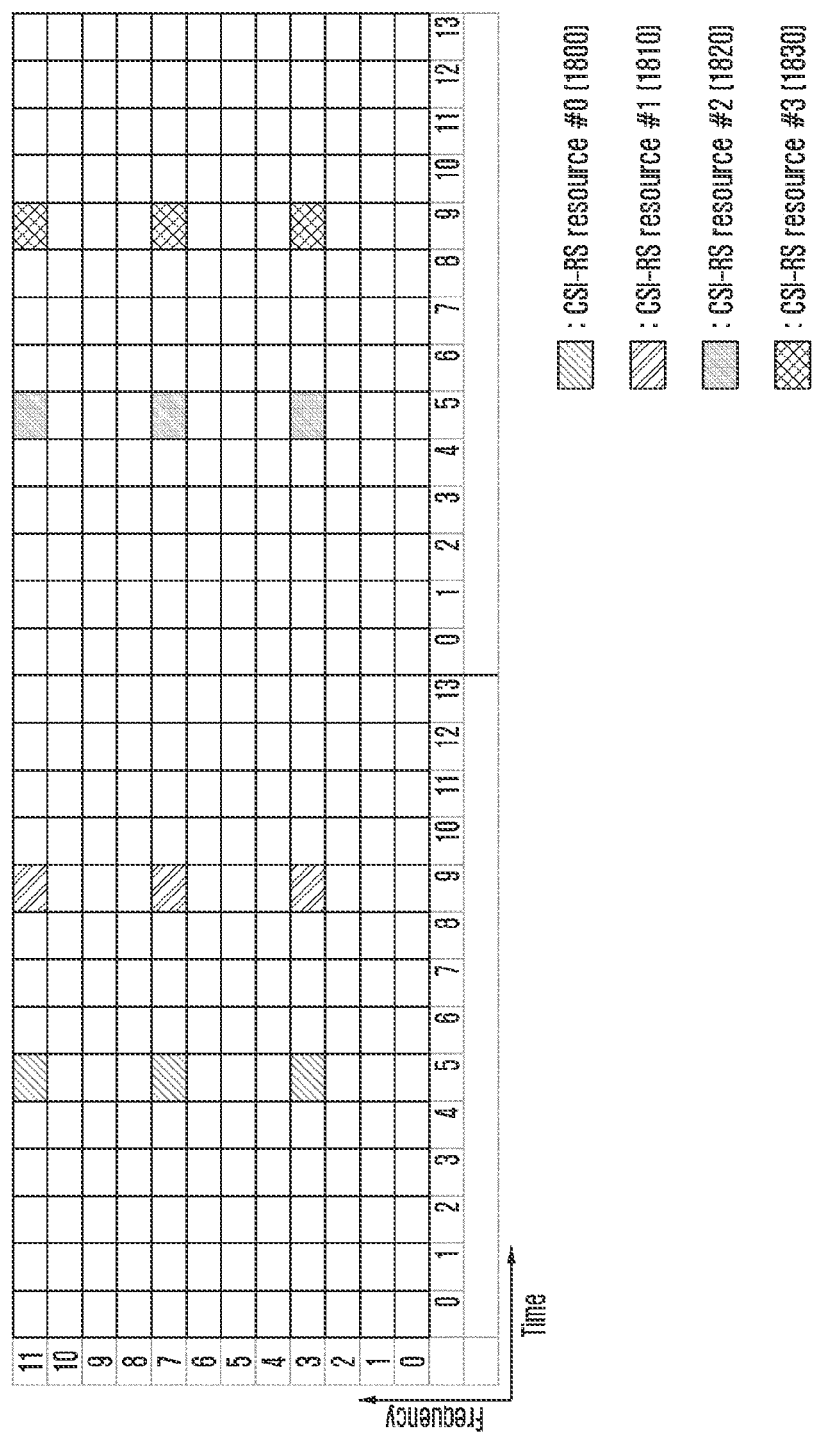
FIG. 18B is a diagram illustrating another example of a TRS pattern according to an embodiment of the disclosure.

FIG. 18B is a diagram illustrating another 1-Port CSI-RS configuration according to some embodiments. If X=2 TRS burst, the base station configures all CSI-RS resources #0, #1, #2, and #3 1800, 1810, 1820, and 1830. In a case of X=1 or X=2 TRS burst, with respect to the CSI-RS resources configured within one resource set, the terminal may assume the same antenna ports having the same port index, and perform consecutive time/frequency tracking based thereon. If the CSI-RS resources are configured as the TRS, the base station may configure no corresponding report setting (CSI-ReportConfig) (i.e., there is no report setting referring to the corresponding CSI-RS resource) or may make a report setting configuration value to "none", so that it may be guaranteed that the terminal uses the corresponding CSI-RS resources for time/frequency tracking and does not generate a CSI report.

In FIG. 18A and FIG. 18B, subcarrier positions and OFDM symbol positions of 1-port CSI-RS resources may be properly changed according to the TRS subcarrier position of FIG. 17.

The TRS can be transmitted in various forms, such as a periodic, semi-persistent, or aperiodic TRS. The periodic TRS (P-TRS) is periodically transmitted before an RRC reconfiguration according to an RRC-configured periodicity and a slot offset value, the semi-persistent TRS (SP-TRS) is transmitted before deactivation after activation by an MAC CE or DCI, based on an RRC-configured periodicity and a slot offset value, and the aperiodic TRS (A-TRS) is triggered by a MAC CE or DCI and transmitted without any configuration of a periodicity or a slot offset value. At this time, A-TRS triggering and A-TRS transmission timing can have offsets configured via a higher layer or can follow pre-appointed values (e.g., the A-TRS is transmitted in a slot which is the same as that for A-TRS triggering).

Since the number of REs in the time axis is insufficient, and it may be thus difficult to measure a statistical characteristic of the channel, the aperiodic TRS (A-TRS) may be associated with the periodic TRS or the semi-persistent TRS. The association between the A-TRS and the SP-TRS or the P-TRS can be supported via various methods, such as quasi-co-location (CQL). For example, the base station can configure at least one SP-TRS or P-TRS as a QCL reference RS in the A-TRS so as to extract channel statistical values, such as a delay spread, an average delay, a Doppler spread, and a Doppler shift, (QCL type A) or extract spatial parameters, such as a TX beam, or an RX beam (QCL type D).

The TRS is allocated with bandwidth information by a higher layer parameter of freqBand and, if a bandwidth of a BWP in which the corresponding TRS is transmitted is narrower than 52 RBs, the bandwidth of the TRS is the same as the bandwidth of the BWP, and if the bandwidth of the BWP in which the corresponding TRS is transmitted is larger than or equal to 52 RBs, the bandwidth of the TRS is configured to 52 RB.

Figure 19:
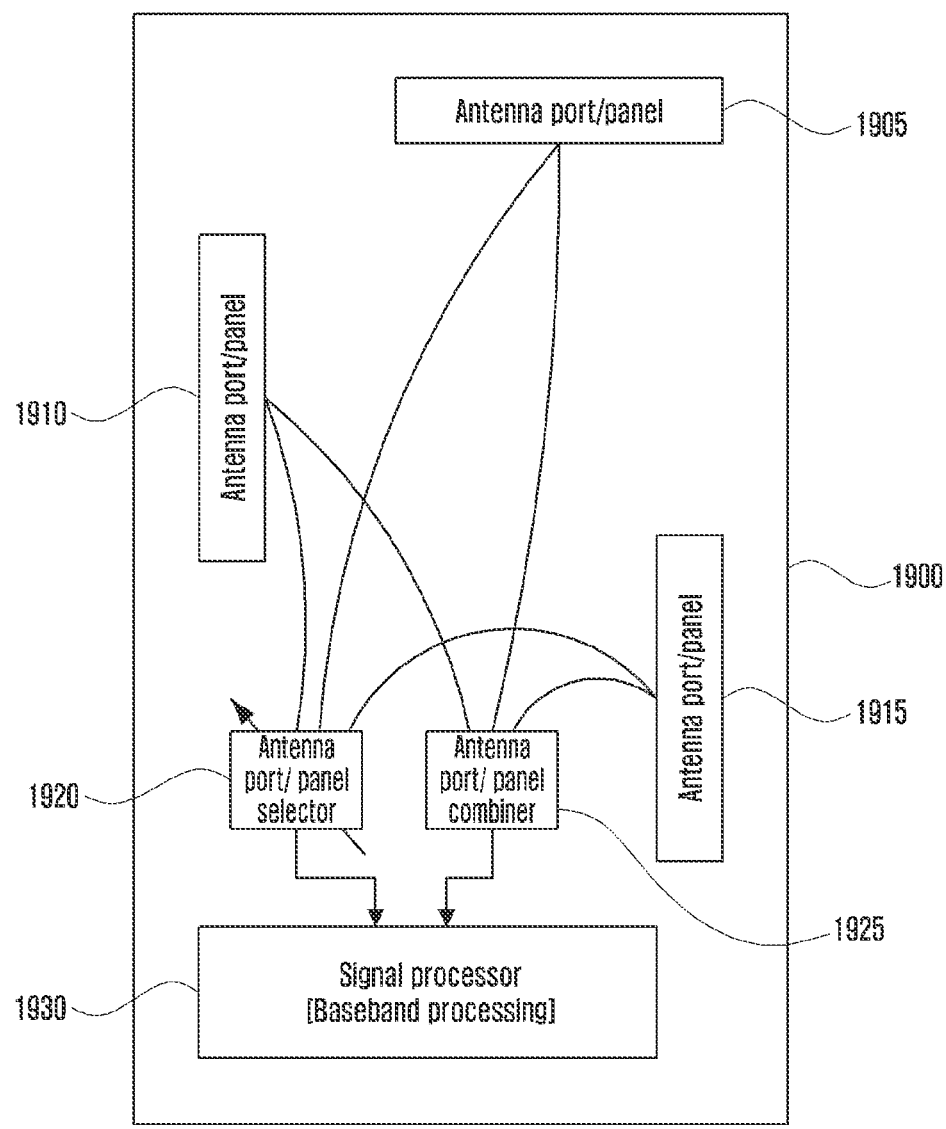
FIG. 19 is a diagram illustrating a structure of a signal processing device including an antenna port/antenna panel/baseband processor of a terminal according to an embodiment of the disclosure.

FIG. 19 is a diagram illustrating a structure of a signal processing device of a terminal according to an embodiment of the disclosure. The structure of the signal processing device may include at least one of an antenna port, an antenna panel, and a baseband processor of the terminal.

Referring to FIG. 19, a terminal 1900 may include multiple antenna ports or panels 1905, 1910, and 1915. FIG. 19 illustrates that the terminal has three antenna ports or panel structures, but it is merely an example and all terminals do not have to be limited thereto in actual application, and more or fewer antenna ports or panel structures can be used. The multiple antenna ports or panels may be connected to an antenna port/panel selector (antenna selection module) 1920 or may be connected to a signal processor (baseband processing module) 1930 via an antenna port/panel gain combiner (antenna combining module/MIMO module) 1925 or the like, according to various environments and conditions, such as manufacturing costs of the terminal, target performance, and an operating frequency band such as FR1 or FR2. For convenience of description, the modules, such as the antenna port/panel selector (antenna selection module) 1920 and the antenna port/panel gain combiner (antenna combining module/MIMO module) 1925, are commonly referred to as an "antenna signal processor". The signal processor (baseband processing module) 1930 may receive an RF signal or a digital signal having passed through the antenna signal processor, may measure a reference signal according to the aforementioned procedure, and may perform a TCI/QCL procedure or measure a data symbol so as to demodulate data. Most existing terminals select and use either the antenna port/panel selector (antenna selection module) 1920 or the antenna port/panel gain combiner (antenna combining module/MIMO module) 1925, for the purpose of reducing power consumption or reducing complexity/costs or for the purpose of expanding wireless communication coverage or increasing capacity, respectively.

In order to properly acquire various gains according to situations due to antenna selection, connection, and/or combination, future terminals can concurrently implement multiple antenna signal processors or introduce a complex antenna signal processor capable of performing various functions. Such a trend may be gradually accelerated since the number of antenna ports/panels of one terminal gradually increases as the module size of an antenna port/panel and a required minimum spacing between respective modules are shortened in inverse proportion to a frequency (in proportion to a wavelength) according to an increase in a frequency operation band in wireless communication (e.g., an FR2 band higher than or equal to 6 GHz or an FR4 band higher than or equal to 52.6 GHz).

As described above, when a terminal operating multiple antenna ports/panels has an antenna signal processor having multiple functions, it is theoretically possible to obtain high performance via excellent environmental adaptability. However, in to materialize the excellent adaptability and convert the same into coverage gain or communication capacity gain, it is necessary to accompany individual reference signal transmission and measurement for each case, and TCI and QCL measurement and application of the terminal also needs to be individually processed for each case. This indicates that, compared to the conventional system having assumed a method of single-antenna signal processing in order to obtain a wireless communication performance gain via the flexible antenna signal processing, a large amount of reference signal transmission and measurement burden, and additional costs, such as TCI and QCL measurement and application capability improvement of the terminal, are required.

The disclosure provides a method of TCI emulation in consideration of various antenna ports and panel structures of a terminal, to reduce a reference signal transmission burden, thereby increasing wireless communication efficiency. Hereinafter, the main gist of the disclosure will be described via specific examples.

First Embodiment

The first embodiment provides methods of reducing a reference signal transmission burden via TCI or/and QCL (hereinafter, TCI/QCL) emulation. According to the embodiment, TCI/QCL emulation is a combination of one or more of 1) a method of making one TCI state or one QCL assumption by appropriately synthesizing two or more different TCI states or two or more different QCL assumptions, 2) a method of making two or more different TCI states or two or more different QCL assumptions by appropriately dividing one TCI state or one QCL assumption, and the like, and various detailed methods may exist.

Figure 20:
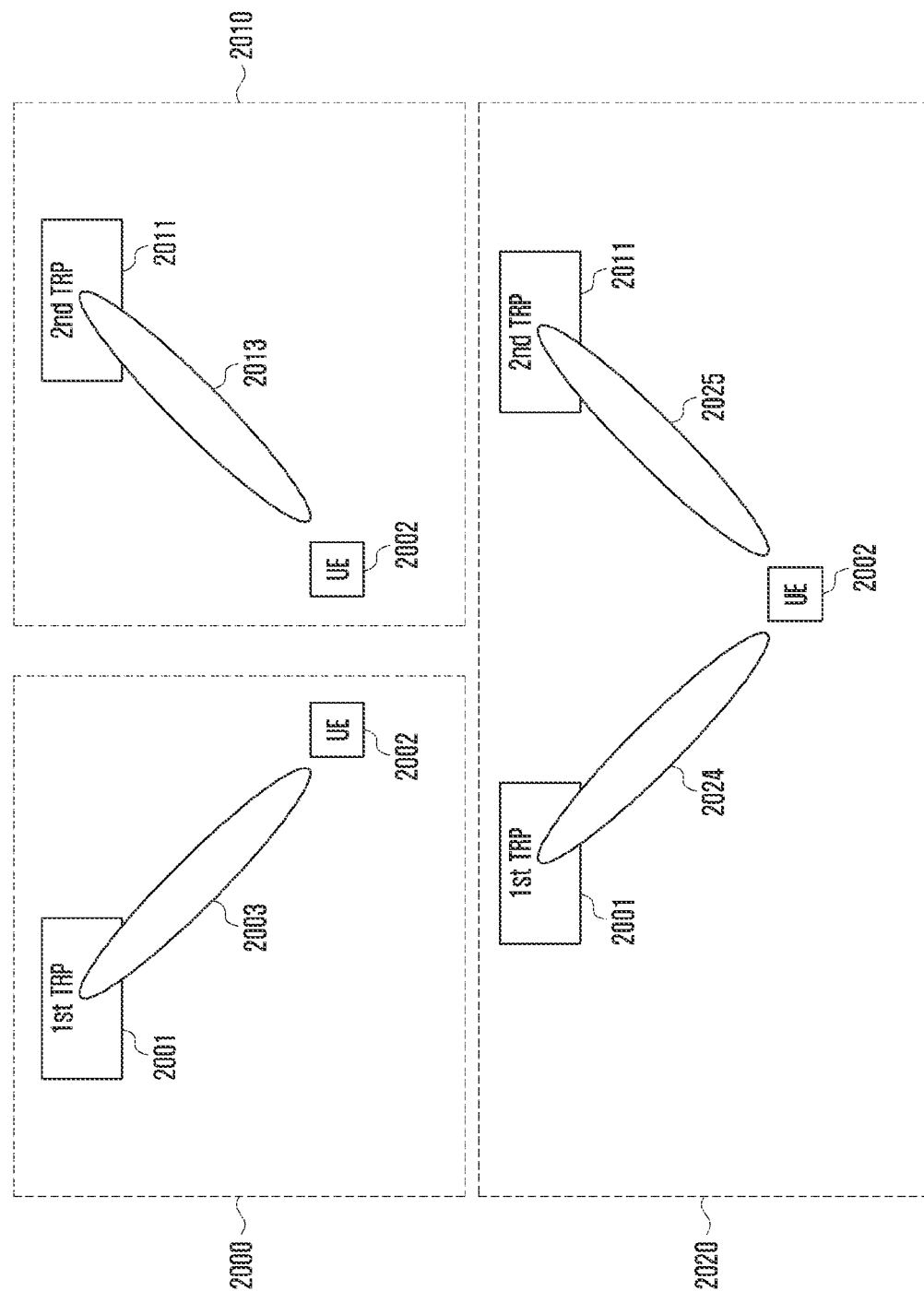
FIG. 20 is a diagram illustrating an example of TCI emulation according to an embodiment of the disclosure.

FIG. 20 is a diagram illustrating an example of TCI emulation according to an embodiment of the disclosure.

FIG. 20 is a diagram illustrating a specific example of a method of generating one TCI state or one QCL assumption by appropriately synthesizing two or more different TCI states or two or more different QCL assumptions, which is the first method from the two TCI emulation methods. Referring to FIG. 20, a terminal 2002 may establish an uplink or downlink wireless communication link with one or more transmission and reception points (TRPs), panels, or antenna ports 2001 and 2011. In this case, in consideration of various multi-TRP operation methods, such as a single-frequency network (SFN) and non-coherent joint transmission (NC-JT), some or all of the transmission point, panel, and/or antenna port may be transmitted (or included) in the same base station. The transmission point, panel, and/or antenna port will be collectively referred to as "transmission point" for convenience of description. That is, in the case of FIG. 20, physical locations of the transmission points 2001 and 2011 are shown to be different for convenience of explanation, but the disclosure is not necessarily limited thereto in actual application, and some transmission points may have the same physical location. (For example, the terminal may transmit or receive signals through two different transmission points, each of which has two panels, in which case, some of the four panels may share the same horizontal or vertical physical location.) In the specification, generating of a QCL assumption or starting or performing a QCL/TCI process may indicate that the terminal receives QCL configuration information from the base station, receives a channel or a reference signal configured as a QCL reference RS in the configuration information, and generates all or some of statistical information of the channel according to the QCL type of Table 10, so as to use the same for channel estimation via reception of a QCL target RS configured in corresponding QCL configuration information.

In the specification, different transmission points for transmitting a certain reference signal or channel may indicate a case in which two different reference signals received by the terminal 2002 are configured via one or more higher layer signaling, activated via one or more higher layer signaling or L1 signaling, or indicated via L1 signaling so as to have different QCL assumptions or have different TCI states. Similarly, different transmission points for receiving a certain reference signal or channel may indicate a case in which two different reference signals transmitted by the terminal 2002 are configured via one or more higher layer signaling, activated via one or more higher layer signaling or L1 signaling, or indicated via L1 signaling so as to have different QCL assumptions (which may include UL QCL, DL-UL joint QCL, or spatial relationship information, etc.) or have different UL-TCI states. In actual application, for the purpose of assisting the terminal to easily determine that the transmission points are different, an independent higher layer parameter can be defined and explicitly announced. As described above, there may be differences in terms required for describing a downlink and an uplink, but in order not to obscure the gist of the description, a downlink will be mainly referred to in the following description. However, it should be noted that general contents of the disclosure are also applicable to an uplink in a similar manner.

As an example of a method (i.e., a method in which two different reference signals are configured via one or more higher layer signaling, activated via one or more higher layer signaling or L1 signaling, or indicated via L1 signaling so as to have different QCL assumptions or different TCI states, and the like) for the base station to notify the terminal that transmission points for transmission of the certain reference signal or channel are different, the base station may configure an additional indicator, e.g., a CORESET pool index, for each CORESET configuration, and may agree to assume that RSs (DMRS, CSI-RS, SRS, etc.), data channels (PDSCH, PUSCH, etc.), or control channels (PDCCH and PUCCH), allocated by or associated with DCI transmitted in the CORESET in which a value of the additional indicator is the same, are transmitted from the same transmission point. For example, the terminal may assume that PDCCHs transmitted in a CORESET in which a CORESET pool index is not configured or a CORESET in which a CORSET pool index value is configured to 0, and PDSCHs allocated by DCI included in the PDCCHs are transmitted from a first transmission point, and PDCCHs transmitted in a CORESET in which the CORSET pool index value is configured to 1 and PDSCHs allocated by DCI included in the corresponding PDCCHs are transmitted from a second transmission point.

The example of classifying transmission points is focused on conforming to an indicator of a CORESET, but this is for convenience of description and the disclosure is not limited thereto in actual application. Further, the disclosure can be similarly expanded by introducing an additional indicator in various configurations, such as a PUCCH, a PUCCH group, a cell, a cell group, a BWP, and a BWP group.

The terminal may determine, using the method, various situations such as whether a QCL reference RS and a target RS are associated with the same transmission point, the number of target RSs associated with one QCL reference RS, the number of QCL reference RSs associated with one target RS, or the like.

In order not to obscure the gist of the disclosure in the following description, it should be noted that there is a case in which being configured with a QCL or TCI state is collectively used to refer to a case where "the base station configures the specific QCL or TCI state for the terminal via higher layer signaling, "the specific QCL or TCI state is activated via higher layer signaling or L1 signaling", or "the specific QCL or TCI state is indicated via L1 signaling".

In the following description, two transmission points are assumed, but this is for convenience of description, and cases where there are three or more transmission points can also be supported in a similar manner.

Referring to FIG. 20, the terminal 2002 may receive and be configured with a QCL reference RS (e.g., an SS/PBCH block, a TRS, a CSI-RS for BM (a CSI-RS in which a repetition parameter is configured to be on or off from among SCI-RSs)) 2003 from the first transmission point 2001 at a specific time point or in a specific time/frequency resource 2000, and may generate a QCL assumption or start a TCI process. In addition, the terminal 2002 may receive and be configured with a QCL reference RS (e.g., an SS/PBCH block, a TRS, a CSI-RS for BM (a CSI-RS in which a repetition parameter is configured to be on or off from among SCI-RSs)) 2013 from the second transmission point 2011 at a specific time point or in a specific time/frequency resource 2010, and may generate a QCL assumption or start a TCI process.

When the terminal 2002 receives and is configured with QCL target RSs (e.g., a PDCCH DMRS, a PDSCH DMRS, a CSI-RS, etc.) 2024 and 2025 transmitted from another specific time point or specific time/frequency resource 2020 from both the first and second transmission points 2001 and 2011, the QCL reference RSs should be transmitted in the same way as the aforementioned QCL target RSs for optimal reception performance. That is, for optimal reception performance of the QCL target RSs 2024 and 2025, the QCL reference RSs also need to be concurrently received from both the first and second transmission points 2001 and 2011. However, this requires transmission of a QCL reference RS different from the QCL reference RSs 2002 and 2013 for individual transmission scenarios at the first and second transmission points, and therefore a large amount (in some cases, additional 50% or more) of reference signal transmission burden is additionally required. In addition, in many cases, there is a problem in that concurrent transmission of QCL reference RSs used in a cell-common or group-common manner is required.

In order to solve this problem, TCI emulation (QCL synthesis or TCI synthesis, and TCI emulation mode #1) can be performed according to one of the following methods or a combination thereof. As illustrated in FIG. 20, in order to apply QCL information measured in two different reference RSs to one target RS, the base station should be able to properly notify the terminal of a many-to-one relationship (N:1 association) between the reference RS and the target RS. Based on this, in many cases, the base station and the terminal may appropriately exchange QCL and/or TCI information for a QCL target RS transmitted cooperatively without performing concurrent transmission or reception for the QCL reference RSs used in the cell-common or group-common manner.

The current NR system supports a function of connecting (activating) multiple TCI states to one TCI field code point in DCI by using higher layer signaling, such as a MAC CE, to support multi-TRP transmission. However, this function is to apply different TCI states to respective DMRS CDM groups by dividing, based on the DMRS CDM groups, DMRS ports indicated by corresponding DMRS port indication fields of the DCI (that is, in a conventional case, only one independent QCL assumption is applied to one DMRS port), and should be distinguished from the spirit and function of the disclosure, which is intended to support by integrating (integrated application of multiple QCL reference RSs) different TCI states or different QCL assumptions in one DMRS port (i.e., one QCL target RS port).

According to the purpose of the disclosure, one of the following three methods is applicable in order to integrate (integration of multiple QCL reference RSs) and apply different TCI states or different QCL assumptions to one QCL target RS port.

Method 1: A first method is that multiple TCI states or QCL assumptions to be concurrently applied are connected with DMRS ports indicated by DCI, based on an Rel-16 PDSCH DMRS TCI activation MAC CE or extension thereof. In this case, a separate higher layer parameter is defined, and thus the terminal may determine, based on the higher layer parameter, whether the connection is interpreted according to an Rel-16 multi-TRP operation (i.e., a first TCI state is applied to DMRSs belonging to a first DMRS CDM group, and a second TCI state is applied to DMRSs belonging to a second DMRS CDM group) or whether to perform TCI emulation according to contents of the disclosure (i.e., a new TCI state is derived by synthesizing the first TCI state and the second TCI state, and is applied to all indicated DMRS ports). The separate higher layer parameter can be defined as an independent RRC parameter, or a higher layer parameter for Rel-16 multi-TRP can be utilized to indicate the aforementioned contents. According to method 1, the TCI state and QCL configurations in Table 11 are reusable, and TCI emulation is thus supportable with a minimal standard change, but there is a disadvantage that Rel-16 multi-TRP and TCI emulation operations cannot be performed at the same time.

Method 2: A second method is a method of allowing a total of four QCL types to be configured in one TCI state, by modifying the TCI state configuration of Table 11 as shown in Table 33 below. Based on this, a QCL target RS referring to a corresponding TCI state may refer to two different QCL reference RSs transmitted from two different transmission points. In this case, QCL parameters indicated by qcl-Type1 are synthesized with QCL parameters indicated by qcl-Type1-r17 so that new first QCL information is generated, QCL parameters indicated by qcl-Type2 are synthesized with the QCL parameters indicated by qcl-Type1-r17 so that new second QCL information may be generated. Table 33 relates to an example in which two QCL reference RSs are referred to, but may be extended in the same way with respect to three or more QCL reference RSs. An independent higher layer signaling parameter is defined also in the case of method 2, and the parameter can indicate whether to use new parameters of qcl-Type1-r17 and qcl-Type2-r17 below, can directly indicate a parameter pair to be used from among {qcl-Type1, qcl-Type2} and {qcl-Type1-r17, qcl-Type2-r17}, or whether to use anew parameter pair generated by synthesizing the two pairs.

TABLE 33

```
TCI-State-r17 ::=                                           SEQUENCE {
tci-StateId                                                 TCI-
StateId,
(ID of corresponding TCI state)
qcl-Type1                                                   QCL-
Info,
(QCL information of first reference RS transmitted from first transmission point of RS
(target RS) referring to TCI state ID)
qcl-Type2                                                   QCL-
Info                         OPTIONAL,                      -- Need R
(QCL information of second reference RS transmitted from first transmission point of
RS (target RS) referring to corresponding TCI state ID)
qcl-Type1-r17                                               QCL-Info,
(QCL information of first reference RS transmitted from second transmission point of
RS (target RS) referring to TCI state ID)
qcl-Type2-r17                                               QCL-Info
                             OPTIONAL,                      -- Need R
(QCL information of second reference RS transmitted from second transmission point
of RS (target RS) referring to corresponding TCI state ID)
...
}
```

Method 3: A third method is a method of allowing a total of two QCL reference RSs to be included in one QCL configuration by modifying the QCL configuration of Table 11 as shown in Table 34 below. Based on this, during QCL target RS-based channel estimation referring to a corresponding TCI state, the terminal may refer to channel parameters of two different QCL reference RSs transmitted from two different transmission points. In this case, the terminal may directly synthesize measurement values of QCL reference RSs in the corresponding QCL configuration or synthesize QCL parameter values independently measured in the QCL reference RSs in the corresponding QCL configuration so as to generate new QCL information. Table 34 relates to an example in which two QCL reference RSs are referred to, but may be extended in the same way with respect to three or more QCL reference RSs.

Method 3 also enables notification of whether newly defined independent higher layer signaling parameters inform whether the following new parameters of referenceSignal-r17 and qcl-Type-r17 are used. In this case, qcl-Type-r17 may additionally indicate a new type other than existing QCL types of A, B, C, and D. For example, type E may be added, and in addition to one of the existing QCL types, a new channel statistical characteristic, such as an average gain, may be supported so as to be used for TCI emulation. Detailed methods of TCI emulation based on a channel statistical characteristic, such as an average gain, are provided in detail below.

TABLE 34

```
QCL-Info ::=                    SEQUENCE {
cell
   ServCellIndex                OPTIONAL,         -- Need
R
(serving cell index of reference RS indicated by corresponding QCL information)
bwp-Id                                             BWP-Id
                                OPTIONAL, -- Cond CSI-
RS-Indicated
(BWP index of reference RS indicated by corresponding QCL information)
referenceSignal                 CHOICE {
csi-rs                                             NZP-
CSI-RS-ResourceId,
ssb
   SSB-Index
(either CSI-RS ID or SSB ID indicated by corresponding QCL information)
},
qcl-Type                        ENUMERATED
{typeA, typeB, typeC, typeD},
referenceSignal-r17
   CHOICE {
csi-rs                                             NZP-
CSI-RS-ResourceId,
ssb
   SSB-Index
(either CSI-RS ID or SSB ID indicated by corresponding QCL information)
},
qcl-Type-r17                    ENUMERATED
{typeA, typeB, typeC, typeD, typeE},
...
}
```

Tables 33 and 34 are examples for providing a connection relationship (association) between one target RS and multiple reference RSs, and in actual application, various applications are possible, and details, such as the number of reference RSs, can also be appropriately changed.

The terminal may receive, from the base station, association information between a QCL target RS port and multiple TCI states or different QCL assumptions according to one of the aforementioned methods, and may accordingly perform one of the following TCI/QCL synthesis methods.

Method 1: A first method of generating a new QCL parameter value (synthesized QCL assumption) by synthesizing QCL parameter values (individual QCL assumptions) measured or extracted from multiple QCL reference RSs is a method of using a weighted sum of the individual QCL assumptions, as a synthesized QCL assumption. There may be an integer having the same value, as an example of a coefficient multiplied by the individual QCL assumptions in the weighted sum. The terminal is able to generate a synthesized QCL assumption by assuming the individual QCL assumptions as independent random variables and multiplying all of the same by the same integer value (e.g., 1). According to the example, when a target RS is connected to a first reference RS having a value of an average delay=A, while concurrently connected to a second reference RS having a value of the average delay=B, a synthesized average delay value is assumed to be A+B.

As another example, in order to control synthesis of a secondary statistical characteristic value of a channel in a continuously increasing direction, such as a delay spread or a Doppler spread, a synthesized QCL assumption can be generated by performing multiplication and addition using real numbers of the same value (e.g., 1/N if there are N individual QCL assumptions). According to the example, when a target RS is connected to a first reference RS having a value of an average delay=A, while concurrently connected to a second reference RS having a value of the average delay=B, a synthesized average delay value is assumed to be (A+B)/2.

According to the method, one method of the described examples is collectively applicable to all QCL parameters configured by the base station, such as an average delay, a delay spread, a Doppler shift, a Doppler spread, and a spatial RX parameter, but as application based thereon, it is also possible to agree that different methods are applied according to a QCL parameter type in the QCL assumptions. For example, it may be possible to agree that variables corresponding to a primary characteristic (an instantaneous value based on an average or given measurement interval) of a channel, such as an average delay, a Doppler shift, or a spatial RX parameter, are determined according to a sum of weights using integers (e.g., 1) of the same value as a coefficient according to the first example, and variables corresponding to a secondary characteristic (a variance value based on a given measurement interval) of the channel, such as a delay spread or a Doppler spread, are determined according to a sum of weights using real numbers (e.g., 1/N) of the same value as a coefficient according to the second example, or independent higher layer signaling parameters for configuration of the same are introduced. The higher layer signaling parameters may indicate a coefficient (or one method of the examples) to be applied to each QCL parameter or may indicate that one method of the examples is applied to a preconfigured set of one or more specific QCL parameters.

Method 2: A second method of generating a new QCL parameter value (synthesized QCL assumption) by synthesizing QCL parameter values (individual QCL assumptions) measured or extracted from multiple QCL reference RSs is a method of using a QCL weighted sum as a synthesized QCL assumption by using, as coefficients, independent values other than the QCL configuration of the individual QCL assumptions. There may be an average gain as an example of a coefficient multiplied by the individual QCL assumptions in the weighted sum. By applying that a contribution degree of the individual QCL assumptions to the synthesized QCL assumption is in proportion to a reception strength of a reference RS for estimation of a corresponding individual QCL assumption, the terminal is able to use, as the independent value, an average gain of respective reference RSs. According to the example, when a target RS is connected to a first reference RS having values of an average delay=A and the average gain=C, while concurrently connected to a second reference RS having values of the average delay=B and the average gain=D, a synthesized average delay value is assumed to be (C*A+D*B).

As another example, in order to control synthesis of a secondary statistical characteristic value of a channel in a continuously increasing direction, such as a delay spread or a Doppler spread, a synthesized QCL assumption can be generated by performing multiplication and addition using a relative magnitude of the average gain between reference RSs. According to the example, when a target RS is connected to a first reference RS having values of an average delay=A and the average gain=C, while concurrently connected to a second reference RS having values of the average delay=B and the average gain=D, a synthesized average delay value is assumed to be (C*A+D*B)/(C+D).

According to the method, one method is collectively applicable to all QCL parameters configured by the base station, such as an average delay, a delay spread, a Doppler shift, a Doppler spread, and a spatial RX parameter, but as application based thereon, it is also possible to agree that different methods are applied according to a QCL parameter type in the QCL assumptions. For example, it may be possible to agree that variables corresponding to a primary characteristic (an instantaneous value based on an average or given measurement interval) of a channel, such as an average delay, a Doppler shift, or a spatial RX parameter, are determined according to a sum of weights using integers (e.g., 1) of the same value as a coefficient according to the first example of method 1, and variables corresponding to a secondary characteristic (a variance value based on a given measurement interval) of the channel, such as a delay spread or a Doppler spread, are determined according to a sum of weights using a relative magnitude of the average gain between reference RSs as a coefficient according to the second example of method 2, or independent higher layer signaling parameters for configuration of the same are introduced. The higher layer signaling parameters may directly indicate a method for synthesizing a specific QCL parameter, or may indicate that one of the examples is applied to a preconfigured set of one or more specific QCL parameters.

Method 3: A third method of generating a new QCL parameter value (synthesized QCL assumption) by synthesizing QCL parameter values (individual QCL assumptions) measured or extracted from multiple QCL reference RSs is a method of comparing QCL parameter values of the individual QCL assumptions and selecting a dominant value therefrom so as to use the selected value as a synthesized QCL assumption. For example, in the secondary statistical characteristic values of the channel, such as a delay spread or a Doppler spread, a synthesized parameter value is greatly affected by a larger value among individual values, and the disclosure can be thus limited so that, without generating an accurate synthesized value in consideration of implementation complexity of the terminal, synthesis is performed by selecting a largest value from among individual QCL parameter measurement values or selecting only top N values from among the individual QCL parameter measurement values. According to the example, when a target RS is connected to a first reference RS having a value of an average delay=A, while concurrently connected to a second reference RS having a value of the average delay=B, and a condition of A>B is satisfied, a synthesized average delay value is assumed to be A.

As another example of generating a synthesized QCL assumption by selecting the dominant value, there is a method of making a determination according to a direct indication of the base station. For example, in addition to Table 33 or Table 34, the base station is able to indicate, to the terminal via higher layer signaling or L1 signaling, information on an RS, in which a QCL parameter to be used for synthesized QCL assumption is measured, from among multiple reference RSs. As another example of generating the synthesized QCL assumption by selecting a dominant value, there is a method of determining, according to an independent parameter value, a reference RS in which a QCL parameter to be used for synthesis is measured. For example, it is possible to agree that the independent parameter is an average gain measured in each reference RS. According to the example, when a target RS is connected to a first reference RS having values of an average delay=A and average gain=C, while concurrently connected to a second reference RS having values of the average delay=B and average gain=D, and C>D is satisfied, a synthesized average delay value is assumed to be A.

According to the method, one method is collectively applicable to all QCL parameters configured by the base station, such as an average delay, a delay spread, a Doppler shift, a Doppler spread, and a spatial RX parameter, but as application based thereon, it is also possible to agree that different methods are applied according to a QCL parameter type in the QCL assumptions. For example, it may be possible to agree that, for variables corresponding to a primary characteristic (an instantaneous value based on an average or given measurement interval) of a channel, such as an average delay, a Doppler shift, or a spatial RX parameter, a value according to selection based on the average gain value is used in accordance with the second example of method 3, and for variables corresponding to a secondary characteristic (a variance value based on a given measurement interval) of the channel, such as a delay spread or a Doppler spread, the QCL assumption synthesized according to the size of a QCL parameter value of the individual reference RS is used in accordance with the first example of method 3, or independent higher layer signaling parameters for configuration of the same are introduced. The higher layer signaling parameters may directly indicate a method for synthesizing a specific QCL parameter, or may indicate that one of the examples is applied to a preconfigured set of one or more specific QCL parameters.

Figure 21:
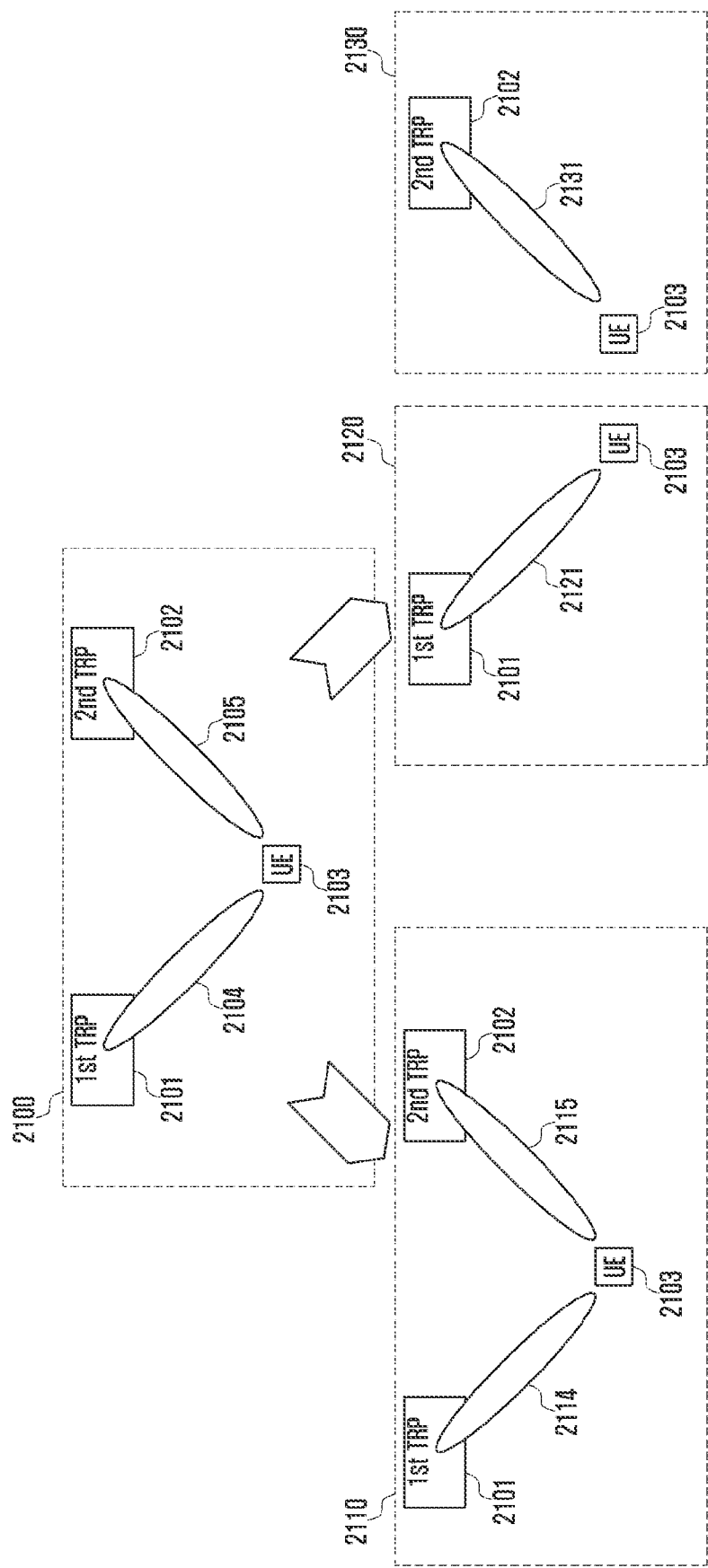
FIG. 21 is a diagram illustrating another example of TCI emulation according to an embodiment of the disclosure.

Method 4: In the descriptions of methods 1, 2, and 3, although some methods and combinations between examples have been mentioned, it is obvious that the disclosure is not necessarily limited to the examples in actual application, and various combinations similar thereto may be considered. FIG. 21 is a diagram illustrating another example of TCI emulation according to an embodiment of the disclosure.

FIG. 21 is a diagram illustrating a specific example of a second method of the two TCI emulation methods, which is a method of making two or more different TCI states or two or more different QCL assumptions by appropriately dividing one TCI state or one QCL assumption. Referring to FIG. 21, a terminal 2103 may establish an uplink or downlink wireless communication link with one or more transmission and reception points (TRPs), panels, or antenna ports 2101 and 2102. In this case, in consideration of various multi-TRP operation methods, such as a single-frequency network (SFN) and non-coherent joint transmission (NC-JT), some or all of the transmission point, panel, and/or antenna port may be transmitted (or included) in the same base station. The transmission point, panel, and/or antenna port will be collectively referred to as "transmission point" for convenience of description. That is, in the case of FIG. 21, physical locations of the transmission points 2101 and 2102 are shown to be different for convenience of explanation, but the disclosure is not necessarily limited thereto in actual application, and some transmission points may have the same physical location. (For example, the terminal may transmit or receive signals through two different transmission points, each of which has two panels, in which case, some of the four panels may share the same horizontal or vertical physical location.) In the specification, generating of a QCL assumption or starting or performing a QCL/TCI process may indicate that the terminal receives QCL configuration information from the base station, receives a channel or a reference signal configured as a QCL reference RS in the configuration information, and generates all or some of statistical information of the channel according to the QCL type of Table 10, so as to use the same for channel estimation via reception of a QCL target RS configured in corresponding QCL configuration information.

In the specification, different transmission points for transmitting a certain reference signal or channel may indicate a case in which two different reference signals received by the terminal 2103 are configured via one or more higher layer signaling, activated via one or more higher layer signaling or L1 signaling, or indicated via L1 signaling so as to have different QCL assumptions or have different TCI states. Similarly, different transmission points for receiving a certain reference signal or channel may indicate a case in which two different reference signals transmitted by the terminal 2103 are configured via one or more higher layer signaling, activated via one or more higher layer signaling or L1 signaling, or indicated via L1 signaling so as to have different QCL assumptions (which may include UL QCL, DL-UL joint QCL, or spatial relationship information, etc.) or have different UL-TCI states. In actual application, for the purpose of assisting the terminal to easily determine that the transmission points are different, an independent higher layer parameter can be defined and explicitly announced. As described above, there may be differences in terms required for describing a downlink and an uplink, but in order not to obscure the gist of the description, a downlink will be mainly referred to in the following description. However, it should be noted that general contents of the disclosure are also applicable to an uplink in a similar manner.

In order not to obscure the gist of the disclosure in the following description, it should be noted that there is a case in which being configured with a QCL or TCI state is collectively used to refer to a case where "the base station configures the specific QCL or TCI state for the terminal via higher layer signaling, "the specific QCL or TCI state is activated via higher layer signaling or L1 signaling", or "the specific QCL or TCI state is indicated via L1 signaling".

In the following description, two transmission points are assumed, but this is for convenience of description, and cases where there are three or more transmission points can also be supported in a similar manner.

Referring to FIG. 21, the terminal 2103 may receive and be configured with QCL reference RSs (e.g., an SS/PBCH block, a TRS, a CSI-RS for BM (a CSI-RS in which a repetition parameter is configured to be on or off from among CSI-RSs)) 2104 and 2105 concurrently transmitted from a first transmission point 2101 and a second transmission point 2102 at a specific time point or a specific time/frequency resource 2100, and may generate a QCL assumption or start a TCI process. In this case, the terminal may consider three cases of target RS reception scenarios, as shown in FIG. 21. A first scenario is a case in which the terminal 2103 receives and is configured with QCL target RSs (e.g., a PDCCH DMRS, a PDSCH DMRS, a CSI-RS, etc.) 2114 and 2115 transmitted from a specific time point or specific time/frequency resource 2110 from both the first and second transmission points 2101 and 2102, wherein the terminal may receive the target RSs by applying, as it is, the QCL assumption measured from the QCL reference RS, in the resource 2100. A second scenario is a case in which the terminal 2103 receives and is configured with a QCL target RS (e.g., a PDCCH DMRS, a PDSCH DMRS, a CSI-RS) 2121 transmitted from a specific time point or specific time/frequency resource 2120 from the first transmission points 2101, wherein the terminal needs to change and apply the QCL assumption measured from the QCL reference RS in the resource 2100 for optimal reception performance. A third scenario, similar to the second scenario, is a case in which the terminal 2103 receives and is configured with a QCL target RS (e.g., a PDCCH DMRS, a PDSCH DMRS, a CSI-RS, etc.) 2131 transmitted from a specific time point or specific time/frequency resource 2130 from the second transmission points 2102, wherein the terminal needs to change and apply the QCL assumption measured from the QCL reference RS in the resource 2100 for optimal reception performance.

However, this requires transmission of a QCL reference RS different from the QCL reference RSs 2104 and 2105 for concurrent transmission scenarios at the first and second transmission points, and therefore a large amount (in some cases, additional 50% or more) of reference signal transmission burden is additionally required. In addition, in many cases, there is a problem in that concurrent transmission of QCL reference RSs used in a cell-common or group-common manner is required.

In order to solve this problem, TCI emulation (QCL segmentation or TCI segmentation, TCI emulation mode #2) can be performed according to one of the following methods or a combination thereof. As illustrated in FIG. 21, in order to divide and apply QCL information measured in one reference RS to multiple target RSs, the base station should be able to properly notify the terminal of a many-to-one relationship (1:N association) between the reference RS and the target RSs. Based on this, in many cases, the base station and the terminal may appropriately exchange QCL/TCI information for QCL target RSs transmitted cooperatively without performing concurrent transmission or reception for the QCL reference RSs used in the cell-common or group-common manner.

The terminal is able to measure two or more pairs of QCL parameter values (e.g., an average delay, a delay spread, a Doppler shift, a Doppler spread, a spatial RX parameter, an average gain, etc.) in one QCL reference RS at once (concurrently) according to indication of the base station. For example, as a result of the measurement, two values may be measured as average delay values (average delay 1, average delay 2), and two or more values can also be measured. In this case, for the purpose of reducing the complexity of QCL parameter measurement of the terminal, the base station may inform the terminal of specific information related thereto (e.g., the number of pairs of parameters to be concurrently measured, the number of transmission points at which signals are to be concurrently transmitted, or the like). The specific information may be transferred to the terminal, based on higher layer signaling, such as RRC or MAC CE, or based on L1 signaling. According to FIG. 21, for example, one QCL reference RS includes the RS 2104 transmitted from the first transmission point 2101 in the resource 2100, and the RS 2105 transmitted from the second transmission point 2102, wherein the terminal may perform measurement with the two pairs of QCL parameter values (a specific QCL parameter value based on the RS 2104 and a specific QCL parameter value based on the RS 2105).

As another example, the terminal is able to determine whether to implicitly perform TCI emulation (QCL segmentation or TCI segmentation, TCI emulation mode #2) according to a specific condition other than explicit signaling. As an example, the terminal may be configured to determine whether to perform TCI emulation, according to whether one or a combination of various conditions, such as a terminal rate, a TRS transmission periodicity, and a maximum or minimum value of measured Doppler shift, exceeds a predetermined threshold.

The base station is able to indicate the terminal to selectively apply one of the following operations when performing TCI emulation.

emulation mode #operation #1: When receiving target RSs, the terminal applies all QCL parameter pairs concurrently measured in one QCL reference RS. This is an operation of assuming a situation in which target RSs are concurrently transmitted from multiple transmission points, like a reference RS. This indicates that, when the terminal is indicated to perform the operation, the terminal generates a QCL assumption by assuming that one QCL parameter value exists for one QCL parameter without assuming that the concurrently measured multiple QCL parameter values exist in one QCL parameter, or the terminal starts or performs a QCL/TCI process. Referring to FIG. 21, when the target RSs are the same as the RS 2114 and the RS 2115 of the resource 2110, the terminal may use one QCL parameter value measured from the QCL reference RSs 2104 and 2105.

emulation mode #operation #2: When receiving target RSs, the terminal applies a first group among concurrently measured QCL parameter pairs. This is an operation of assuming a situation in which the target RSs are transmitted from only some of transmission points (only at the first transmission point) at which the reference RSs are transmitted. Referring to FIG. 21, if a target RS is the target RS 2121 transmitted from the transmission point 2101, the terminal may generate a QCL assumption by applying a QCL parameter measured based on the RS 2104, or may start or perform a QCL/TCI process.

emulation mode #operation #3: When receiving target RSs, the terminal applies a second group among concurrently measured QCL parameter pairs. This is an operation of assuming a situation in which the target RSs are transmitted from only some of transmission points (only at the second transmission point) at which the reference RSs are transmitted. Referring to FIG. 21, if a target RS is the target RS 2131 transmitted from the transmission point 2102, the terminal may generate a QCL assumption by applying a QCL parameter measured based on the RS 2105, or may start or perform a QCL/TCI process.

Second Embodiment

The second embodiment provides methods of reducing a reference signal transmission burden via TCI/QCL emulation. According to the embodiment, TCI/QCL emulation corresponds to one or more combinations of 1) a method of dividing measurement intervals (monitoring occasion) for target RSs of the same configuration into several groups according to multiple intervals defined on the time axis, and applying different QCL assumptions to respective groups, 2) a method of allowing different TCI indications or TCI configurations for respective pools by dividing time resources into multiple pools, and the like, and various detailed methods may exist.

Figure 22:
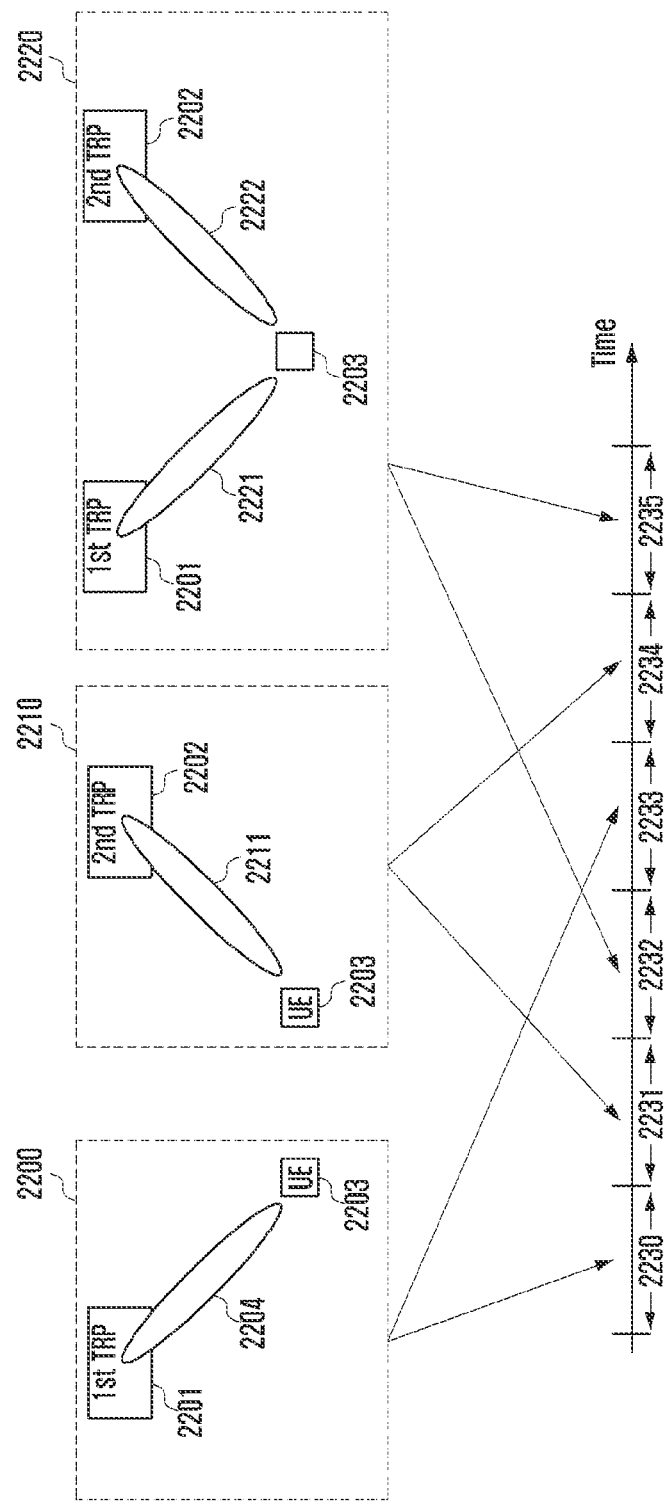
FIG. 22 is a diagram illustrating an example of TCI emulation via measurement restriction according to an embodiment of the disclosure.

FIG. 22 is a diagram illustrating an example of TCI emulation via measurement restriction according to an embodiment of the disclosure.

Referring to FIG. 22, a terminal 2203 may establish an uplink or downlink wireless communication link with two or more transmission points, panels, or antenna ports 2201 and 2202. In this case, in consideration of various multi-TRP operation methods, such as a single-frequency network (SFN) and non-coherent joint transmission (NC-JT), some or all of the transmission point, panel, and/or antenna port may be transmitted (or included) in the same base station. The transmission point, panel, and/or antenna port will be collectively referred to as "transmission point" for convenience of description. That is, in the case of FIG. 22, physical locations of the transmission points 2201 and 2202 are shown to be different for convenience of explanation, but the disclosure is not necessarily limited thereto in actual application, and some transmission points may have the same physical location. (for example, the terminal may transmit or receive signals through two different transmission points, each of which has two panels, in which case, some of the four panels may share the same horizontal or vertical physical location.)

In the specification, generating of a QCL assumption or starting or performing a QCL/TCI process may indicate that the terminal receives QCL configuration information from the base station, receives a channel or a reference signal configured as a QCL reference RS in the configuration information, and generates all or some of statistical information of the channel according to the QCL type of Table 10, so as to use the same for channel estimation via reception of a QCL target RS configured in corresponding QCL configuration information.

In the specification, different transmission points for transmitting a certain reference signal or channel may indicate a case in which two different reference signals received by the terminal 2203 are configured via one or more higher layer signaling, activated via one or more higher layer signaling or L1 signaling, or indicated via L1 signaling so as to have different QCL assumptions or have different TCI states. Similarly, different transmission points for receiving a certain reference signal or channel may indicate a case in which two different reference signals transmitted by the terminal 2203 are configured via one or more higher layer signaling, activated via one or more higher layer signaling or L1 signaling, or indicated via L1 signaling so as to have different QCL assumptions (which may include UL QCL, DL-UL joint QCL, or spatial relationship information, etc.) or have different UL-TCI states. In actual application, for the purpose of assisting the terminal to easily determine that the transmission points are different, an independent higher layer parameter can be defined and explicitly announced. As described above, there may be differences in terms required for describing a downlink and an uplink, but in order not to obscure the gist of the description, a downlink will be mainly referred to in the following description. However, it should be noted that general contents of the disclosure are also applicable to an uplink in a similar manner.

In order not to obscure the gist of the disclosure in the following description, it should be noted that there is a case in which being configured with a QCL or TCI state is collectively used to refer to a case where "the base station configures a specific QCL or TCI state for the terminal via higher layer signaling, "the specific QCL or TCI state is activated via higher layer signaling or L1 signaling", or "the specific QCL or TCI state is indicated via L1 signaling".

In the following description, two transmission points are assumed, but this is for convenience of description, and cases where there are three or more transmission points can also be supported in a similar manner.

Referring to FIG. 22, the base station may configure or indicate the terminal 2203 to measure a reference signal in a time frequency resource. In this case, the time resource for measuring the reference signal may include information indicating a periodicity and an offset in units of slots or subframes, and position information of an OFDM symbol in which a reference signal is transmitted in a slot. If the terminal needs to use QCL assumptions of various cases, (for example, 1) a case in which the terminal 2203 receives a reference RS 2204 transmitted from a first transmission point 2201 so as to generate a QCL assumption 2200, 2) a case in which the terminal 2203 receives a reference RS 2211 transmitted from a second transmission point 2202 so as to generate a QCL assumption 2210, 3) a case in which the terminal 2203 concurrently receives reference RSs 2221 and 2222 transmitted from the first and second transmission points 2201 and 2202 so as to generate a QCL assumption 2220, and the like), the base station is able to divide a time resource for reference signal measurement defined by the aforementioned one reference signal configuration, and indicate the terminal to generate different QCL assumptions for respective time intervals, and for convenience of description, this is referred to as "time domain measurement restriction-based QCL assumption method".

Various applications are possible for the "time resource for reference signal measurement defined by one reference signal configuration", for example, the time resource refers to a time resource according to a periodicity and offset configured in a periodic or semi-persistent CSI-RS resource configuration (or information indicating multiple time resources are included in one periodic or semi-persistent CSI-RS resource, and it is also possible that the time resource indicated by each piece of information corresponds to each time interval), a time resource according to a transmission timing and transmission offset of triggering DCI of an aperiodic CSI-RS (or transmission offsets can be configured in one aperiodic CSI-RS resource, and it is also possible that a time resource according to each offset corresponds to each time interval), a time resource defined for each OFDM symbol or each slot in a subframe or a frame regardless of a reference signal configuration, or the like. In FIG. 22, for convenience of description, it has been assumed that the "time resource for reference signal measurement defined by one reference signal setting" is divided into a total of six intervals 2230, 2231, 2232, 2233, 2234, and 2235. The intervals can be divided according to a predetermined rule, such as "an every Nth resource within a time resource for reference signal measurement" or can also be divided according to explicit signaling, such as a bitmap or a resource index.

In the case of FIG. 22, for the three QCL assumption calculation methods 2200, 2210, and 2220, it has been assumed that units of two of the six intervals are mapped to (associated with) each QCL assumption calculation method. For example, when the QCL assumptions are generated according to one reference signal configuration, the terminal 2203 may divide reference measurement intervals based on the one reference signal configuration into three sub-groups according to an indication of the base station, may generate the first QCL assumption 2200 in a first sub-group 2230 and 2233, may generate the second QCL assumption 2210 in a second sub-group 2231 and 2234, and may generate the third QCL assumption 2220 in a third sub-group 2232 and 2235. In this case, the terminal may not identify clear information on the number of transmission points, based on which each sub-group generates the QCL assumption, but when processing reference signal reception results (e.g., an average for noise cancellation, etc.) by terminal implementation, it may be limited not to mix and use the reference signal reception results belonging to different sub-groups.

Figure 23:
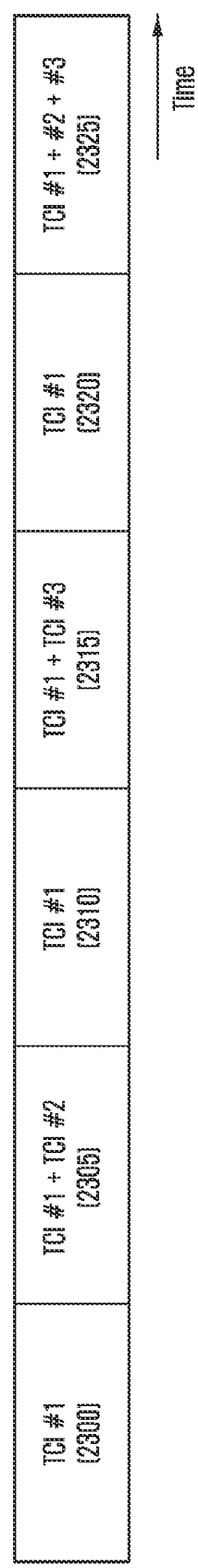
FIG. 23 is a diagram illustrating an example of TCI emulation via a resource pool according to an embodiment of the disclosure.

FIG. 23 is a diagram illustrating an example of TCI emulation via a resource pool according to an embodiment of the disclosure.

Referring to FIG. 23, a terminal may divide, into several intervals (e.g., 2300, 2305, 2310, 2315, 2320, and 2325), a part in which a reference signal for generation of a QCL assumption is measurable, from among all time/frequency resources (e.g., a time frequency resource included in a downlink (D) slot that is neither configured nor indicated as flexible (F) or uplink (U), which may be determined based on higher layer signaling that configures the time resource), and this may be referred to as a resource pool for the QCL assumption. The base station may configure to enable execution of a TCI process (e.g., a TCI process for TCI #1 is performed in the resource pools 2300, 2310, and 2320) or generation of a QCL assumption by assuming a conventional one-to-one reference RS-target RS relationship in some resource pools, but in other resource pools (e.g., 2305, 2315, and 2325), the base station is able to configure to enable execution of the TCI process or generation of the QCL assumption by assuming a many-to-one to one-to-many reference RS-target RS relationship proposed in the disclosure. The resource pool configuration information may be transmitted via higher layer signaling, wherein the resource pools can be configured by explicit parameters, such as information indicating a periodicity and an offset, a bitmap, and one or more resource indices, or the resource pools can be implicitly configured.

In this case, it may be understood that the terminal is indicated to perform TCI emulation in the resource pools 2305, 2315, and 2325. As in the example of FIG. 22, the procedure may be performed by the terminal recognizing that the QCL assumptions between "the resource pools 2300, 2310, and 2320 for performing of measurement (or including a part or all of the TCI process thereafter) for conventional QCL or TCI framework" and "the resource pools 2305, 2315, and 2325 for performing of measurement (or including a part or all of the TCI process thereafter) for TCI emulation" are different from each other. That is, in this case, the terminal is able to determine that measurement results between the resource pools 2300, 2310, and 2320 have the same statistical characteristic, and joint processing is possible, but in the case of other resource pools 2305, 2315, and 2325, the terminal may recognize that measurement results have different statistical characteristics, so that joint processing between the resource pools cannot be performed. Alternatively, as in the example of the resource pools 305, 2315, and 2325, the terminal may be indicated with QCL assumptions or TCI states, which are required to be synthesized in the respective resource pools, by the base station via direct higher layer signaling or/and L1 signaling. In this case, the higher layer signaling and/or L1 signaling may include the aforementioned higher layer signaling parameter or downlink control information field.

Third Embodiment

The third embodiment provides operation sequences of a base station and a terminal according to the disclosure.

Figure 24:
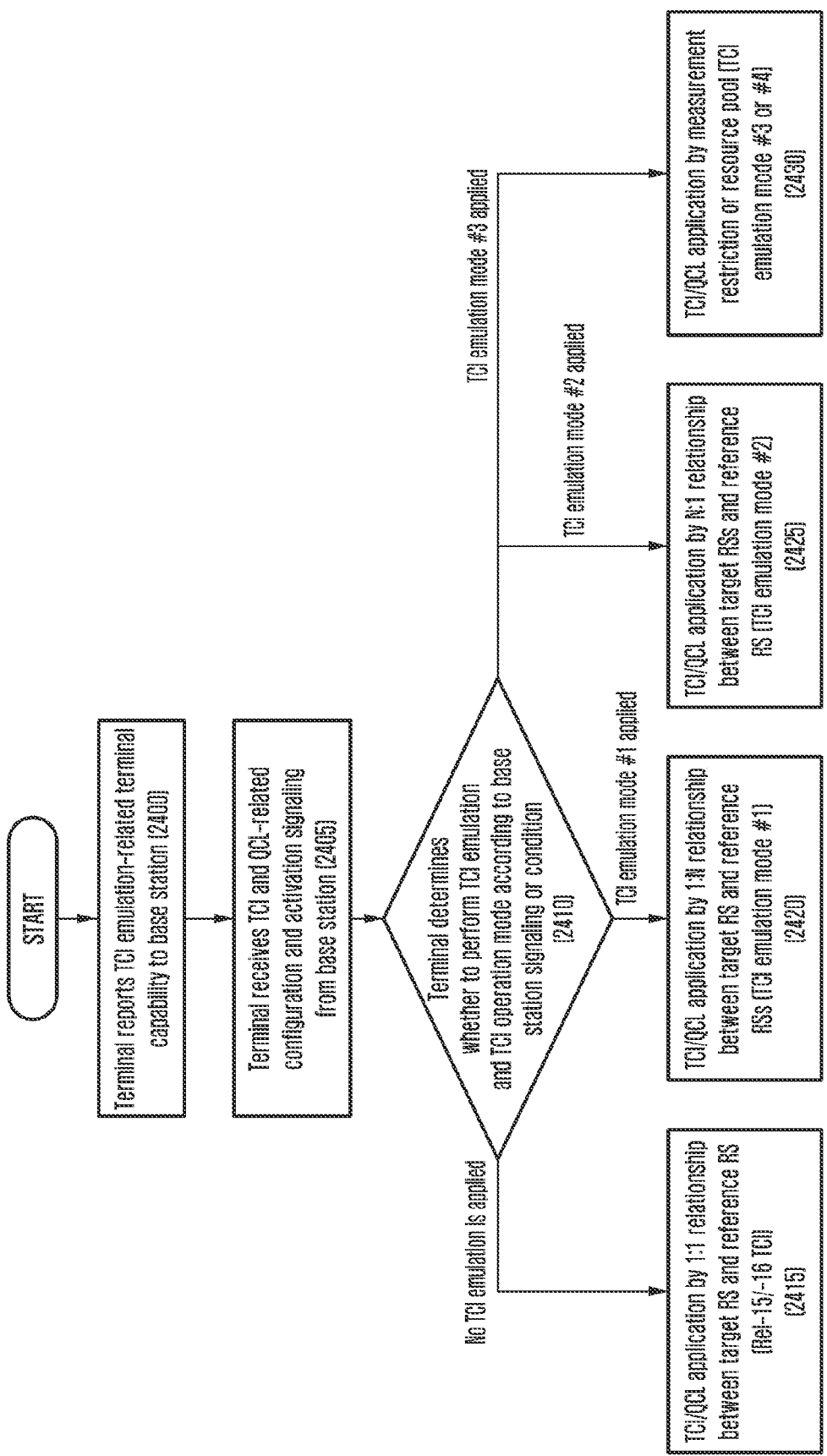
FIG. 24 is a diagram illustrating a terminal operation sequence according to an embodiment of the disclosure.

FIG. 24 is a diagram illustrating operation sequences of a base station and a terminal according to an embodiment of the disclosure.

Referring to FIG. 24, in operation 2400, a terminal may perform a terminal capability report that is to inform a base station of whether a part or all of the aforementioned TCI emulation method is supported. The base station receives the terminal capability report. Thereafter, in operation 2405, the base station may perform, via higher layer signaling, TCI configuration or QCL configuration for a part of the TCI emulation method supported by the terminal, based on the terminal capability report, and may perform activation of a part thereof via MAC CE or L1 signaling if necessary. The terminal receives the higher layer signaling and, when transmitted by the base station, and receives activation information via MAC CE or L1 signaling. Then, the terminal may determine in operation 2410 whether to perform TCI emulation and a TCI emulation operation method (or mode) according to the information and some of the aforementioned TCI emulation operation conditions.

If it is configured not to perform TCI emulation, or if no TCI emulation performance condition is satisfied, the terminal performs, in operation 2415, a TCI/QCL process by assuming a 1:1 relationship between a target RS and a reference RS (i.e., performing an NR Rel-15 or Rel-16 operation). On the other hand, if it is configured to perform TCI emulation and a performance condition of TCI emulation mode #1 of embodiment 1 is satisfied, the terminal performs in operation 2420 the TCI/QCL process by assuming a 1:N relationship between a target RS and reference RSs according to the described method. Alternatively, if it is configured to perform TCI emulation and a performance condition of TCI emulation mode #2 of embodiment 1 is satisfied, the terminal performs in operation 2425 the TCI/QCL process by assuming an N:1 relationship between target RSs and a reference RS according to the described method. Alternatively, if it is configured to perform TCI emulation and a performance condition of TCI emulation mode #3 or #4 of embodiment 2 is satisfied, the terminal performs in operation 2430 the TCI/QCL process by assuming QCL parameter measurement by resource pools or measurement restriction according to the described method.

The aforementioned embodiments and methods are not exclusive and may be operated in combination with each other according to situations. For example, the terminal may be configured to use TCI emulation mode #1 or #2 of the first embodiment in FR1, and to apply TCI emulation mode #3 or #4 of the second embodiment in FR2. Various other applications are possible, but not all possible numbers are listed in order not to obscure the gist of the disclosure.

Figure 25:
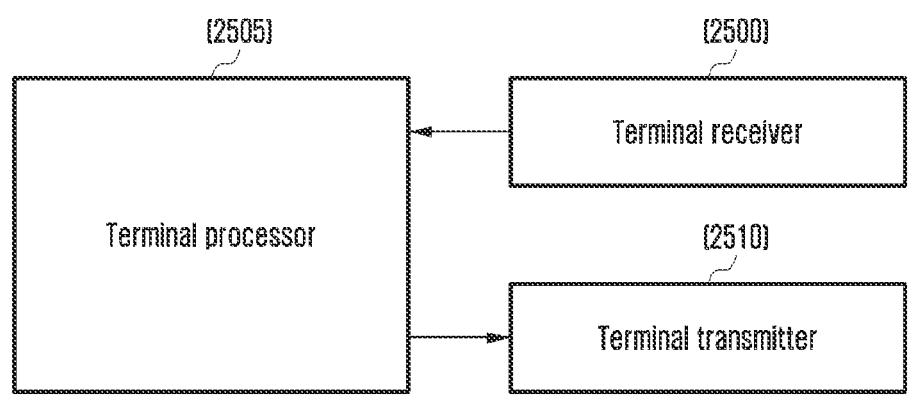
FIG. 25 is a block diagram of a terminal according to an embodiment of the disclosure.

FIG. 25 is a block diagram of a terminal according to an embodiment of the disclosure.

Referring to FIG. 25, a terminal 2500 may include a transceiver 2510, a controller 2520, and a storage 2530. The transceiver 2510, the controller 2520, and the storage unit 2530 of the terminal 2500 may operate according to a method of efficiently transmitting or receiving a channel and a signal in the 5G communication system, which corresponds to the aforementioned embodiments. However, elements of the terminal 2500 according to an embodiment are not limited to the aforementioned examples. According to another embodiment, the terminal 2500 may include more or fewer elements compared to the aforementioned elements. In addition, in a specific case, the transceiver 2510, the controller 2520, and the storage unit 2530 may be implemented in the form of a single chip.

The transceiver 2510 may include a transmitter and a receiver according to another embodiment. The transceiver 2510 may transmit a signal to or receive a signal from a base station. The signal may include control information and data. To this end, the transceiver 2510 may include an RF transmitter configured to perform up-conversion and amplification of a frequency of a transmitted signal, an RF receiver configured to perform low-noise amplification of a received signal and perform down-conversion of a frequency, and the like. Further, the transceiver 2510 may receive a signal through a radio channel, may output the signal to the controller 2520, and may transmit a signal output from the controller 2520, through the radio channel.

The controller 2520 may control a series of procedures according to which the terminal 2500 may operate according to the aforementioned embodiment of the disclosure. For example, the controller 2520 may perform at least one of TCI emulation performing methods according to an embodiment of the disclosure. The storage unit 2530 may store control information or data, such as TCI or QCL configuration information included in a signal acquired by the terminal 2500, and may have an area for storing data required for control by the controller 2520, data generated during control by the controller 2520, and the like.

Figure 26:
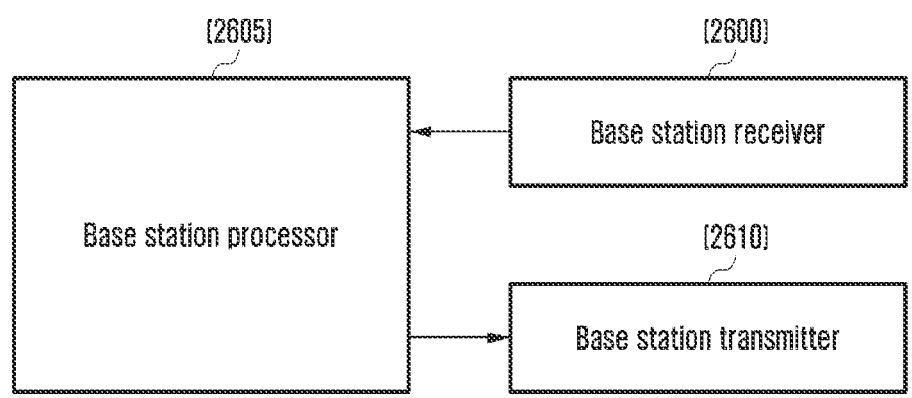
FIG. 26 is a block diagram of a base station according to an embodiment of the disclosure.

FIG. 26 is a block diagram of a base station according to an embodiment.

Referring to FIG. 26, a base station 2600 may include a transceiver 2610, a controller 2620, and a storage 2630. The transceiver 2610, the controller 2620, and the storage unit 2630 of the base station 2600 may operate according to a method of efficiently transmitting or receiving a channel and a signal in the 5G communication system, which corresponds to the aforementioned embodiments. However, elements of the base station 2600 according to an embodiment are not limited to the aforementioned example. According to another embodiment, the base station 2600 may include more or fewer elements compared to the aforementioned elements. In addition, in a specific case, the transceiver 2610, the controller 2620, and the storage unit 2630 may be implemented in the form of a single chip. The transceiver 2610 may include a transmitter and a receiver according to another embodiment. The transceivers 2610 may transmit a signal to or receive a signal from a terminal. The signal may include control information and data. To this end, the transceiver 2610 may include an RF transmitter configured to perform up-conversion and amplification of a frequency of a transmitted signal, an RF receiver configured to perform low-noise amplification of a received signal and perform down-conversion of a frequency, and the like. Further, the transceiver 2610 may receive a signal through a radio channel, may output the signal to the controller 2620, and may transmit a signal output from the controller 2620, through the radio channel.

The controller 2620 may control a series of procedures so that the base station 2600 may operate according to the aforementioned embodiment of the disclosure. For example, the controller 2620 may perform at least one of the TCI emulation methods according to an embodiment of the disclosure.

The storage unit 2630 may store control information and data, such as TCI or QCL configuration information determined by the base station 2600, or control information and data received from a terminal, and may have an area for storing data required for control by the controller 2620 and data generated during control by the controller 2620.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method performed by a terminal of a wireless communication system, the method comprising:
   receiving, from a base station, higher layer signaling including configuration information associated with transmission configuration indication (TCI) states;
   determining whether information on a TCI emulation is included in the higher layer signaling, wherein the information on the TCI emulation indicates that quasi co-location (QCL) assumptions for downlink data are based on two TCI states;
   receiving, from the base station, downlink control information (DCI) scheduling downlink data, the DCI including TCI information corresponding to the two TCI states and demodulation reference signal (DMRS) configuration information indicating one or more DMRS ports; and
   receiving the downlink data with DMRSs of the one or more DMRS ports,
   wherein, in case that the information on the TCI emulation is included in the higher layer signaling, the DMRSs of the one or more DMRS ports are assumed to be quasi co-located (QCLed) with reference signals associated with the two TCI states, and
   wherein, in case that the information on the TCI emulation is not included in the higher layer signaling, a first TCI state among the two TCI states is associated with a first DMRS of a first DMRS code division multiplexing (CDM) group and a second TCI state among the two TCI states is associated with a second DMRS of a second DMRS CDM group.

2. The method of claim 1, further comprising:
   receiving, from the base station, a medium access control (MAC) control element (CE) indicating the two TCI states for the TCI information in the DCI.

3. The method of claim 1, further comprising:
   transmitting, to the base station, capability information indicating whether the TCI emulation is supported.

4. The method of claim 1, wherein the information on the TCI emulation is associated with QCL parameters to which the TCI emulation is applied among a plurality of QCL parameters.

5. A method performed by a base station of a wireless communication system, the method comprising:
   transmitting, to a terminal, higher layer signaling including configuration information associated with transmission configuration indication (TCI) states;
   transmitting, to the terminal, downlink control information (DCI) scheduling downlink data, the DCI including TCI information corresponding to two TCI states and demodulation reference signal (DMRS) configuration information indicating one or more DMRS ports; and
   transmitting the downlink data with DMRSs of the one or more DMRS ports,
   wherein, in case that higher layer signaling includes information on a TCI emulation indicating that quasi co-location (QCL) assumptions for downlink data are based on the two TCI states, the DMRSs of the one or more DMRS ports are assumed to be quasi co-located (QCLed) with reference signals associated with the two TCI states, and
   wherein, in case that the higher layer signaling does not include the information on the TCI emulation, a first TCI state among the two TCI states is associated with a first DMRS of a first DMRS code division multiplexing (CDM) group and a second TCI state among the two TCI states is associated with a second DMRS of a second DMRS CDM group.

6. The method of claim 5, further comprising:
   transmitting, to the terminal, a medium access control (MAC) control element (CE) indicating the two TCI states for the TCI information in the DCI.

7. The method of claim 5, further comprising:
   receiving, from the terminal, capability information indicating whether the TCI emulation is supported.

8. The method of claim 5, wherein the information on the TCI emulation is associated with QCL parameters to which the TCI emulation is applied among a plurality of QCL parameters.

9. A terminal in a wireless communication system, the terminal comprising:
   a transceiver; and
   a controller coupled with the transceiver and configured to:
      receive, from a base station, higher layer signaling including configuration information associated with transmission configuration indication (TCI) states,
      determine whether information on a TCI emulation is included in the higher layer signaling, wherein the information on the TCI emulation indicates that quasi co-location (QCL) assumptions for downlink data are based on two TCI states,
      receive, from the base station, downlink control information (DCI) scheduling downlink data, the DCI including TCI information corresponding to the two TCI states and demodulation reference signal (DMRS) configuration information indicating one or more DMRS ports, and receive the downlink data with DMRSs of the one or more DMRS ports, wherein, in case that the information on the TCI emulation is included in the higher layer signaling, the DMRSs of the one or more DMRS ports are assumed to be quasi co-located (QCLed) with reference signals associated with the two TCI states, and wherein, in case that the information on the TCI emulation is not included in the higher layer signaling, a first TCI state among the two TCI states is associated with a first DMRS of a first DMRS code division multiplexing (CDM) group and a second TCI state among the two TCI states is associated with a second DMRS of a second DMRS CDM group.

10. The terminal of claim 9, wherein the controller is further configured to receive, from the base station, a medium access control (MAC) control element (CE) indicating the two TCI states for the TCI information in the DCI.

11. The terminal of claim 9, wherein the controller is further configured to transmit, to the base station, capability information indicating whether the TCI emulation is supported.

12. The terminal of claim 9, wherein the information on the TCI emulation is associated with QCL parameters to which the TCI emulation is applied among a plurality of QCL parameters.

13. A base station in a wireless communication system, the base station comprising:

a transceiver; and a controller coupled with the transceiver and configured to:

transmit, to a terminal, higher layer signaling including configuration information associated with transmission configuration indication (TCI) states, transmit, to the terminal, downlink control information (DCI) scheduling downlink data, the DCI including TCI information corresponding to two TCI states and demodulation reference signal (DMRS) configuration information indicating one or more DMRS ports, and transmit the downlink data with DMRSs of the one or more DMRS ports, wherein, in case that the higher layer signaling includes information on a TCI emulation indicating that quasi co-location (QCL) assumptions for downlink data are based on the two TCI states, the DMRSs of the one or more DMRS ports are assumed to be quasi co-located (QCLed) with reference signals associated with the two TCI states, and wherein, in case that the higher layer signaling does not include the information on the TCI emulation, a first TCI state among the two TCI states is associated with a first DMRS of a first DMRS code division multiplexing (CDM) group and a second TCI state among the two TCI states is associated with a second DMRS of a second DMRS CDM group.

14. The base station of claim 13, wherein the controller is further configured to transmitting, to the terminal, a medium access control (MAC) control element (CE) indicating the two TCI states for the TCI information in the DCI.

15. The base station of claim 13, wherein the controller is further configured to receive, from the terminal, capability information indicating whether the TCI emulation is supported.

16. The base station of claim 13, wherein the information on the TCI emulation is associated with QCL parameters to which the TCI emulation is applied among a plurality of QCL parameters.

* * * * *